(12) United States Patent
Futterer

(10) Patent No.: US 12,117,770 B2
(45) Date of Patent: Oct. 15, 2024

(54) ILLUMINATION DEVICE

(71) Applicant: SEEREAL TECHNOLOGIES S.A., Munsbach (LU)

(72) Inventor: Gerald Futterer, Metten Bayern (DE)

(73) Assignee: SEEREAL TECHNOLOGIES S.A., Munsbach (LU)

(*) Notice: Subject to any disclaimer, the term of this patent is extended or adjusted under 35 U.S.C. 154(b) by 0 days.

(21) Appl. No.: 17/717,087

(22) Filed: Apr. 10, 2022

(65) Prior Publication Data
US 2022/0236692 A1    Jul. 28, 2022

Related U.S. Application Data

(63) Continuation of application No. 16/080,728, filed as application No. PCT/EP2017/054875 on Mar. 2, 2017, now Pat. No. 11,300,924.

(30) Foreign Application Priority Data

Mar. 2, 2016    (DE) ..................... 10 2016 103 693.5

(51) Int. Cl.
*G03H 1/22*    (2006.01)
*G02B 5/02*    (2006.01)
(Continued)

(52) U.S. Cl.
CPC ......... *G03H 1/2294* (2013.01); *G02B 5/0252* (2013.01); *G02B 5/0257* (2013.01);
(Continued)

(58) Field of Classification Search
CPC ...... G03H 1/2294; G03H 1/32; G03H 1/0402; G03H 1/2286; G03H 1/0841;
(Continued)

(56) References Cited

U.S. PATENT DOCUMENTS 7,433,124 B2    10/2008    Kim et al.
8,576,406 B1 *    11/2013    Jannson ............. G02B 19/0028
356/496
(Continued)

FOREIGN PATENT DOCUMENTS

WO    2014064228 A1    5/2014

OTHER PUBLICATIONS

Betancur et al., "Spatial coherence modulation," J. of the Optical Society of America, vol. 26, No. 1, p. 147 (Jan. 1, 2009) XP0553777382.
(Continued)

*Primary Examiner* — Stephone B Allen
*Assistant Examiner* — Jyotsna V Dabbi
(74) *Attorney, Agent, or Firm* — Saul Ewing LLP

(57) ABSTRACT

An illumination device for illuminating a spatial light modulator device. Sub-holograms are used for encoding a hologram into the spatial light modulator device. The Illumination device includes at least one light source for emitting light for illuminating the spatial light modulator device and a beam shaping unit. The beam shaping unit provides a flat-top plateau-type distribution of an absolute value of a complex degree of mutual coherence of the light in a plane of the spatial light modulator device to be illuminated. The flat-top plateau-type distribution of the absolute value of the complex degree of mutual coherence has a shape that is at least similar to a shape of the largest sub-hologram used for encoding of object points into the spatial light modulator device.

23 Claims, 15 Drawing Sheets

(51) Int. Cl.
*G02B 5/32* (2006.01)
*G02B 19/00* (2006.01)
*G02B 26/06* (2006.01)
*G02B 27/09* (2006.01)
*G02B 27/48* (2006.01)
*G03H 1/02* (2006.01)
*G03H 1/04* (2006.01)
*G03H 1/32* (2006.01)
*G02B 3/00* (2006.01)

(52) U.S. Cl.
CPC ........... *G02B 5/32* (2013.01); *G02B 27/0927* (2013.01); *G02B 27/0944* (2013.01); *G03H 1/0402* (2013.01); *G03H 1/2286* (2013.01); *G03H 1/32* (2013.01); *G02B 3/0043* (2013.01); *G02B 19/0047* (2013.01); *G02B 26/06* (2013.01); *G02B 27/0988* (2013.01); *G02B 27/48* (2013.01); *G03H 2001/0212* (2013.01); *G03H 2001/0423* (2013.01); *G03H 2222/18* (2013.01); *G03H 2222/22* (2013.01); *G03H 2222/24* (2013.01); *G03H 2222/33* (2013.01); *G03H 2222/35* (2013.01); *G03H 2223/14* (2013.01); *G03H 2223/16* (2013.01); *G03H 2223/23* (2013.01); *G03H 2225/33* (2013.01)

(58) Field of Classification Search
CPC ........... G03H 2222/33; G03H 2222/24; G03H 2222/18; G03H 2222/22; G03H 2222/35; G03H 2222/20; G03H 2223/16; G03H 2223/14; G03H 2223/23; G03H 2001/0212; G03H 2001/0423; G02B 5/0257; G02B 5/32; G02B 5/0252; G02B 5/0263; G02B 5/02; G02B 5/0273; G02B 27/0927; G02B 27/0944; G02B 27/48; G02B 27/0988; G02B 27/09; G02B 27/0933; G02B 26/06; G02B 26/02; G02B 19/0047
USPC .............................................. 359/1
See application file for complete search history.

(56) References Cited

U.S. PATENT DOCUMENTS

| 2013/0170004 | A1* | 7/2013 | Futterer | G02B 6/0046 |
| | | | | 359/9 |
| 2013/0222384 | A1* | 8/2013 | Futterer | H04N 13/344 |
| | | | | 345/426 |
| 2014/0028985 | A1 | 1/2014 | Janssens | |

OTHER PUBLICATIONS

Zimmermann et al., "Microlens laser beam homogenizer: from theory to application," PRoc. of SPIE, vol. 6663, pp. 666302 (Sep. 13, 2007) XP055098544.

Tran, "Speckle suppression in laser projection displays," Doctoral Thesis, retrieved from the Internet: URL: https://brage.bibsys.no.xmlui/bitstream/handle/11250/286023/Thesis_2015_4_Tran_papers_omitted.pdf?sequence=3 [retrieved on Jun. 1, 2017], Jan. 1, 2015, pp. 1-84.

* cited by examiner $a_{LS}$, $\text{sinc}_y \times \text{Gauss}_y^N$, $N_y= 2$, $\sigma_y= 1\text{mm}$, $\text{rect}_x \times \text{Gauss}_x^N$, $N_x = 1$, $\sigma_x = 50 \text{ mm}$ $\phi_{LS}$, $\text{sinc}_y$, $\text{rect}_x$, binary: $\pi/2$, $-\pi/2$ $|\mu_{12}|(a_{LS}, \text{sinc}_y \times \text{Gauss}_y^N, N_y = 2, \sigma_y = 1\text{mm}, \text{rect}_x \times \text{Gauss}_x^N, N_x = 1, \sigma_y = 50 \text{ mm})$ $|\mu_{12}|(a_{LS}, \text{sinc}_y \times \text{Gauss}_y^N, N_y = 2, \sigma_y = 1\text{mm}, \text{rect}_x \times \text{Gauss}_x^N, N_x = 1, \sigma_x = 50 \text{ mm})$ $|\mu_{12}|(a_{LS}, \text{sinc}_y \times \text{Gauss}_y^N, N_y = 2, \sigma_y = 1\text{mm}, \text{rect}_x \times \text{Gauss}_x^N, N_x = 1, \sigma_x = 50 \text{ mm})$ $a_{LS}, \text{sinc}(x,y) \times \text{Gauss}(x,y)^N, N = 2, \sigma = 1\text{mm}$ $|\mu_{12}|(a_{LS}, \text{sinc}(x,y) \times \text{Gauss}(x,y)^N, N=2, \sigma = 1\text{mm})$ $a_{LS}, j(r) \times \text{Gauss}(r)^N, N=2, \sigma = 1\text{mm}$ $|\mu_{12}|(a_{LS}, j(r) \times Gauss(r)^N, N = 2, \sigma = 50$ mm$)$ $|\mu_{12}|(a_{LS}, j(r) \times Gauss(r)^N, N = 2, \sigma = 1$ mm$)$

ILLUMINATION DEVICE

CROSS REFERENCE TO RELATED APPLICATIONS

This application is a continuation of U.S. application Ser. No. 16/080,728, filed on Aug. 29, 2018, which claims the priority of PCT/EP2017/054875, filed on Mar. 2, 2017, which claims priority to German Application No. DE 10 2016 103 693.5, filed on Mar. 2, 2016, the entire contents of each of which are incorporated fully herein by reference.

BACKGROUND OF THE INVENTION

The present invention relates to an illumination device for illuminating a spatial light modulator device, where sub-holograms are used for encoding a hologram, where the spatial light modulator device being used preferably for displaying two-dimensional and/or three-dimensional images. The present invention relates further to a display device, in particular to a holographic display device, for the reconstruction of two-dimensional and/or three-dimensional object points and/or scenes and/or images.

Particularly, the present invention relates to an illumination device which is used to illuminate at least one spatial light modulator device being preferably applied in a display device for displaying two-dimensional (2D) and/or three-dimensional (3D) images. It shall be understood that two-dimensional images and three-dimensional images also include two-dimensional or three-dimensional contents or movies.

The illumination device according to the present invention can be used, for example, in a stereoscopic display device, an autostereoscopic display device (ASD) or preferably in a holographic display device, in particular for a mobile holographic three-dimensional display device, a head-mounted display device or also a direct view display device.

Illumination devices can be provided as backlights or frontlights (also referred to as transmitted-light and reflected-light illumination devices, respectively) in a display device and generally serve to illuminate a light-transmissive or reflective controllable spatial light modulator device (SLM). According to the invention the light can be coherent or incoherent. Display devices which are operated with incoherent light are preferably used as two-dimensional displays for stereoscopic or autostereoscopic three-dimensional presentations. Coherent light is required, for example, in holographic display devices. The present invention refers rather to a holographic display device in which the coherence of the light is an important matter.

The field of the present invention includes preferably direct-view display devices for the three-dimensional presentation of autostereoscopic and/or holographic images.

The illumination device according to the invention can also be applied to and thus used in projection display devices or head-mounted display devices, which are based on space bandwidth limited holographic reconstruction, which uses sub-hologram encoding.

In display devices for the presentation of two-dimensional images or movies/videos, it is necessary to realize a bright and homogeneous illumination of the entire surface of the spatial light modulator device at high resolution. The spatial light modulator device, which serves as display panel, is required to emit the light in a defined angular range. Many physical forms of such display devices are known in the prior art.

The present invention refers to an illumination device for a display device where sub-holograms are used for encoding a hologram into the spatial light modulator device. A number of issues need to be considered in a display device, in particular in an illumination device of a display device, to be able to realize an optimally designed illumination. For achieving a high quality of the three-dimensional presentation of the information written into the spatial light modulator device, a defined collimation of the wave fronts that are coupled out is necessary in addition to a homogeneous illumination of the entire surface of the spatial light modulator device. This is of particular importance for holographic presentations in the form of a reconstruction of a hologram that is to be generated. The holographic information, which can for example be an object that is composed of object points of a three-dimensional scene, is encoded in the form of amplitude and phase values in the pixels of the spatial light modulator device. Each encoded object point contributes to a wave front that is emitted by the spatial light modulator device.

Compared to the classic holographic approach a sub-hologram encoded in a holographic display device only requires reduced coherence of the light emitted from the illumination device.

The coherence can be described by the mutual coherence function $\Gamma_{12}$. This function describes the mutual coherence of two points of a wave field and includes temporal and lateral offsets. The part describing temporal offsets, which can also be interpreted as longitudinal shifts, is referred to as temporal coherence. Although temporal coherence is a function of the spectral distribution or power spectral density $S(\lambda)$, temporal coherence is often reduced to a single number containing reduced information. This single number is the coherence length $z_C$. For laser light sources the coherence length $z_C$ might be e.g. several millimetres or meters.

The part describing lateral offsets is referred to as the complex degree of mutual coherence $\mu_{12}$. The absolute value of a complex degree of mutual coherence $|\mu_{12}|$ defines the value of the interference contrast, which can be obtained in the case of superimposing two adjacent points of the wave field. If this value is 1, an interference contrast of V=1 can be obtained. If this value is 0, no interference effect can be seen. This means that the interference contrast V=0. The contrast is also referred to as visibility. The absolute value of the complex degree of mutual coherence is also referred to as lateral coherence or spatial coherence. The design target is to provide high visibility within the area of a sub-hologram and no visibility outside this area.

An absolute value of a complex degree of mutual coherence $|\mu_{12}|$ should be close to 1 within a defined area of the spatial light modulator device (SLM). This defined area of the spatial light modulator device is approx. equivalent to the largest sub-hologram used for encoding the hologram. It is undesirable to provide an absolute value of the complex degree of mutual coherence $|\mu_{12}|$ having a significant larger extension within the plane of the spatial light modulator device to be illuminated. Higher lateral coherence reduces the signal quality finally obtained within a three-dimensional object point cloud representing the preferred three-dimensional image. For example, the use of a plane wave for the illumination of the spatial light modulator device using sub-hologram encoding is not recommendable. An effect of using a plane wave is that parasitic diffraction, e.g. due to dust particles on a substrate plane, will generate parasitic and disturbing interference effects even at lateral distances, which are much larger than the extension of a largest sub-hologram used. Furthermore, in one-dimensional encoding-type holographic display devices, that is, for example, vertical parallax-only (VPO) encoded, an optimization of the complex-valued distribution of the columns of the spatial light modulator device representing one-dimensional vertical orientated sub-holograms is preferred along one dimension only. In other words, as long as the light propagating behind adjacent columns of the spatial light modulator device it will be incoherent to each other. Light from different columns will not interfere.

Thus, the use of point light sources in the illumination device is not recommendable. For example, the use of mono-mode-optical fibers is not recommendable because of the image quality finally obtained and because of the large factor of loss of optical power, which might be even larger than a factor of five compared to the use of free beam optics. In other words, the use of mono-mode optical fibers is a constriction of optical energy and a constriction of investment. The use of an extended light source results in a reduced lateral extension of the absolute value of the complex degree of mutual coherence $|\mu_{12}|$. However, this simple modification of the light source to be collimated is not sufficient. Therefore, it is desirable to use a more complex approach to provide sub-hologram size tailored distribution of the absolute value of the complex degree of mutual coherence $|\mu_{12}|$ in the plane of the spatial light modulator device to be illuminated within a holographic display device.

State of the art documents already describe the use of plane wave illumination of the spatial light modulator device, which is equivalent to provide an extension of the absolute value of the complex degree of mutual coherence $|\mu_{12}|$ in the plane of the spatial light modulator device to be illuminated within a holographic display device that is orders of magnitude larger than the size of the largest sub-hologram.

For one-dimensional encoding of holograms light source distributions can be provided in front of a collimation unit that have a slit-like distribution or form. Compared to point sources, this results in a reduced extension of the absolute value of the complex degree of mutual coherence $|\mu_{12}|$ in the plane of the spatial light modulator to be illuminated. But adjacent columns of a one-dimensional vertical parallax-only encoding-type spatial light modulator device are still mutually coherent. Thus, this will add disturbing coherent retinal inter object point crosstalk for adjacent object points along the horizontal direction present on the retina of an eye of an observer.

In the state of the art approaches it is disadvantageous that a visibility having a value of 1 cannot be obtained for shear distances of s>0. Here, the shear distance s can be interpreted as a mutual distance of points of a single sub-hologram.

The use of non-light source tracking embodiments in a display device in combination with the implementation of large tracking angles, that is e.g. $\alpha_T>\pm 20$ degrees, make the use of a light source imperative that has a very small spectral line width and thus a reasonable long coherence length, that is, e.g. $z_C \geq 5$ mm. This means that temporal coherence, which is also referred to as spectral coherence, can be assumed within the parameter space of the invention. Thus, the absolute value of the complex degree of mutual coherence $|\mu_{12}|$ as a parameter of the wave field illuminating the complex-valued spatial light modulator device has to be optimized.

Furthermore, a basic problem is that, despite the imperative limitation of the light line width to $\Delta\lambda<0.1$ nm and the fixing of the wavelength used, in other words a wavelength stability to a maximum of $\Delta\lambda_0 \pm 0.1$ nm, the absolute value of the complex degree of coherence, also known as spatial coherence, should be limited to the size of the sub-holograms used.

SUMMARY OF THE INVENTION

Therefore, it is an object of the present invention to provide an illumination device which is able to generate light having defined and required coherence properties and to realize a homogeneous intensity distribution decoupled from the illumination device for illuminating a spatial light modulator device. In particular, it is an object of the present invention to provide an absolute value of a complex degree of mutual coherence that is required in order to obtain a three-dimensional image quality having a resolution of ≤1/60 degrees, which is equivalent to the angular resolution limit of the human eye.

It is a further object of the present invention to design the illumination device only with a small number of optical elements, where its construction shall be simple and cost-efficient so that an illumination device can be developed under minor expenses.

The optimization of the wave field, which hits a decoupling plane of an illumination device, is imperative in order to realize a homogeneous intensity distribution, which illuminates a spatial light modulator device further along the beam path. An optimization of this intensity distribution and an adapted encoding of sub-holograms which are used in specific holographic encoding methods are practical. However, this will cost dynamic range of the e.g. complex-valued spatial light modulator device. That is the reason why a reasonable homogeneous intensity distribution should be provided already by the illumination device.

For this reason, according to the present invention the object is achieved by way of an illumination device according to claim 1.

The illumination device according to the present invention is provided for illuminating at least one spatial light modulator device being used preferably for displaying two-dimensional and/or three-dimensional images. For encoding a hologram into the spatial light modulator device sub-holograms are used. The illumination device comprises at least one light source for emitting light for illuminating the spatial light modulator device. The illumination device further comprises a beam shaping unit. The beam shaping unit provides a flat-top plateau-type distribution of an absolute value of a complex degree of mutual coherence of the light in a plane of the spatial light modulator device to be illuminated. The flat-top plateau-type distribution of the absolute value of the complex degree of mutual coherence of the light has a shape that is at least similar to a shape of the largest sub-hologram used for encoding of object points into the spatial light modulator device. This means, the shape of the flat-top plateau-type distribution of the absolute value of the complex degree of mutual coherence of the light can also be equivalent to the shape of the largest sub-hologram. The term "absolute value of the complex degree of coherence" is also known and abbreviated as spatial coherence. Hence, in the following description the term "spatial coherence" is also used for the term "absolute value of the complex degree of mutual coherence".

The invention provides an absolute value of the complex degree of mutual coherence $|\mu_{12}|$ in the plane of the spatial light modulator to be illuminated within a holographic, preferably three-dimensional (3D), display device, which is based on sub-hologram reconstruction of a three-dimensional (3D) object point cloud representing a three-dimensional (3D) scene in a three-dimensional space. A flat-top plateau-type distribution of the absolute value of the complex degree of mutual coherence $|\mu_{12}|$ is provided in the plane of the spatial light modulator device, which has at least the size or shape of the largest sub-hologram used for the encoding of object points. This applies to both a one-dimensional sub-hologram encoding and a two-dimensional sub-hologram encoding. A flat-top distribution is a so-called rectangular beam distribution.

Different embodiments of the display device require different optimizations of the illumination device and thus different optimizations of the coherence properties. Thus, lateral beam combiner arrangements for combining light of different wavelengths, different arrangements of a two-dimensional encoding and a one-dimensional encoding require different preparation of the coherence of the light emitted by the illumination device. For example, each wavelength requires an own complex-valued distribution, which is present in the plane of the light source to be collimated. Thus, it is preferred to use several individually prepared light source planes, one for each primary color, e.g. RGB. These prepared wave fields are combined further along the beam path in the illumination device.

The use of a lateral beam combination of two adjacent phase shifting pixels of the spatial light modulator device requires tailored coherence properties. The absolute value of the complex degree of mutual coherence of the pixels to be combined should be close to one (1) and the absolute value of the complex degree of mutual coherence to all other pixels of the spatial light modulator device should be close to zero (0).

For example, a display device is placed e.g. 0.5 m to 3.5 m in front of an observer who wants to observe a preferably three-dimensional scene or objects. The scene or objects are composed of object points. The object points that have the shortest distance to the observer, which can be e.g. 0.3 m, use the largest sub-holograms for encoding these object points into the spatial light modulator device. Thus, the practical size or shape of the flat-top function of the spatial distribution of the absolute value of the complex degree of mutual coherence $|\mu_{12}|$ provided in the plane of the spatial light modulator device is defined especially by the objects points, which exist in front of or behind the display device and which have the largest distance to the display device. Object points in front of the preferably holographic three-dimensional display device are real object points. Object points behind the preferably holographic three-dimensional display device are imaginary object points.

The tailoring or optimization of the coherence properties of the light emitted by the illumination device is described in the following section by an example. In order to illuminate the spatial light modulator device of a holographic display device mono-mode optical fibers and a beam quality parameter might be used, which is defined by the beam quality parameter $M^2$, with $M^2$ close to 1. With this for example a diffractive optical element (DOE) or a spatial light modulator device for a holographic reconstruction might be illuminated. The beam quality parameter can be described e.g. by using the square of the ratio of the beam diameter of the multi-mode distribution and the mono-mode distribution, $M^2=(\emptyset_m/\emptyset_0)^2$. The parameter $M^2$ can be used to describe the beam quality of single primary light beams, e.g. laser beams or light beams which are emitted from optical fibers. Multi-mode fibers show a mode pattern that is due to the plurality of propagating modes, which satisfy the transversal standing wave condition. And the far field diffraction pattern of optical fibers, which have higher modes than the $TEM_{00}$-mode, cannot be used for the most of the standard applications.

An extended light source instead of a point source can be used to decrease the absolute value of the complex degree of mutual coherence in dependence on the lateral distance. This means that an extended light source, in other words a broadened angular spectrum of plane waves, will reduce the coherence of laterally displaced object points. A dynamic scatter plane can be used. This scatter plane can be placed in the focal plane of a collimation unit provided in the illumination device or in the display device. For example, a laser as light source or other light sources illuminating the dynamic scatter plane or the exit plane of an optical fiber is imaged onto the dynamic scatter plane. The size of the resulting light source, a so-called extended light source, to be collimated defines the absolute value of the complex degree of mutual coherence. The size of the extended light source to be collimated can be adapted to the requirements by using e.g. a definite aperture or by changing the magnification, which is used to image the primary light source onto the plane of the extended light source. The plane of the extended light source is the plane of the dynamic scatter element here. This principle can be adapted to the further specific requirements of a holographic display device. A dynamic phase scatter plane may be provided e.g. by a rotating scatterer. The initial phase distribution is disturbed significantly by this rotating scatterer. This means that lower requirements are present regarding the beam quality factor M2. For example, this factor might be 2 only. This reduces costs of the light sources such as lasers significantly if compared to solutions including e.g. optical mono-mode fibers.

Therefore, the illumination has to provide a spatial coherence as low as required. Thus, for a two-dimensional (2D) encoding of a hologram an angular spectrum of plane waves of 1/60 degrees should be provided by using an approximately circular shaped light source showing a dynamic phase variation of >2π. For a one-dimensional (1D) encoding of a hologram an angular spectrum of plane waves of 1/60 degrees has to be provided for the illumination of the spatial light modulator device only for the coherent direction. The orthogonal direction, that is the incoherent direction, has to span a sweet spot for which an angular spectrum of plane waves of approx. 0.35 degrees should be sufficient.

A Gauss-to-flat-top beam shaper of the beam shaping unit can be used to provide a homogeneous illumination of an entrance aperture of the collimation unit. Thus, approximately 95% of the light illuminating the beam shaping unit will enter the collimation unit, which is an optimum regarding the light efficiency.

The term flat-top is equivalent to the terms flat-hat or top-hat, which can also be found in the literature.

Here a homogeneous intensity distribution is provided in the entrance plane of the collimation unit used for the collimation of the light source plane. Thus, a homogeneous intensity distribution is provided in the entrance plane of the spatial light modulator device. Both distributions can be considered as flat-top distributions, which are e.g. square types with an aspect ratio of e.g. 16:9 or 2:1.

The flat-top distribution of the absolute value of the complex degree of mutual coherence $|\mu_{12}|$ is different. This distribution may be e.g. circular and has a diameter of e.g. 5 mm only. This is a distribution of a coherence parameter.

For a two-dimensional encoding of a hologram three Gauss beams of three light sources emitting three different wavelengths (RGB) can be directed onto the Gauss to flat-top beam shaper of the beam shaping unit. The Gauss to flat-top beam shaper can be designed as a Gauss to circular-shaped top-hat beam shaper. The Gauss to flat-top beam shaper comprises dichroic mirror elements for beam combining and thus placing all light colors (beams of different wavelengths) onto the same position in a plane of an extended light source. This extended light source will be collimated by using of the collimation unit, which comprises e.g. an off-axis parabolic mirror or a lens, which can be an achromatic lens or an aspherical lens. The size of the extended light source defines the angular spectrum of plane waves. If a two times 10× light stretching providing diffraction based illumination device as illumination device according to the present invention is used, the size of the light source can be increased to be equivalent to $\frac{1}{6}$ degrees in front of the illumination device. The spatial light modulator device has to be illuminated with an angular spectrum of plane waves of $\frac{1}{60}$ degrees. Otherwise, an observer can recognize a loss of resolution. A Bragg diffraction based volume grating might be used in order to provide beam stretching. Thus, a compact backlight unit as illumination device can be realized. For example, a 10× beam stretching results in a reduction of the angular spectrum of plane waves by a factor of 10×. In other words, if $\frac{1}{6}$ degrees are present in front of the backlight unit, $\frac{1}{60}$ degrees are present behind the backlight unit, seen in the direction of propagation of light. This is the reason why the light collimation unit, which collimates the light of the extended tailor-made light source, can emit an angular spectrum of plane waves of $\frac{1}{6}$ degrees. This spectrum is reduced by the backlight unit to a value of $\frac{1}{60}$ degrees, which is sufficient for the illumination of the spatial light modulator device.

Divergence of the light within the illumination device can be controlled by using a beam expander. The beam expander can comprise a telescope system comprising two lenses. The telescope system can be e.g. a very small telescope system comprising lenses of a diameter of approximately 5 mm. This keeps the system of the illumination device compact.

For example, if a $\lambda$=457 nm laser (blue) and a $\lambda$=532 nm (green) laser as light sources have a $1/e^2$ diameter of d≈1.2 mm and a $\lambda$=643 nm (red) laser has a diameter of d≈3 mm, a 2.5× beam expander can be used reversed to provide a reduced beam diameter. Thus, all three light beams have a diameter of d≈1.2 mm now. If a two times 10× volume grating based wedge backlight unit is used in the illumination device, a collimating lens of a collimation unit having a focal length of f=412 mm is sufficient. There are three direct laser beams, two tiny lenses forming a 2.5× telescope system to reduce the diameter for the red laser, two dichroic mirrors and a flat-top rotating diffuser as beam shaping unit at e.g. (10000-30000) rpm to provide sufficient dynamic variation of the phase distribution of the light source to work e.g. at 4 ms flashed laser—ON pulsing illumination. Thus, a maximum efficiency can be obtained.

An optimized free laser beam setup can save, for example, ten times the laser power if compared to a mono-mode fiber embodiment. The combination of three colors of the light provided inside the illumination device by using collimation first, which is carried out for all colors separately, could not be the best way.

In case of one-dimensional encoded sub-holograms of a hologram in the spatial light modulator device, a line segment-like coherence, which is parallel to the one-dimensional sub-holograms, has to be provided. The line segment-like coherence should not exceed a defined predetermined value, e.g. that value can be approximately 5 mm. This means to provide a flat-top-like, also known as flat-hat or top-hat, shaped coherence area, e.g. of approximately 5 mm vertically and approximately 0.1 mm horizontally if the sub-holograms are vertically orientated. It is also possible to orientate the sub-holograms in a horizontal manner. For further explanations according to the invention, vertical one-dimensional encoding is assumed.

The entire size of a viewing window, through which an observer can observe a three-dimensional scene, and its projection onto the spatial light modulator device, which can be used to define the size of a sub-hologram, if, for example, the maximum of the optical path difference (OPD) has to be specified and thus the line width of a light source used in the illumination device or the maximum extension of the mutual coherence, has not to be considered. The entrance pupil of the human eye of an observer is an important parameter. The entrance pupil can be used to specify the line width $\Delta\lambda$ of the light source used or the maximum extension of the mutual coherence $|\mu_{12}|$ in order to get sufficient coherence parameters where they are required, i.e. inside the sub-holograms, and low or no coherence outside the sub-holograms. The horizontal extension of the area of the distribution of the absolute value of the complex degree of mutual coherence $|\mu_{12}|$ close to one should be at least a portion of the horizontal extension of a one-dimensional line of the spatial light modulator device provided in the display device. For example, if vertical orientated one-dimensional encoding is provided, adjacent columns of the spatial light modulator device should not be mutually coherent. Thus, a horizontal extension of the mutual coherence $|\mu_{12}|$ close to one might be e.g. 40 μm only, which is the width of a single column. At the same time the vertical extension of the mutual coherence $|\mu_{12}|$ close to one might be e.g. 5 mm, which is the height of the largest sub-hologram used. If color filter stripes are provided in the plane of the spatial light modulator device, the horizontal extension of the mutual coherence $|\mu_{12}|$ close to one should be at least a portion of the horizontal extension of the color filter stripes of a single color. Thus, a horizontal extension of the mutual coherence $|\mu_{12}|$ close to one might be e.g. 3×40 μm=120 μm, which is the width, or horizontal extension, of a red, a green and a blue pixel column.

It would be also possible to use a horizontal extension that is a small fraction of the color filter width only, as e.g. ¼. The vertical extension of the mutual coherence $|\mu_{12}|$ close to one, which is a mutual distance satisfying the condition $|\mu_{12}|\approx 1$, should have a maximum limit that is equivalent to the extension of the largest sub-hologram of the spatial light modulator device. This might be e.g. 5 mm. But it is sufficient to use only an extension that is equivalent to the projection of the entrance pupil of the eye of an observer through an object point onto the spatial light modulator device of the display device. For example, if an observer is situated approximately 3.5 m in front of a holographic one-dimensional encoded display device, an object point is placed half a way to the observer, that is z=1.75 m. The brightness might be e.g. 100 cd/m². This results in an average diameter of the entrance pupil of an eye of the observer of approximately $\emptyset_{EP}\cong 2.9$ mm. This means that in this case of limiting the object points to a maximal distance of z=1.75 m a vertical extension of the area of coherence of 2.9 mm is sufficient, which is much less than 5 mm.

As the entrance pupil of the human eye defines the most economic size (not necessarily the shape) of a sub-hologram of the display device, which images three-dimensional scenes floating in space onto the retina of the human eye, the lateral extension of the distribution of the absolute value of the complex degree of mutual coherence $|\mu_{12}(x_{SLM}, y_{SLM})|$, which is present in the plane of the spatial light modulator device, is defined by the diameter of the entrance pupil too. The entrance pupil of the human eye can be used to specify the absolute value of the complex degree of mutual coherence in order to get sufficient but the lowest coherence parameters. But it is not required to take the size of the largest sub-hologram. It can be avoided to add extra millimetre added for a spatial and temporal uncertainty of the entrance pupil tracking. The extension of the absolute value of the complex degree of mutual coherence can be smaller than the maximum size of the sub-holograms used.

For example, in the case of using a luminance of e.g. 100 cd/m$^2$ and thus an average diameter of the entrance pupil of the human eye of 2.9 mm, for a maximum distance z of reconstructed object points that is half the way from the display device to an observer an extension of the absolute value of the complex degree of mutual coherence of 2.9 mm is sufficient. This applies to the coherent direction for a one-dimensional encoding of a hologram. And this applies to a two-dimensional plane of the spatial light modulator device for a two-dimensional encoding of a hologram. For this example and a two-dimensional encoding of the sub-holograms a circular flat-top shaped distribution of the absolute value of the complex degree of mutual coherence is preferred having values essentially of close to 0 and close to 1 and a diameter of e.g. d=2.9 mm, which is preferred but not an absolute must.

By using a look-up table (LUT), static intensity distributions can be considered for the encoding of sub-holograms. This can also be extended to dynamic variations. Thus, it is not necessary to provide a constant intensity distribution in the entrance plane of the spatial light modulator device (SLM). However, this compensation sacrifices dynamic range of the modulation. This is the reason why reasonable homogeneity should be used.

Further preferred embodiments and improvements of the present invention are defined in the dependent claims.

In a first preferred embodiment of the invention, the illumination device can be designed such that the flat-top plateau-type distribution of the absolute value of the complex degree of mutual coherence provided in the plane of the spatial light modulator device can have a flat-top function, which has a value of close to 1 within an area of the largest sub-hologram and a value of close to 0 outside of the area of the largest sub-hologram.

For example, in case of using largest sub-holograms of a size of e.g. approx. 7 mm×7 mm for a two-dimensional encoding, the spatial distribution of the absolute value of the complex degree of mutual coherence $|\mu_{12}|$ provided in the plane of the spatial light modulator device is a flat-top function, which has a value close to one (1) within a square shaped area of 7 mm×7 mm and a value close to zero (0) outside the square-type flat-top area. In the case of using largest sub-holograms, which are circular and which have a diameter of 7 mm, the spatial distribution of the absolute value of the complex degree of mutual coherence $|\mu_{12}|$ provided in the plane of the spatial light modulator device is a circular shaped flat-top function which has a value close to one (1) within a circular area having a diameter of 0=7 mm and a value close to zero (0) outside the circular flat-top area.

In a further preferred embodiment of the present invention, the distribution of the absolute value of the complex degree of mutual coherence can be a flat-top line segments-like distribution having a flat-top line segments-like function in case of using a one-dimensional encoding of a hologram into the spatial light modulator device. A one-dimensional encoding of sub-holograms into the spatial light modulator device uses preferably line-like shaped sub-holograms. The sub-holograms can be oriented vertically or horizontally. As already mentioned, for the present explanation of the invention vertically oriented sub-holograms are provided. In this case, the sub-holograms are vertical orientated diffractive lens-like complex-valued distributions present within the plane of the spatial light modulator device. In this case, one-dimensional encoding provides vertical parallax-only (VPO) of three-dimensional objects. For example, in case of using one-dimensional encoding and largest sub-holograms having a size of e.g. approx. 7 mm×0.1 mm, the spatial distribution of the absolute value of the complex degree of mutual coherence $|\mu_{12}|$ provided in the plane of the spatial light modulator device is a flat-top line segments-like function which has a value close to one (1) within a rod-like shaped area of approx. 7 mm×0.1 mm, i.e. a vertical extension of 7 mm and a horizontal extension of 0.1 mm, and a value close to zero (0) outside this area. If using vertical parallax-only (VPO) encoding the shape of the spatial distribution of the absolute value of the complex degree of mutual coherence $|\mu_{12}|$ is equivalent or at least similar to a line orientated vertically in the spatial light modulator device. Thus, the vertical extension of the spatial distribution of the absolute value of the complex degree of mutual coherence is e.g. approx. 7 mm and the horizontal extension of that spatial distribution is e.g. 0.1 mm. For a display device placed e.g. 600 mm in front of an observer, the horizontal extension of the spatial distribution of the absolute value of the complex degree of mutual coherence $|\mu_{12}|$ might be significant smaller than 0.1 mm, that is, even less than 0.05 mm.

Advantageously, the beam shaping unit can comprise at least one beam shaping diffuser having a phase structure generating a defined intensity distribution in its far field, which is e.g. a flat-top intensity distribution. One function of the beam shaping diffuser is to provide homogeneous illumination of the spatial light modulator device. In general, this is obtained by providing a homogeneous intensity distribution at the entrance plane of the collimation unit, which collimates the light of the tailored extended light source. Another function of the beam shaping diffuser is to provide a dynamic phase distribution in the plane of the tailored extended light source, which has to be collimated by the collimation unit. Both functions might be separated and thus provided by different optical elements or groups of optical elements. However, this could not be the most effective way regarding the bill of materials or regarding the compactness of the embodiment.

The at least one beam shaping diffuser can be designed as a beam scatter plate, a beam scatter foil or any other scatter element. The beam shaping diffuser generates a flat-top plateau-type intensity distribution in its far field, in other words e.g. several centimetres away from the beam shaping diffuser.

Preferably, the at least one beam shaping diffuser is designed as a rotating or laterally moved beam shaping diffuser. The structure having a defined phase distribution and generating a defined intensity distribution in its far field is provided on the beam shaping diffuser. This structure is preferably a scattering phase profile, which can be realized e.g. as surface relief structure. Thus, the beam shaping diffuser can form a rotating scatter plate, which provides a defined intensity distribution. The defined intensity distribution can be used to obtain a homogeneous illumination of the plane of the spatial light modulator device.

In a further advantageous embodiment of the present invention it can be provided that the beam shaping diffuser is divided into segments. The segments are provided with actuators which are controlled such that a dynamic randomized phase distribution of the light is generated.

Piezoelectric actuators (PZT) or other types of actuators can be provided as actuators for the individual segments of the beam shaping diffuser. These actuators can be used to provide a dynamic phase randomization if combined with small segments of the beam shaping diffuser.

For example, piezoelectric actuators provide fast movement at reasonable high amplitude by using tip magnifying structures. Thus, for example, fast synchronized movement in the range of approx. 100 µm can be implemented by means of such a rotating segmented beam shaping diffuser. It is also possible to use pulsed voice coil operation synchronized with the spatial light modulator device. This pulsed voice coil operation can provide reasonable amplitude of the segments movement of the beam shaping diffuser in the millisecond (ms) range.

Thus, e.g. piezoelectric actuators with lever structures, that is flexure actuators, bimorph benders providing movement up to several mm or disk-bimorph-actuators providing an amplified motion can be used to move a segment of several mm$^2$ only along ≥100 µm within 1 ms. By using a synchronized push-pull approach two cycles can be used for the operation, that is moving in one direction and moving backwards. Thus, with such an approach no rotating scatter plate is required. The lateral shift operation of the randomized phase structure is realized by a lateral movement, which is synchronized with the pulsing of the light sources. If a light source is ON, the dynamic randomized phase pattern is also ON. In other words, lateral shifts are an alternative to rotating randomized phase structures.

An extended light source can be generated advantageously by an optical system and the beam shaping unit. The extended light source emits light having the flat-top plateau-type distribution of the absolute value of the complex degree of mutual coherence and directs it to an entrance plane of the spatial light modulator device comprising the sub-holograms in order to illuminate the spatial light modulator device of the display device. The extended light source emits a complex-valued light distribution.

Advantageously, the distribution of the absolute value of the complex degree of mutual coherence, which is present in the entrance plane of the spatial light modulator device, can be generated in a plane of the extended light source by using a complex-valued sinc function-like distribution, preferably used for rectangular shaped sub-holograms, or a complex-valued Bessel function, preferably used for circular shaped sub-holograms.

The shape of the distribution of the absolute value of the complex degree of mutual coherence, which is present in the entrance plane of the spatial light modulator device, can be adaptable advantageously to the shape of the sub-holograms of the spatial light modulator device.

An aperture stop can be provided preferably in a plane of the extended light source to provide a required amplitude distribution of the light that is emitted by the extended light source. This aperture stop can be used to block disturbing light, too.

In a preferred embodiment of the present invention it can be provided that a phase function, preferably a lens function, is provided in order to shift the designed distribution of the absolute value of the complex degree of mutual coherence $|\mu_{12}|$ from a far field plane, which might be e.g. the Fourier plane of the collimated extended light source, in a plane of the spatial light modulator device.

The van Cittert-Zernike theorem describes how the absolute value of the complex degree of mutual coherence $|\mu_{12}|$ has to be calculated in the Fourier plane of the extended light source to be collimated. In general, the plane of the spatial light modulator device to be illuminated with the required mutual coherence is not the Fourier plane of the collimated extended light source. In order to allow such a transformation a lens function can be added to the complex-valued spatial light distribution of the extended light source. This additional lens function gives the opportunity to shift the designed or required distribution of the absolute value of the complex degree of mutual coherence $|\mu_{12}|$ from the Fourier plane, as given by the van Cittert-Zernike theorem, into the plane of the spatial light modulator device to be illuminated. This additional lens function can be designated as field lens function of the extended light source that is collimated by the use of a single collimating lens or by a collimation unit, which might comprise several optical elements. The field lens function shifts the absolute value of the complex degree of mutual coherence $|\mu_{12}|$, which is e.g. obtained by using the van Cittert-Zernike theorem, into the plane of the spatial light modulator device. Thus, different holographic display devices and different illumination devices of the holographic display devices may use different implementations of this lens function shifting the spatial distribution of the absolute value of the complex degree of mutual coherence $|\mu_{12}|$ into the plane of the spatial light modulator device.

Advantageously it can be provided that an amplitude mask and/or a phase mask or an attenuated phase shifting mask is provided in the plane of at least one light source or in the plane of the secondary light source.

The tailored shape of the spatial distribution of the absolute value of the complex degree of mutual coherence $|\mu_{12}|$ is provided by tailoring the complex-valued distribution of the light source collimated by a collimation unit of a holographic display device.

The light beams might be expanded to a required size of the extended light source plane. The beam waists of the light beams might be placed at the plane of the extended light source. This plane comprises e.g. a scatter element such as a rotating scatter plate, which provides dynamic phase randomization and beam shaping. In addition, this plane comprises an amplitude distribution, which might be provided by an amplitude mask. And, this plane also comprises a phase distribution, which might be provided by a phase mask, or phase shifting mask. Amplitude distribution and phase distribution can also be provided by an attenuated phase shifting mask. Furthermore, a field lens might be provided in this plane or close to this plane. This plane of the tailored complex-valued extended light source is collimated by using a collimation unit. The collimated light might be anamorphic stretched by using a volume grating backlight unit. Then, the light illuminates the spatial light modulator device. It should be ensured, that the absolute value of the complex degree of mutual coherence $|\mu_{12}|$ has the desired shape in this plane of the spatial light modulator device.

In general, the light source is an extended light source having a complex-valued distribution. An amplitude distribution can be provided by using an amplitude mask. The amplitude mask can be provided in the plane of the extended light source to be collimated. A phase distribution can be provided by using a phase mask or a so-called phase shifting mask. The phase mask or the phase shifting mask can be provided in the plane of the extended light source to be collimated. Both mask types the amplitude mask and the phase mask (or phase shifting mask) can be combined within a single mask, which is an attenuated phase shifting mask.

The amplitude mask and the phase mask (or phase shifting mask) or a combined amplitude-phase mask generate a complex-valued intensity distribution of light. In addition to the complex-valued intensity distribution of the light present in the plane of the extended light source to be collimated a temporal varying randomized phase distribution can be implemented within the plane of the extended light source, which can be collimated by a collimation unit further along the beam path. The temporal varying randomized phase distribution can be generated by using a rotating scatter plate or a fast laterally moved scatter foil providing spatially randomized phase steps within a range being greater or equal to ±π. Thus, in the plane of the extended light source a static complex-valued distribution can be combined with a randomized phase distribution, which provides fast temporal fluctuation of the local phase present within the extended light source.

In other words, a single phase-type diffuser is sufficient. This diffuser can be used in order to provide homogeneous illumination of the spatial light modulator device. And, this diffuser can be used to provide dynamic randomized phase variations. However, both functions might also be provided by separated optical elements. The beam shaping diffuser can also be used to compensate for specific intensity distributions or losses of optical power, which are e.g. due to the backlight unit. Thus, the realized intensity profile can differ from a flat-top intensity distribution. This can be carried out in a way that the intensity distribution finally obtained at the entrance plane of the spatial light modulator device is a flat-top intensity distribution. In other words, characteristics of the entire optical system can be considered.

In case of using a rectangular shaped flat-top distribution of the absolute value of the complex degree of mutual coherence $|\mu_{12}|$ the amplitude distribution has a two-dimensional sinc function. An additional apodization profile, e.g. a Gauss-type apodization profile, can be used along two directions for a two-dimensional encoding in order to consider that the primary sinc function has a limited bandwidth, that is, limited in its lateral extension. The static phase distribution is the one of a sinc function.

In case of using a circular shaped flat-top distribution of the absolute value of the complex degree of mutual coherence $|\mu_{12}|$ the amplitude distribution is equivalent to an Airy function. An additional apodization profile, e.g. a Gauss-type apodization profile, can be used along the radial extension of the designed extended light source in order to consider that the primary Airy function has a limited bandwidth, that is, limited in its lateral extension. The static phase distribution is the one that is related to an Airy function. This means the phase distribution of a complex-valued distribution of the electrical field that forms the Airy function, which is an intensity distribution only, which is proportional to the square of the distribution of the electrical field.

In the case of using a vertical parallax-only (VPO) encoding and a rod-like shaped flat-top distribution of the absolute value of the complex degree of mutual coherence $|\mu_{12}|$ the amplitude distribution has a one-dimensional sinc function. It is also possible to use two sinc functions. However, the aspect ratio of the extension of two orthogonal sinc functions could be e.g. 60 to 1. This demonstrates that along the other direction, which is the so-called incoherent direction of a one-dimensional encoded holographic display device, a plateau-type intensity distribution can be used. This means in practice that a sinc function exists along one dimension only. In other words, a one-dimensional sinc function is sufficient for a one-dimensional encoding of a hologram.

An additional apodization profile, e.g. a Gauss-type apodization profile, may also be used along two directions in order to consider that the primary sinc function has a limited bandwidth, that is, limited in its lateral extension. The static phase distribution is the one of a sinc function, which exists at least along one dimension.

The randomized dynamic phase varying part of the intensity distribution of the extended light source may be the same one for all three foregoing described embodiments. This also applies to the lens function that shifts the designed or required distribution of the absolute value of the complex degree of mutual coherence $|\mu_{12}|$ into the plane of the spatial light modulator device to be illuminated.

Advantageously, it can be provided a scatter element or the beam shaping unit in the plane of the extended light source for generating a temporal varying randomized phase distribution. The scatter element or the beam shaping unit can provide spatially randomized phase steps within a range being greater or equal to ±π. Furthermore, the scatter element or the beam shaping unit can provide a spatially randomized phase distribution, which is tailored in order to result in a flat-top-like intensity distribution present in the entrance plane of the spatial light modulator device.

Preferably, it can be provided that an apodization profile is provided to suppress side lobes in the diffraction pattern of the spatial distribution of the absolute value of the complex degree of mutual coherence. The apodization profile can be added to a complex-valued distribution of the extended light source.

In a further advantageous embodiment of the present invention it can be provided that in case of using a one-dimensional encoding of a hologram into the spatial light modulator device, a volume grating is provided to stretch the light along one dimension to generate a one-dimensional light intensity distribution.

Light that can be combined is stretched along one dimension in order to provide a one-dimensional pre-shaped intensity distribution. A volume grating, e.g. a Bragg-diffraction based volume grating, can be provided to generate such a one-dimensional intensity distribution. The volume grating can be provided on top of a transparent substrate. For example, the diffraction angle of the volume grating, which can be RGB (primary colors, red, green blue) multiplexed, may be e.g. 87 degrees, which results in a stretching factor of 20 for the one-dimensional beam stretching, which is referred to as anamorphic beam stretching. The one-dimensional stretched intensity distribution can then be used to illuminate the beam shaping unit, which generates a flat-top intensity distribution of the absolute value of the complex degree of mutual coherence $|\mu_{12}|$ in its far field. In other words, for a one-dimensional encoding of a hologram a light line has to be realized in order to span a sweet spot in an observer plane. The required stretching of the light can be implemented in the illumination device by using a volume grating based beam stretching, e.g. by using a 10× volume grating. For example, a volume grating geometry of e.g. 84.26 degrees in PMMA (polymethylmethacrylate) as the transparent substrate would avoid the requirement of a complex anti-reflection coating on the transparent substrate. It is also possible to use other stretching components as anamorphic prisms in series, e.g. three to four prisms, or a Gauss to line flat-top beam shaper too.

Alternatively, in case of using a one-dimensional encoding of a hologram into the spatial light modulator device, a Powell lens can be provided to stretch the light along one dimension to generate a one-dimensional light intensity distribution.

A Powell lens can also be used to generate a light line out of a light beam, e.g. a Gauss laser beam. The light beams emitted by the at least one light source can illuminate the Powell lens to generate a one-dimensional light line.

The most compact way to illuminate the beam shaping unit with a one-dimensional light line or light intensity distribution is to use a volume grating, which can be based on Bragg diffraction, and which introduces the required beam stretching.

A tailored spatial distribution of an absolute value of a complex degree of mutual coherence $|\mu_{12}|$ of one-dimensional encoded display devices provides an important advantage. Adjacent columns or rows of the spatial light modulator device to be illuminated are mutually incoherent. The effect of this tailored spatial distribution of the absolute value of the complex degree of mutual coherence $|\mu_{12}|$ is that the images of horizontally/vertically adjacent object points generated on the retina of an eye of an observer, in other words the images of object points generated by adjacent columns/rows of the spatial light modulator device, are mutually incoherent. Thus, the images of adjacent object points do not cause coherent retinal inter object point crosstalk. In other words, coherent retinal inter object point crosstalk is completely suppressed along the horizontal/vertical direction of the three-dimensional image generated in space. The term "retinal inter object point crosstalk" is due to the coherent superposition of adjacent point spread functions (PSF), which finally takes place at the retina of an eye of an observers. Adjacent object points generated in space are transformed to adjacent point spread functions present at the retina of an eye of a user/observer looking at the object points. The interference pattern generated at the retina of the eye of the observer depends on the complex-valued distribution of adjacent point spread functions representing two adjacent 3D object points generated in space by using a sub-hologram encoding technique, as e.g. disclosed in WO 2004/044659 A1. For instance, even slight phase variations can cause a significant change in the intensity distribution obtained at the retina of the eye of the observer and thus can be detected by the observer. An example describing this superposition of adjacent point spread functions in dependence on the mutual coherence and the mutual phase difference can be found in section 4.1.1 of the document of G. Fütterer, "UV-Shearing Interferometrie zur Vermessung lithographischer "Phase Shift" Masken and VUV-Strukturierung", Progress in modern optics, Vol. 4, IOIP, MPF, Universität Erlangen-Nürnberg, 2005, ISBN: 3-932392-61-2.

In general, coherent long lateral distance interference effects are suppressed by using sub-hologram size or shape tailored distribution of the absolute value of the complex degree of mutual coherence $|\mu_{12}|$ in the plane of the spatial light modulator device (SLM).

In a preferred embodiment of the present invention it can be provided that static or dynamic wave front shaping is used to provide increased depth of field containing a defined distribution of the absolute value of the complex degree of mutual coherence.

The object of the present invention is further achieved by a display device.

A display device, particularly a holographic display device, for the reconstruction of two-dimensional and/or three-dimensional objects or scenes is provided. The display device comprises an illumination device according to the present invention and a spatial light modulator device. The spatial light modulator device is arranged downstream of the illumination device, seen in the direction of propagation of light.

The display device can advantageously comprise a field lens or a compound field lens. The compound field lens can comprise at least one volume grating.

Moreover, the object of the present invention is further achieved by a method for illuminating a spatial light modulator device with a light intensity distribution having defined coherence properties. Sub-holograms are used for encoding a hologram in the spatial light modulator device. The method comprises the following steps:

Emitting light by at least one extended light source,
Collimating the light propagating behind the at least one extended light source by a collimation unit
Generating a flat-top plateau-type distribution of an absolute value of a complex degree of mutual coherence of the light in a plane of the spatial light modulator device by a beam shaping unit, where the flat-top plateau-type distribution of the absolute value of the complex degree of mutual coherence has a shape that is at least similar to a shape of the largest sub-hologram used for encoding of object points in the spatial light modulator device
Illuminating the spatial light modulator device with the flat-top plateau-type distribution of the absolute value of the complex degree of mutual coherence of the light.

There are now various possibilities for advantageously configuring and refining the teaching of the present invention and/or combining the embodiments described above with one another—as far as it is possible. In this regard, reference is made on the one hand to the patent claims dependent on the independent patent claims, and on the other hand to the following explanation of the preferred exemplary embodiments of the invention with the aid of the drawing. In connection with the explanation of the preferred exemplary embodiments of the invention with the aid of the drawing, preferred configurations and refinements of the teaching are in general also explained.

BRIEF DESCRIPTION OF THE DRAWINGS

In the drawing:

FIG. 14 is related to the case of a one-dimensional encoding shown in FIG. 9; a Gauss apodization is included;

Like reference designations denote like components in the individual figures and accompanying description, if provided. In the following sections, the designations "in front of" and "behind", e.g. in front of the spatial light modulator device, mean the light seen relating to the propagation direction of the light.

DETAILED DESCRIPTION OF THE INVENTION

Figure 1:
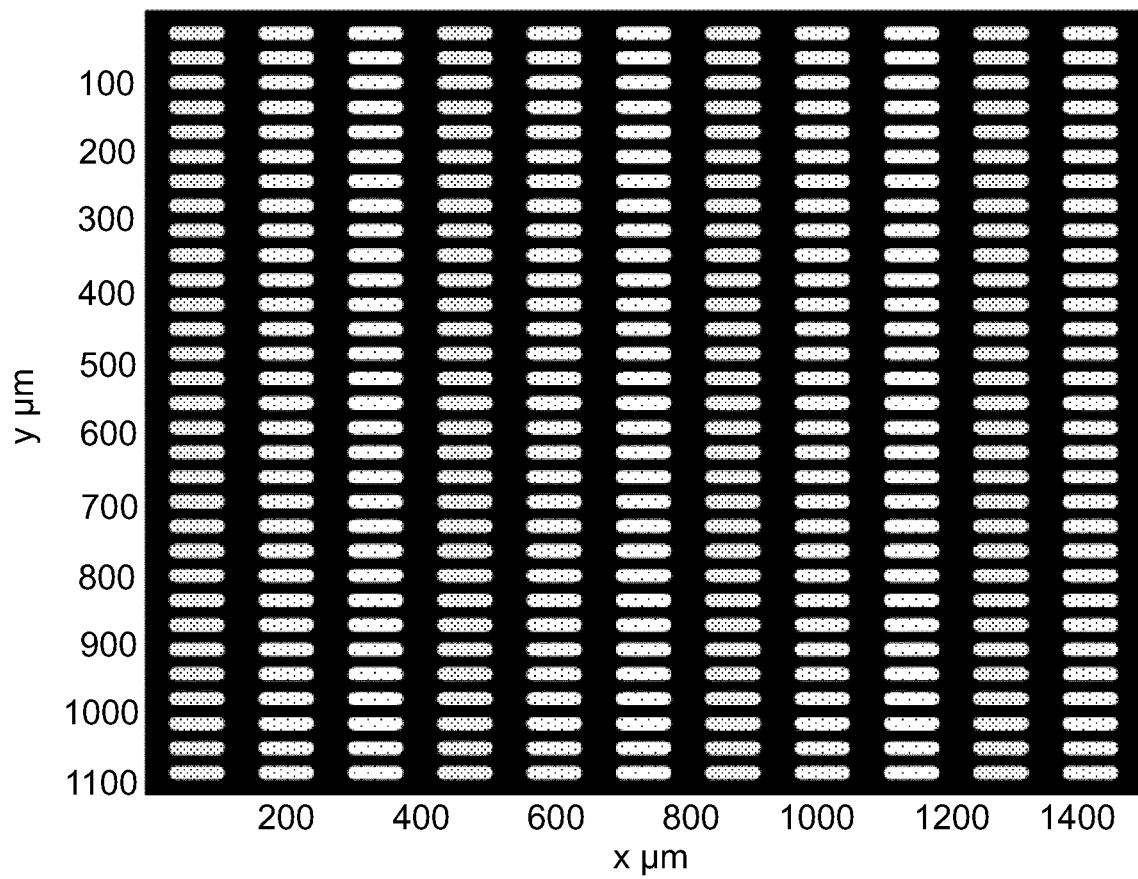
FIG. 1 shows a pixel arrangement of a spatial light modulator device according to the present invention.

FIG. 1 shows a pixel arrangement of a spatial light modulator device, hereafter referred to as SLM, which can be used for a vertical parallax-only (VPO)-type one-dimensional encoding of holographic three-dimensional (3D) objects or scenes. This represents a clear aperture distribution of a sandwich-type complex-valued SLM. The SLM can be formed, for example, by arranging a transmissive amplitude SLM in front of a transmissive phase SLM (A+P-SLM), seen in the direction of propagation of light. As can be seen from this FIG. 1 a vertical pixel aperture is much smaller than a horizontal pixel aperture. This can be used for column-type one-dimensional sub-holograms. The sub-holograms provided by the SLM may be one-dimensional column-like diffractive lenses. A distance between an entrance aperture of the A+P-SLM sandwich and an exit aperture should not exceed a factor ten times smallest aperture of the pixels used. This applies to a refractive index existent between the two SLM A+P of e.g. n=1.5. In this example the small vertical extension of the clear aperture of the pixels shown has to be considered. The different filling pattern used for adjacent columns of the SLM of FIG. 1 indicates the use of vertical orientated color filter stripes. The use of RGB (red, green, blue)-type color filter stripes can be an option for a one-dimensional hologram encoding, which is referred to as VPO. The shown pixel size and pixel shape refer to a holographic display device using vertical parallax-only, which may be placed at a distance of e.g. 0.6 m in front of an observer.

In the following section exemplary layouts are used to describe the tailoring of a light source provided in an illumination device according to the present invention. A holographic display device may be used having a diagonal of 14" that is d=355 mm. The aspect ratio may be 16:9 that results in a width of approximately w=310 mm and a high of approximately h=175 mm. A field lens used in the display device may have a focal length of $f_{cFL}$=1 m. The term cFL in $f_{cFL}$ indicates a compound field lens. For such a compound field lens a volume grating field lens can be used, which comprises a first volume grating element realizing, for example, a plane wave 0 degree to plane wave 30 degrees pre-diffraction within a medium having a refractive index of e.g. n=1.5 and a second volume grating element having a geometry of reconstruction, for example, of 30 degrees plane wave within a medium having a refractive index of e.g. n=1.5, to a focus at e.g. 0 degrees and f=1 m in air. The combination of these two volume grating elements, 0 degree/30 degrees and 30 degrees to focus, results in a volume grating based on-axis field lens.

To reconstruct and display a colored three-dimensional image in space the illumination device can comprise three light sources with one light source for each color (RGB). The wavelengths emitted from the three light sources and used in order to illuminate the SLM are, for example, $\lambda_B$=457 nm, $\lambda_G$=532 nm and $\lambda_R$=647 nm. The pixel geometry may be defined by by $\Lambda_x=135$ µm, $\Lambda_y=35$ µm, $CA_x=85$ µm and $CA_y=18$ µm, where x defines the horizontal direction, y defines the vertical direction, $\Lambda$ is the pitch of the SLM and CA is the clear aperture of a single pixel. The amplitude distribution of the SLM plane can be equivalent to the amplitude distribution shown in FIG. 1. The amplitude distribution of the SLM panel shown can be one of an amplitude modulating panel, one of a phase modulating panel or one of an amplitude+phase modulating complex-valued SLM sandwich.

A complex-valued SLM sandwich, which e.g. uses a phase modulating panel in front of an amplitude modulating panel, can be used for a two-dimensional (2D) encoding of a holographic three-dimensional (3D) scene. In other words, the basic pixel arrangement shown in FIG. 1 can also be used for the explanation of a two-dimensional encoding of a hologram.

A complex-valued SLM sandwich can be provided with a color stripes arrangement, e.g. a vertically orientated color stripes arrangement, comprising color filter stripes arranged in columns. An SLM sandwich having column-like interlaced RGB color filter stripes can be used for a one-dimensional (1D) vertical-parallax-only (VPO) encoding of a holographic three-dimensional scene. It is also possible to use a horizontally orientated color stripes arrangement. This type of SLM sandwich having alternating RGB color filter stripes can be used for a one-dimensional (1D) horizontal-parallax-only (HPO) encoding of a holographic three-dimensional scene. The embodiment that is shown in FIG. 1 can also be used for the explanation of the one-dimensional encoding of a hologram.

It is important to realize that there are two different situations here, the two-dimensional encoding (hereafter referred to as 2D encoding) and the one-dimensional encoding (hereafter referred to as 1D encoding). For 1D encoding, there is a sweet spot in one direction in an observer plane, which can be e.g. the horizontal direction. Within the other direction, which can be e.g. the vertical direction, there is a viewing window or a visibility region in the observer plane through which an observer can see or view the vertical parallax of a three-dimensional scene. This is equivalent to a vertical-parallax-only (VPO) reconstruction of a holographic scene. Two different views are presented to the two eyes of the observer.

The viewing window/visibility region can be spanned, e.g., between the 0th and one of the 1st diffraction orders of the diffraction pattern generated by the SLM. For 1D encoding only the vertical direction or the horizontal direction has to be considered, depending on the required parallax. For the sake of simplicity, the following explanations in the descriptions refer to a vertical-parallax-only hologram or reconstruction. Different sizes of the viewing window, e.g. VW_x_blue=3.4 mm, VW_y_blue=13.1 mm, VW_x_green=3.94 mm, VW_y_green=15.2 mm, VW_x_red=4.8 mm and VW_y_red=18.5 mm, can be obtained with the pixel geometry and the focal length of the field lens disclosed above. It can be realized that for 2D encoding the horizontal extension of the viewing window is slightly larger than the entrance pupil of the human eye, which is e.g. $\Pi_{eye}=3$ mm only. Thus, the vertical extension of the viewing window is larger than required. The accuracy of a tracking unit provided in the display device for detecting of the position of the eye of the observer and directing the light onto the right position of the eye of the observer in the observer plane is e.g. 1 mm. This means that a vertical extension of the viewing window of e.g. VW_y_blue=13.1 mm that is equivalent to an angular range of $\theta_{vertical}=\pm0.375$ degrees only, should be acceptable.

The incoherent direction of the light, which forms the sweet spot of the 1D encoded display device, has an angular spectrum of mutually incoherent plane waves of e.g. ±0.5 degrees. This is provided in the illumination unit, which is e.g. a backlight illumination unit. This means that there is a wide angular spectrum of plane waves already. For example, if it would be chosen a minimum width of the viewing window and the sweet spot of 10 mm at a focal length of 1 m than this would be equivalent to an angular range of ±0.286 degrees only. This means that an angular spectrum of mutually incoherent plane waves can be used along the incoherent direction that spans an angular range of ±0.286 degrees only. As already known, the angular range that e.g. might be spanned due to diffraction, e.g. of a single plane wave hitting the SLM, and the angular spectrum of plane waves, or the angular spectrum of mutually incoherent plane waves, are different terms.

The angular resolution of the human eye is $\frac{1}{60}$ degrees, which means $\pm\frac{1}{120}$ degrees. Within the coherent direction, which might be the vertical direction (for 1D encoding) or the vertical and the horizontal directions (for 2D encoding), the angular spectrum of plane waves of the illumination light of the SLM has to be less or equal to this angular range in order to avoid a smearing of the reconstructed three-dimensional scene.

For a 1D encoded display device the illumination device can comprise at least one slit-like light source. For example, it might be assumed a simple illumination which uses an off-axis parabolic mirror element having, for the sake of simplicity only, the same focal length as the combined volume grating field lens in the display device, that is $f_{illumination}=1$ m. An angular range of $\pm\frac{1}{120}$ degrees is equivalent to a light source having a lateral extension of 0.3 mm. And an angular range of ±0.286 degrees is equivalent to a light source having an extension of 10 mm.

In other words, if a focal length of $f_{illumination}=1$ m is used fora 2D encoded display device, an extended light source having a diameter of $\emptyset_\otimes=0.3$ mm can be implemented. The angular spectrum of plane waves of the light used to illuminate the SLM in a coherent way has always to be within the range of $\pm\frac{1}{120}$ degrees only, regardless of the focal length of the field lens used in the display device. This differs from the incoherent direction that is used in a 1D encoded display device. The sweet spot has to span an extension of 10 mm. This depends on the focal length of the field lens used in the display device.

Thus, a light source area of e.g. dx=0.3 mm and dy=10 mm can be used for a 1D encoded display device, which provides vertical-parallax-only (VPO) hologram and a collimation unit with a focal length of 1 m. The light source area resembles a slit, which has an aspect ratio of 1 to 33.3 in that example.

A dynamic scatter plane in the illumination device has the function to provide a dynamic randomized phase distribution. An option could be to use a rotating scatter element, as a rotating scatter plate, within the illumination device of a preferably holographic display device.

For 2D encoding, a light beam or three light beams (if three light sources are provided) might be focussed onto a plane of an extended light source to be collimated and which is a part of the illumination device. Alternatively, an exit plane of a multi-mode fiber, which is used as a primary light source, can be imaged onto the plane of the extended light source to be collimated. As disclosed before, for 2D encoding an extended light source having a diameter of $\emptyset_\otimes=0.3$ mm should be advantageously generated.

The following explanation refers to the adaptation of the angular spectrum of plane waves for each color separately.

Several options exist in order to achieve a RGB (colored) illumination. Three light beams emitted by three light sources can be focussed at the same scatter plane or each color can have an individual light source plane. A color combining unit can be used in front of an achromatic or apochromatic optical system, which can be used for a collimation of the light. Thus, the angular spectrum of plane waves can be optimized for each color separately. The drawback of using a single scatter plate for all colors is that a single scatter plane introduces a scatter angle that depends on the wavelength used. Thus, the blue light will generate a reasonable homogeneous intensity distribution within an aperture of a collimating unit or within an exit plane of the collimation unit, while the red light will generate a much larger scatter angle and thus much higher loss of optical power.

If a complex-valued SLM is used in the display device that is based on the beam combing of adjacent phase pixels, the optimal preparation of the spatial distribution of the absolute value of the complex degree of mutual coherence requires different complex-valued distributions within the light source plane for each color.

Three separated light source planes can be realized within a very compact arrangement. For example, an end of an optical fiber acting as light source, which can be a multi-mode or a mono-mode optical fiber, can be imaged onto a dynamically randomized phase plane by using a so-called Steinheil triplet. For example imaging pairs of achromatic doublets or aspheric lenses can be used which do not realize a 1:1 imaging but e.g. a 1:5 imaging instead. Aspheric lenses optimized for one of the three design wavelengths can also provide a compact setup within an illumination device using RBG separated coherence preparation.

Back to the exemplary embodiment disclosed before, the use of a focal length of f=1 m for the collimation unit and a focal length of f=1 m for the field lens results in a diameter of the light source of $\varnothing_\otimes$=0.3 mm if 2D encoding is used, and a light source size of dx=0.3 mm and dy=10 mm if 1D encoding is used. It can be seen that e.g. an elliptical beam profile of a laser diode as light source having an ellipticity of e.g. 1:3 can be orientated at a right angle in order to maximize the energy transfer. A further stretching of the light is required to realize an aspect ratio of e.g. 1:33, which can be required for the light source used within a 1D encoded display device. Refractive or diffractive beam shaping or a cylindrical lens can be used to obtain a one-dimensional stretching of the light.

The use of a diffractive backlight unit in the illumination device changes the discrete size of the light source. For example, a collimating lens with f=400 mm might be used in front of a volume grating based backlight unit, which provides two times 10× anamorphic beam stretching.

The angular spectrum of mutually incoherent plane waves is a boundary condition that has to be considered as already disclosed. The angular spectrum of plane waves of light illuminating a grating is—due to the grating diffraction equation—changed in dependence on the diffraction angle and can only be treated as unchanged for small diffraction angles. The distribution of the absolute value of the complex degree of mutual coherence has to be chosen as low as possible, i.e. at mutual distances that should not interfere with each other. The object point placed at the largest positive z-value (closest to the observer) defines the area of mutual coherence to be used, which should be the size or shape of the largest sub-hologram. For mutual distances of the pixels of the SLM, which should interfere, a value of the absolute value of the complex degree of mutual coherence $|\mu_{12}|$ close to one has to be realized. The realization of reduced mutual coherence at mutual distances of the pixels of the SLM, which should not interfere with each other, means to use a tailored angular spectrum of plane waves. In other words, the SLM has to be illuminated with an angular spectrum of plane waves that is not a plane wave. A point light source would not be the best way to realize that. Therefore, a light beam quality factor of M>1 might be acceptable as long as the angular spectrum of plane waves finally present at the entrance plane of the SLM is within the required range, which is e.g. 1/60 degrees along the coherent direction and e.g. 0.5 degrees along the incoherent direction. The value for the incoherent direction only applies to a one-dimensional encoding. This means that an extended light source is preferred. And an extended light source is characterized by the angular spectrum of mutually incoherent plane waves. This has to be realized in a defined way. That is the reason why dynamic scatter elements can be implemented. These elements can be e.g. mounted on PZT (e.g. made of lead-zirconium-titanate) or voice coil elements realizing shift-type lateral movements along one dimension or along two dimensions. Another option may be to mount scatter elements on a motor and realize a rotating scatter plate. Both concepts can be used within an illumination device. The angular spectrum of plane waves used within a wedge-type backlight unit based on a 10× beam stretching is ten times the angular spectrum of plane waves required for the illumination of the SLM. A value of 1/6 degrees is a practical value for the angular spectrum of plane waves because of the fact that the angular spectrum of plane waves will be reduced by a factor of 10 if using a 10× magnification within the wedge-type backlight unit. Thus, an input value of 1/6 degrees will be transformed to an output value of 1/60 degrees using 10 times beam stretching.

Due to the grating equation, which can be used to describe the angular spectrum of plane waves aspect of e.g. a diffractive wedge-type backlight unit, a slight non-symmetric demagnification of the angular spectrum of plane waves is obtained. For example, an entrance angle of −(84.2608±0.7) degrees results in an exit angle of (0+0.0743−0.0657) degrees. This means that the squeezing of the angular spectrum of plane waves, which is due to the 10× beam stretching, is slightly non-symmetric but approximately 1/10. For angles that are slightly larger than 84.2608 degrees the beam stretching factor is slightly larger than 10 and for angles that are slightly smaller than 84.2608 degrees the beam stretching factor is slightly smaller than 10. This results in a slightly non-symmetric squeezing or demagnification factor of the angular spectrum of plane waves, which is approximately 1/10.

An element that provides a fast statistical randomized change of the phase values present within the area of the extended light source has to be adapted on the required frame rate (frames per second, fps). For example, RGB for four observers and for each left and right eyes at 60 Hz fps results in 24×60 Hz=1440 Hz. That value has to be provided by a tracking unit, which can be e.g. an in-plane rotating LC (liquid crystal) based active controlled grating unit. A RBG time-sequential SLM has to work at 1440 Hz/4=360 Hz. The time window that can be used for "light source ON", is slightly smaller than 1/1440 s, that is 1/1600 second only. In general, laser diodes as light sources can provide this. But if lasers are used as light sources, which cannot be modulated so fast, fast shutters can be used. These elements can be based e.g. on LC, LC dispersed volume gratings, acoustic optical modulators (AOM), saturation dependent absorptive filters, on PZT or even on MEMS (micro-electro-mechanical system) technology. For example, PZT elements realize frequencies of 24 kHz. These frequencies can also be obtained by using voice coil actuators. Only sub-100 µm-movement might be required in order to provide sufficient randomization of the light sources phase distribution. Discrete values are dependent on the discrete embodiments. The end of a multi-mode fiber can be arranged in front of the dynamic scatter plane. It is also practical to image the three ends of three optical multi-mode fibers onto the dynamic scatter plane. This gives the opportunity to implement slightly shifts between the red, green and blue light sources which results in slightly different exit angles provided behind the collimating unit (e.g. comprising an achromatic lens) and used for RGB independent alignment. Thus, e.g. the overall diffraction efficiency of the backlight unit of the illumination device can be optimized. Known color combining prism systems, as e.g. three CMOS (complementary metal-oxide-semiconductor) chip camcorders, or a set of dichroitic filters can be used in front of the collimation unit. The collimation unit can comprise e.g. an achromatic lens, which is combined with a beam shaping unit increasing the overall light efficiency by providing e.g. a so-called flat-top intensity distribution. These elements do not provide a constant phase value within the area of reasonable constant intensity that illuminates e.g. the collimating achromatic lens of the collimation unit. Thus, in the exit plane of the achromatic or even apochromatic lens of the collimation unit a non-ideal phase distribution will be exist. Several options can be provided to compensate for undesired phase distributions that would decrease the image quality of holographic three-dimensional objects.

One option would be to include the collimating lens of the collimation unit into the Merit function optimization, which is well-known and already implemented in several standard optical simulation software products. Thus, the phase distribution illuminating the volume grating based backlight unit can be improved further. Furthermore, the combination of three wavelengths, as e.g. $\lambda_B=457$ nm, $\lambda_G=532$ nm and $\lambda_R=647$ nm, in front of a dynamic scatter element as beam shaping unit makes it possible to use three color specific beam shaping elements, which each only act on a single allocated color. Thus, the intensity distribution of the light spot existing in the plane of the dynamic scatter element, which is the plane of the light source to be collimated, can be optimized for each color independently. Hence, optimized color balancing, that is e.g. homogeneous white, can be obtained within the entire SLM plane.

Figure 2:
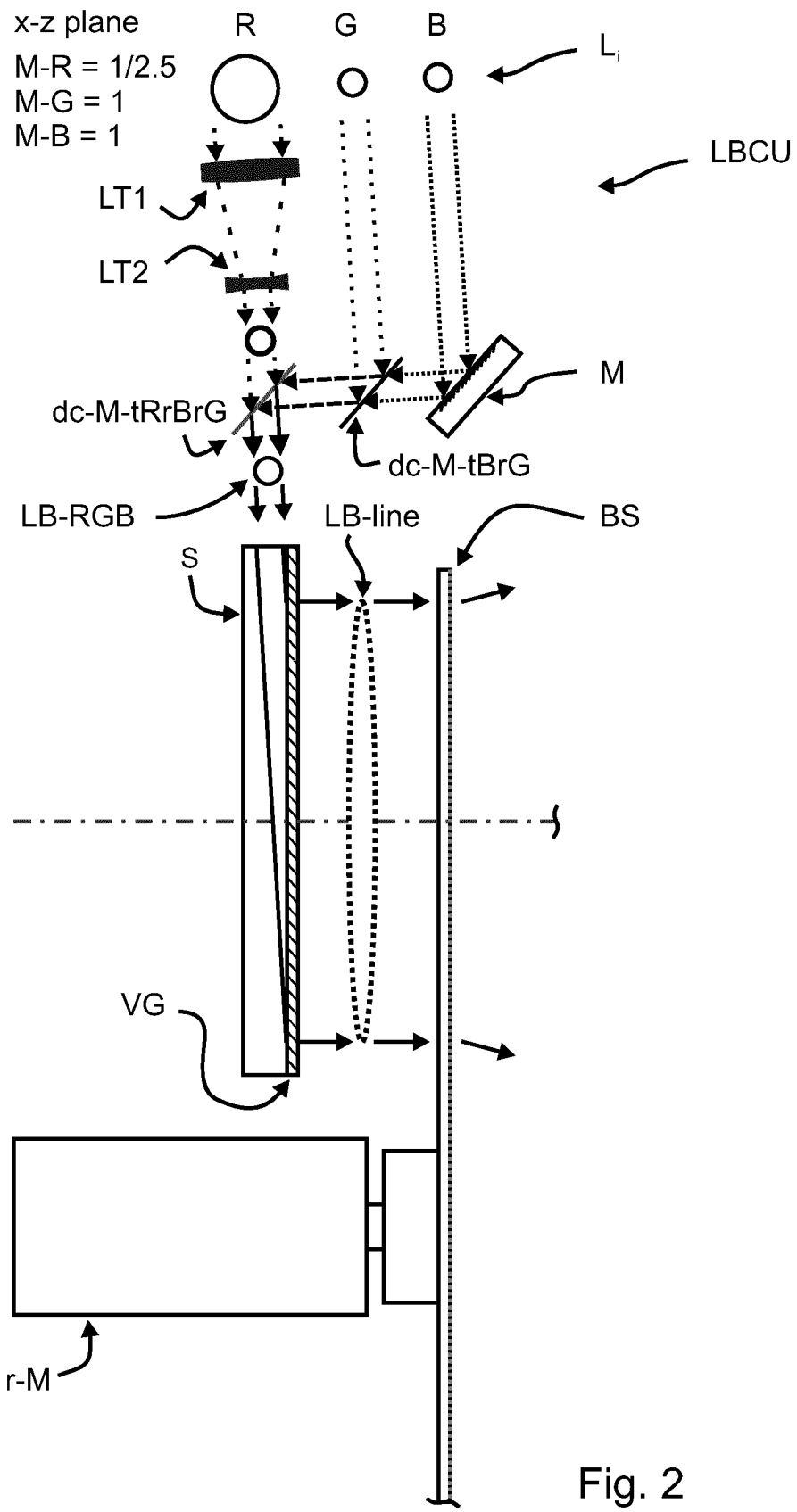
FIG. 2 shows a first embodiment of an illumination device according to the present invention.

For example, FIG. 2 shows an embodiment that uses a single, e.g. surface relief-type, beam shaping diffuser (BS). The beam shaping diffuser can provide a flat-top intensity distribution, which is e.g. rectangularly shaped within the entrance plane of e.g. an achromatic collimating lens.

A second option would be to measure the phase distribution emitted by the volume grating backlight unit that is the phase distribution finally illuminates the SLM. A look-up table (LUT) can be used to store the compensation values. These compensation values can be used as correction values for the calculation of the complex-valued wave field generated by the SLM. The phase and the intensity distributions illuminating the SLM can be measured. The results can be used as correction data in order to provide the designed phase values and amplitude values in the plane of the viewing window of a display device.

The measurement of the wave field emitted by the backlight unit of the illumination device also includes the local exit angle of the three light colors RGB. The local exit angle is perpendicular to the local wave front that is the local phase distribution. In other words, the measurement of the phase distribution of the three light colors RGB results in the distribution of the local exit angles of the three colors.

Slightly different illumination angles of the SLM can be compensated by a tracking unit of the display device. Such a tracking unit take the compensation values from a look-up table. Such a look-up table might also contain values to correct for aberrations existing within the display device. This also includes compensation, which could be required to eliminate the difference between the recording situation and the use within the display device of e.g. multiplexed field lenses. Recording means to expose the holographic recording film to an interference pattern, this is formed by superimposed waves. A result of the exposure is the modification of the recording material. Local changes of the refractive index n are generated. The material can change the thickness and thus the geometry of the reconstruction. How significant the effect is depends on the discrete material used. The shrinkage of the photopolymer e.g. used for the volume gratings in the display device or an additional cover glass having a thickness of e.g. 1 mm for carrying at least one volume grating can reduce the Strehl ratio of a point spread function (PSF) realized by the different volume grating field lenses. In other words, a field lens arranged behind the SLM might not generate an ideal focus, which might be the result of the shrinkage of a holographic recording film. Hence, it is preferred to use low shrinkage material. Bragg diffraction based volume gratings can be used e.g. within the collimation unit, the backlight unit and the field lens of a holographic three-dimensional display device. Although pre-compensating computer-generated holograms (CGH) can be used in order to compensate for these aberrations during the exposure already, the complex-valued SLM and the tracking unit can be used to optimize the point spread function finally obtained. Individual measured display devices might use individual correction values within the look-up table. Aberrations can also be considered during the calculation of the hologram data.

The previous disclosure in few words, it can be used an increased size of the light source provided in the illumination device in front of a collimation unit. If the SLM is illuminated with collimated light provided by a collimating lens or a collimating off-axis parabolic mirror of a collimation unit, the light source should have an area that is equivalent to 1/60 degrees. A collimating off-axis parabolic mirror can be used in order to reduce the volume occupied by the collimation unit.

If further elements are used in the illumination device that change the angular spectrum of plane waves, this has to be considered. If a backlight unit is used in the illumination device that implements 10 times anamorphic beam stretching along two directions, an angular spectrum of plane waves of up to 1/6 degrees can be used to illuminate this backlight unit.

A practical diameter of the tailor-made extended light source could be: $\emptyset_{\otimes}=2\times f_{Collimation}\times\tan(1/12$ degrees). For example, if a collimating lens is used that has a focal length of $f_{Collimation}=400$ mm, a practical diameter is $\emptyset_{\otimes}=1.16$ mm.

FIG. 2 shows an illumination device in which three light beams emitted by three light sources $L_i$ (i=1, 2 and 3), e.g. three laser light sources, are combined in order to generate a coherent white light source. R indicates a red light source, G indicates a green light source and B indicates a blue light source. The reference sign M indicates a mirror element. After reflecting the blue light beam by the mirror element M, a dielectric mirror element dc-M-tBrG is provided to combine the blue light beam B and the green light beam G. After that combination of the light beams B and G a dielectric mirror element dc-M-tRrBrG is provided in order to combine the red light beam R with the blue light beam B and the green light beam G. A telescope system comprising a convex lens LT1 and a concave lens LT2 is provided to resize the red light beam. In this example, the magnification of the red light beam can be e.g. M−R=1/2.5. This means that the red light beam has to be reduced in its size by a factor of 2.5. In this manner, all light beams have the same size at an exit plane of a light beam combining unit LBCU. This example shows that differences of the initial beam diameter are not a problem and that a change can be implemented easily. Which light beam has to be expanded or reduced in size or which discrete factor has to be used depends on the discrete light sources used. For example, it might also be the case that the red beam diameter has to be increased. However, it is preferred to use similar light beam diameters. Discrete values are dependent on the discrete embodiment that is used in order to generate the tailor-made extended light source. Thus, it might also be possible that the diameter of the red light beam is 1.25 times larger than the diameter of the green light beam, which is e.g. 1.25 times larger than the diameter of the blue light beam. However, the design target is the tailor-made distribution of the absolute value of the complex degree of mutual coherence $|\mu_{12}|$, which has to be provided in the SLM plane.

The light beam combining unit LBCU comprises the telescope system having the convex lens LT1 and the concave lens LT2, the mirror element M, the dielectric mirror element dc-M-tBrG and the dielectric mirror element dc-M-tRrBrG.

In addition, a combined light RGB beam LB-RGB is stretched along one dimension in order to provide a one-dimensional pre-shaped light intensity distribution LB-line. For stretching the combined light RGB beam LB-RGB a volume grating VG, e.g. a Bragg diffraction based volume grating, is provided in the beam path. The volume grating VG is RGB multiplexed. Furthermore, the volume grating VG is applied on top of a transparent substrate S. The diffraction angle of the RGB multiplexed volume grating VG might be e.g. 87 degrees, which results in a factor of 20 for the one-dimensional anamorphic beam stretching. The one-dimensional stretched intensity distribution LB-line is used then to illuminate a beam shaping unit. The shape of the stretched beam, which has had a circular shape before, is illustrated by a thin dotted line marked with the reference sign LB-line. The beam shaping unit comprises a beam shaping diffuser BS and a motor r-M. The beam shaping diffuser can be designed e.g. as a beam scatter plate or a beam scatter foil or as a dynamic beam shaping diffuser. The beam shaping diffuser BS, here arranged in the plane of a primary extended light source LB-line, which has an aspect ratio of e.g. 1:33, is provided in order to generate a flat-top intensity distribution in the plane of a collimation unit (not shown here). The collimation unit is arranged at her focal distance f behind the beam shaping diffuser BS. The light of an exit plane of the collimation unit propagates e.g. to a backlight unit comprising at least one volume grating, which stretches the wave field or the light to a size of the SLM to be illuminated. In other words, the beam shaping diffuser BS, which is shown in FIG. 2, finally ensures a homogeneous illumination of the SLM, i.e. an illumination with a flat-top intensity distribution.

Here, it must be distinguished between the flat-top intensity distribution present in the exit plane of the collimation unit (and further along the beam path the flat-top intensity distribution present in the entrance plane of the SLM) and the flat-top distribution of the absolute value of the complex degree of mutual coherence $|\mu_{12}|$ present in the entrance plane of the SLM.

of the absolute value of the complex degree of mutual coherence in its far field, that is, e.g. several cm away within a collimating unit used in the following beam path.

A randomized scattering phase profile is provided by the surface relief profile of the beam shaping diffuser BS. This phase distribution is changed dynamically because the beam shaping diffuser BS is designed e.g. as a rotating beam shaping diffuser.

Thus, the rotating beam shaping diffuser BS provides a defined intensity distribution in its far field, which can be used to obtain a homogeneous illumination of the SLM plane. Furthermore, the rotating motor r-M is provided to generate a dynamic phase randomization by rotating the beam shaping diffuser BS. The movement of the beam shaping diffuser BS should be reasonable fast. In other words, several different randomized phase patterns, preferable more than 100, should be generated in the plane of the tailor-made extended complex-valued light source within the time window of a single frame of the SLM, which is e.g. 4 ms.

For 1D encoding a line-like extended light source is required. This has to be realized in order to generate a spatial coherence having a large extension along the direction of the sub-hologram and a small extension along the direction of the sweet spot. The sweet spot is spanned to use an angular spectrum of mutual incoherent plane waves of e.g. ±0.5 degrees. The sweet spot is generated by using an angular spectrum of mutual incoherent plane waves and not by the diffraction of a single plane wave.

The one-dimensional stretching can be implemented by using a 10× volume grating based beam stretching.

A volume grating geometry of e.g. 84.26 degrees, which e.g. is realized in PMMA (polymethylmethacrylate), avoids the requirement of a complex and expensive anti-reflection coating. Alternative embodiments, which can provide a required stretching of the light, e.g. are anamorphic prisms in series, i.e. to use e.g. three to four prisms in series, or a Gauss-to-line beam diffuser. A Powell lens can also be used in order to generate a line out of a Gauss-type laser beam.

The operation of the line beam diffuser is practical. The direct combined beam can illuminate the Powell lens or the one-dimensional beam diffuser followed by an optical system, e.g. a lens, collimating this light. This Powell lens or a one-dimensional line diffuser is then followed by the beam shaping diffuser BS realizing a homogeneous illumination of the entrance aperture of a collimation unit. At the second diffuser, if a second diffuser is used too, there is a line-like intensity distribution, which has a height of e.g. 1.2 mm only. That is a simple system that will cause only small losses of energy.

In detail, a single beam shaping diffuser can generate a flat-top intensity distribution that is finally present in the entrance plane of the SLM and—at the same time—a randomized, dynamic phase distribution required in the plane of the tailored complex-valued extended light source required in order to provide the desired distribution of the absolute value of the complex degree of mutual coherence $|\mu_{12}|$ in the plane of the SLM. This flat-top plateau-type distribution of the absolute value of the complex degree of mutual coherence $|\mu_{12}|$ should have the shape of the largest sub-hologram used. However, beam shaping and dynamic phase randomization can also be separated. However, this is not absolutely necessary and it might not achieve a compact embodiment. A compact way is to illuminate the beam shaping diffuser, which also acts as a dynamic phase randomizer, with a one-dimensional line-like intensity distribution, which is provided by a volume grating such as a Bragg diffraction based volume grating introducing the required beam stretching. An example is shown in FIG. 2.

Alternatively, scatter based approaches can be used as disclosed briefly. In this case, all primary light sources R, G, B are formed in order to have the same beam diameter, as e.g. 1.2 mm. An achromatic, line generating beam diffuser is illuminated with the combined light beams having e.g. approximately the same diameter. This line generating beam diffuser spreads the light beam e.g. in one direction only. In this example, made for an exemplary focal length of a collimation unit illuminating the SLM of $f_{CL}=1$ m and a focal length of a combined field lens provided behind the SLM of $f_{cFL}=1$ m, the light beam has a size of 1.2 mm×20 mm after being collimated by a collimation lens placed at its focal distance to the line beam diffuser.

Another option to generate a line-like intensity distribution having a low divergence can be to illuminate a Gauss-to-line beam shaping diffuser with e.g. a circular light beam. A line is generated with a divergence angle of e.g. ±30 degrees. Then, a collimation unit is arranged behind this Gauss-to-line beam shaping diffuser. Behind this collimation unit there is a collimated line-like intensity distribution. This line-like intensity distribution acts as an extended light source. And, it can be used in order to illuminate another beam shaping diffuser BS providing the flat-top intensity distribution finally illuminating the SLM. This distribution e.g. is rectangular and can have an aspect ratio of 2:1.

A beam shaping diffuser rotates e.g. at 10000 rpm to 30000 rpm in order to provide reasonable phase randomization, which is required for e.g. 2 ms to 4 ms laser-ON pulses of the primary colors of the flashing illumination. A 5 degrees angular spread can be used. The light propagating behind the beam shaping diffuser BS is further modified. In more detail, the plane of the rotating beam shaping diffuser BS is imaged on an image plane by using a magnification e.g. of 0.25. Thus, the beam shape is reduced from 1.2 mm×200 mm to 0.3 mm×5 mm in this example, while the divergence is changed from 5 degrees to 20 degrees, which should be sufficient to illuminate e.g. a 14" display device, if using a volume grating based collimation lens having a focal length of 1 m.

The small one-dimensional light source line generated in this way is provided in the focal plane of the collimating lens. Thus, coherence is prepared to be sufficient and exists along the vertical direction only. In addition, only minimal optical losses exist.

For example, FIG. 2 shows how a beam shaping diffuser BS generating a defined flat-top intensity distribution in a defined plane of its far field can be illuminated with a line-like intensity distribution, or, in general, with an intensity distribution having a high aspect ratio of e.g. 1:33.

Figure 3:
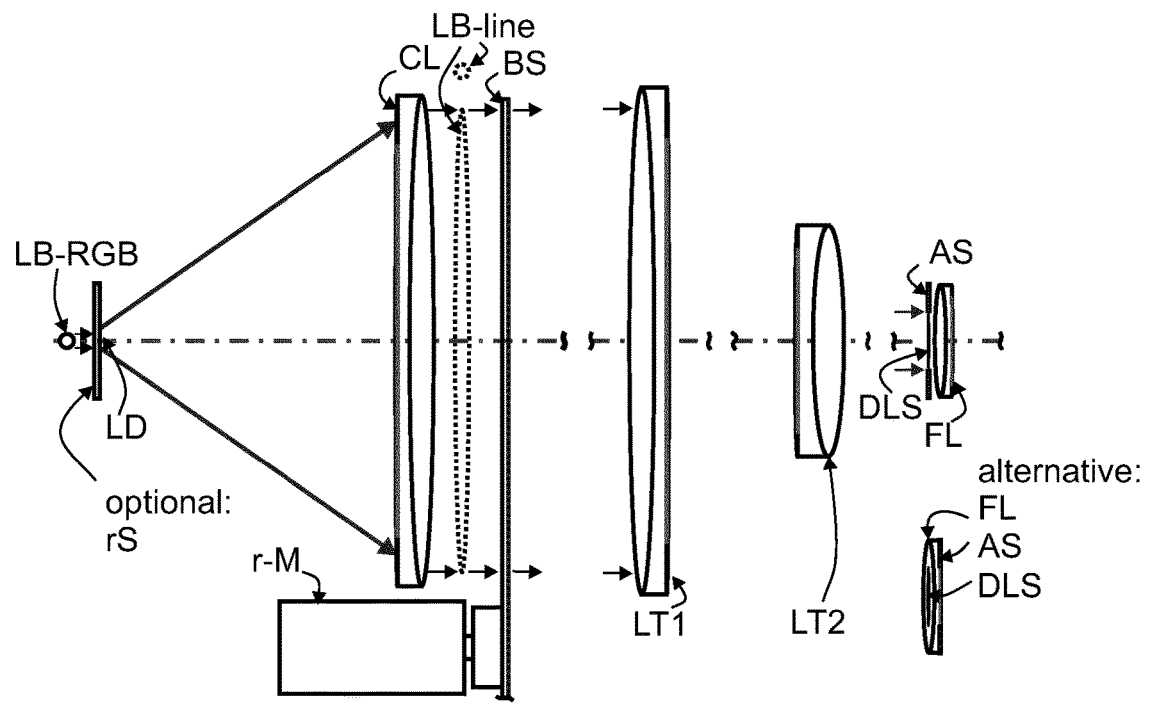
FIG. 3 shows a second embodiment of the illumination device according to the present invention.
Figure 4:
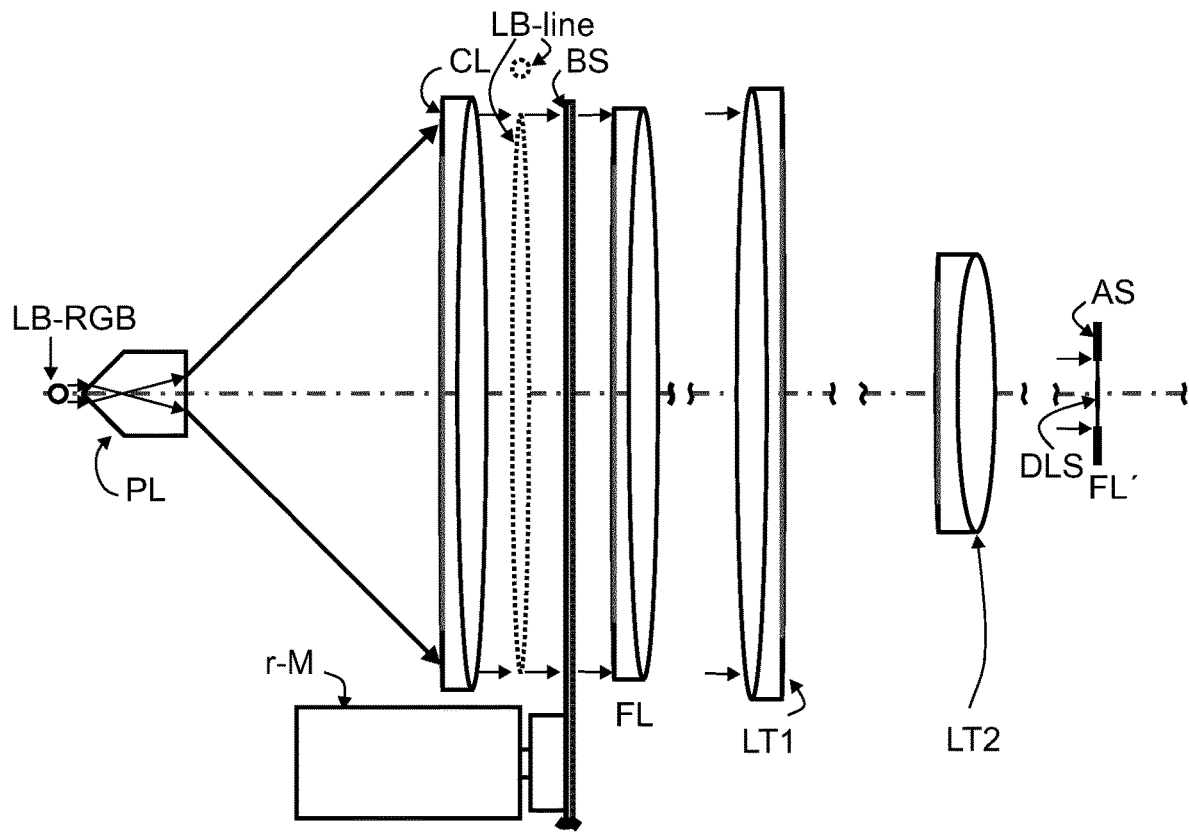
FIG. 4 shows a third embodiment of the illumination device according to the present invention.

The FIGS. 3 and 4 also show how e.g. a circular or elliptical initial light beam can be transformed to a line-like intensity distribution illuminating a beam shaping diffuser BS generating a defined flat-top intensity distribution in a defined plane of its far field. However, FIG. 3 also shows how the line-like intensity distribution present at the exit plane of the beam shaping diffuser BS is resized by using a telescope-like arrangement of two achromatic lenses LT1 and LT2.

The question may arise, why the intermediate large line-like intensity distribution is required at all. This might have several reasons. One reason might be that the beam shaping diffuser BS generating a defined flat-top intensity distribution in a defined plane of its far field has to be illuminated with a minimum beam size, which has to be present e.g. at least along one dimension. This is the case if e.g. randomized micro lens structures are used for multi-color illumination. The micro lens structures, which can act as refractive and diffractive structures, can be arranged using e.g. a Voronoi diagram.

Another reason might be that the tailor-made complex-valued extended light source has to have a defined size and a defined angular spectrum of plane waves, which propagates behind it, or, in general, a defined divergence. This is the reason for using e.g. an additional telescope arrangement.

Furthermore, FIG. 3 shows an additional field lens FL, which is arranged in the plane of the designed extended light source DLS. In general, field lenses increase the optical power, which is transferred trough the optical system. In other words, field lenses can be used in order to reduce the loss of optical power, which might be present along the beam path. As can be seen in FIG. 4, a field lens FL can also be used close to the exit plane of a beam shaping diffuser BS generating a defined flat-top intensity distribution in a defined plane of its far field. Furthermore, a field lens can be used to define the plane of the distribution of the absolute value of the complex degree of mutual coherence $|\mu_{12}|$, i.e. to shift the desired distribution of the absolute value of the complex degree of mutual coherence $|\mu_{12}|$ into the desired plane.

Behind the designed, tailor-made complex-valued extended light source, which is e.g. shown at the right hand side of FIGS. 3 and 4, a collimation unit has to be arranged. The collimation unit comprises at least one collimation lens. Behind the collimation unit a narrowed spectrum of plane waves is present. This will be further reduced by using a backlight unit, which e.g. is based on anamorphic beam stretching.

Compact laser modules might have smaller beam diameter, that is e.g. in the 500 μm range only. Engineered diffusers, as the beam shaping diffuser, have to be tailored to this reduced beam diameter in order to provide best performance. The means e.g. 95% of the light is transferred into the flat-top distribution area on the SLM and only 5% or less can be found outside this area or region.

If the initial beam diameters of the light beams are small enough, a further reduction, which might be obtained e.g. by using a telescope system as shown in FIG. 2 (red beam), is not required anymore. Thus, it might be a compact way of only having a compact laser module, a volume grating and a moved engineered diffuser, as the beam shaping diffuser.

Furthermore, in front of the beam shaping diffuser a lens can be arranged. The lens focuses the light beam exiting the volume grating onto the engineered beam shaping diffuser that has to be tailored in order to consider this non-standard Gauss distribution. Placing the beam waist onto the engineered beam shaping diffuser BS means to have a plane phase (plane wave) in this plane. The divergence angle behind the beam shaping diffuser BS is defined by two parameters, the numerical aperture (NA) used to illuminate the beam shaping diffuser BS and the divergence introduced by the beam shaping diffuser BS in addition.

As already disclosed, FIG. 2 shows an exemplary embodiment of a tailored one-dimensional light source line generating illumination device, which is used to illuminate a 1D encoded SLM with one-dimensional spatial coherent light only. As shown, no additional light source size changing optics is used behind the one-dimensional stretched Gauss to flat-top beam shaping diffuser BS. Such a setup of the illumination device can be provided if the light beams sizes are sufficient. The engineered beam shaping diffuser BS has a wider angular spread compared to the example explained before.

In a further embodiment of a tailored one-dimensional light source line illumination device, the one-dimensional stretched RGB combined light beam is focussed onto a flat-top intensity distribution generating beam shaping diffuser, which is tailored to the specific wave field illuminating it. This means that a lens, e.g. a lens L, arranged before the beam shaping diffuser is not necessarily a classical achromatic lens. It is rather an achromatic bifocal lens. Thus, the engineered beam shaping diffuser providing the beam shaping has to be tailor-made in order to work with the discrete illumination and to generate the defined homogeneous intensity distribution in the entrance plane of a following collimation unit. In general, an aspherical lens can be implemented, which can be adapted to the requirements. The tailoring of the beam shaping diffuser can also be carried out by providing a reflecting free-form surface that is tailor-made for the specific embodiment.

Furthermore, the engineered beam shaping diffuser can introduce a non-symmetric beam shaping functionality. For example, the shape of the flat-top-type intensity distribution, which is generated in the far field of the beam shaping diffuser, might be rectangular, i.e. to have an aspect ratio of e.g. 2:1 or 16:9 depending on the display device used. Thus, a non-circular intensity distribution provides an orientation dependent structuring of the beam shaping diffuser.

In FIG. 3 an illumination device is shown that generates a designed complex-valued extended light source DLS to be collimated by reshaping the entrance light beam LB-RGB. This refers to vertical parallax-only encoding, that is using one-dimensional sub-holograms. A line diffuser LD is provided after the combination of the individual light beams R, G, and B. The line diffuser LD stretches the entrance light beam along one dimension. It is possible to use a rotating scatter plate for that procedure. A collimation system CL is provided to collimate the incident light and thus forms a line-like intensity distribution LB-line of the initial light beam. An aspect ratio of the line segment of 1:33 is shown. The collimation system CL follows the beam shaping unit in the beam path that is designed here as a defined beam shaping diffuser BS. The collimation unit is not shown in FIG. 3. The beam shaping diffuser BS is further formed as rotating scatter plate here and is provided to generate a dynamic phase term. A rotating motor r-M that is a part of the beam shaping unit is used to provide the dynamic phase randomization by rotating the beam shaping diffuser BS. It is also possible to use a fast moved scatter foil or a dynamic beam shaping diffuser here instead of a rotating scatter plate. A telescope system comprising a first lens LT1 and a second lens LT2 is used to generate the design light source intensity distribution DLS. This design light source intensity distribution DLS forms thus an extended light source, where in the following sections the reference sign DLS is also used for denoting the term "extended light source". Furthermore, an aperture AS is provided. The aperture AS is arranged behind the telescope system, seen in the propagation direction of light, in the plane of the extended light source DLS. In that plane of the extended light source DLS it is provided to block disturbing light by the aperture AS. A further optimized amplitude distribution, as e.g. shown in FIG. 8, and a corresponding phase distribution, as e.g. shown in FIG. 10, can be used in this plane.

A field lens FL is arranged in the plane of the extended light source DLS. This field lens FL is provided for a shifting of the designed spatial distribution of the absolute value of the complex degree of mutual coherence $|\mu_{12}|$ in the plane of the spatial light modulator (SLM) to be illuminated within a holographic display device. In an alternative way the elements of this plane of the extended light source, that is, the aperture stop AS and the field lens FL, can be combined in that plane, as shown in FIG. 2. This means that the aperture stop AS is placed at the field lens FL used in the plane of the designed extended light source DLS.

Moreover, in FIG. 3 a beam shaping procedure of an initial intensity distribution is shown generally. This beam shaping procedure provides a practical intensity distribution used to illuminate the plane of an extended light source and a numerical aperture that is optimized for the optical elements following the illumination device in the beam path of the display device. Thus, the transfer of optical power is optimized. This means that the loss of optical energy is minimized. For reducing the loss of optical energy it is not sufficient to only reshape the light and to change the size of an initial light beam. The divergence of the light beam has also to be changed in a way that the loss of optical energy that might be existed further along the beam path is minimized.

One option that can be used in the case of unnecessary beam size reduction is to provide a line beam diffuser and an engineered beam shaping diffuser in series. It is not necessary to use additional focussing elements or other optical elements. This might be e.g. the case if a volume grating based wedge backlight unit in the illumination device is used, which provides 10× or 20× beam stretching in two directions. This means that reasonable large beam diameters of the primary light sources can be provided used to form the one-dimensional (1D) extended light source used in front of this backlight unit. In detail, an RGB-white beam is formed to a line using the line beam diffuser. The generated line illuminates the beam shaping diffuser generating a flat-top intensity distribution. The beam shaping diffuser is arranged in the front focal plane of a collimation unit. The collimation unit can be arranged e.g. in front of a volume grating based anamorphic wedge type backlight unit of the illumination device. Square or rectangular-shaped flat-top intensity distributions, which may have an aspect ratio of e.g. 2:1, can be obtained by choosing the corresponding engineered beam shaping diffuser.

Such a design of an illumination device would probably be less compact as the one shown in FIG. 3. However, it might be an alternative embodiment of the illumination device according to the invention that does not provide volume gratings for beam stretching.

This embodiment of the illumination device according to the invention is described below exemplary in detail, which provides tailored coherence for 1D encoded hologram encoding.

FIG. 3 shows a modification of the embodiment described in FIG. 2 as already disclosed. In FIG. 3 a laser light source beam shaping arrangement is illustrated, which generates a slit-like intensity distribution with a size e.g. of approximately 150 μm vertical×5 mm horizontal within the plane of the field lens FL (see right hand side of the figure). The field lens FL has a focal length $f_{FL}$ being similar to the one of the collimation unit used further along the beam path. The focal length $f_{FL}$ can be e.g. 1 m for a combined volume grating field lens used to illuminate the SLM.

The field lens FL arranged in the plane of the extended light source is an important detail in order to tailor the coherence for a 1D encoded SLM.

In FIG. 4 a further alternative illumination device is shown that generates the designed complex-valued extended light source DLS to be collimated by reshaping the entrance light beam LB-RGB. This refers to vertical parallax-only (VPO) encoding, that is, using one-dimensional sub-holograms. A beam shaping Powell lens PL is provided in the beam path in front of the beam shaping diffuser BS. The Powell lens stretches the entrance light beam LB-RGB along one dimension. Here as well, the collimation system CL is provided to collimate the light. Thus, a line-like intensity distribution LB-line of the initial light beam is generated. Here, an aspect ratio of the line segment of 1:33 is shown. The defined beam shaping diffuser BS designed as a rotating scatter plate is provided again to generate the required dynamic randomized phase term. The rotating motor r-M provides the dynamic phase randomization by rotating the beam shaping diffuser BS. Here also, it is an option to use a fast moved foil instead of the rotating scatter plate.

As a difference to FIG. 3, in this embodiment the field lens FL is provided in front of the telescope system comprising the lenses LT1 and LT2 and behind the beam shaping diffuser BS. This field lens FL is imaged into the plane of the extended light source DLS by the lenses LT1 and LT2 of the telescope system. The image of the field lens FL is FL'. In principle, this is equivalent to the field lens FL shown in FIG. 3.

Furthermore, the aperture stop AS is shown in FIG. 4. This aperture stop AS can be provided to block disturbing light in the plane of the extended light source DLS. Here, the field lens FL is provided to finally shift the designed spatial distribution of the absolute value of the complex degree of mutual coherence $|\mu_{12}|$ into the plane of the SLM to be illuminated within the holographic display device.

The collimating lenses CL are shown at the left hand side of FIGS. 3 and 4. However, the collimation unit used to collimate the extended light source (here denoted by DLS), which has to be arranged at the right hand side of the FIGS. 3 and 4, is not shown.

In general, a beam shaping of an initial light intensity distribution is illustrated here that provides a practical intensity distribution used to illuminate the plane of an imaged light source. This beam shaping of the light intensity distribution also provides a numerical aperture that is optimized for the optical elements following along the beam path. Thus, the transfer of optical power is optimized so that the loss of energy is minimized. For reducing the loss of optical energy it is not sufficient to only reshape the light and to change the size of an initial light beam, the divergence has also to be changed in a way that the loss is minimized, as already explained.

In other words and in some extent as example, FIG. 4 shows a modification of the embodiment of FIG. 3 already described. In this fig. a laser light source beam shaping illumination device is illustrated, which generates a light slit having e.g. a size of approximately 150 μm vertical×5 mm horizontal within the plane of an image of the field lens FL arranged behind and close to the beam shaping diffuser BS. The image of the field lens FL can have a focal length $f_{FL}$ being similar to the focal length of the collimation unit used along the beam path. The focal length can be e.g. 1 m for a combined volume grating field lens used to illuminate the RGB-SLM. A combined volume grating field lens can be formed by generating a field lens within the volume grating or by the volume grating.

Compared to the embodiments shown in FIGS. 2 and 3, in this embodiment the Powell lens is used to generate a one-dimensional light beam stretching. The advantage of such a Powell lens is that a homogeneous top-hat intensity distribution of the light can be achieved with intensity fluctuations, that is, deviations of less than 10%. This does not require a fast movement, which has to be implemented if using a beam shaping diffuser. This flat-top line-like intensity distribution generation can also be combined with further light beam stretching, e.g. provided by using wedge-type volume grating arrangements or anamorphic prism pairs in series.

The field lens FL, which is related to the plane of the extended light source, can be arranged at the exit plane of the illumination device as illustrated at the right hand side of FIG. 3 or close to the scatter plane of the beam shaping diffuser BS, where the field lens FL has to be imaged into the exit plane of the illumination device, as it is shown for the larger slit-like intensity distribution in the centre of FIG. 4.

One difficulty regarding the optical path length could be the use of a telecentric system, which is used to provide a magnification of e.g. M=0.125 in order to reduce the slit size existing at the exit plane of the illumination device.

Therefore, it could be preferred to provide a small light beam diameter in the plane of the two-dimensional flat-top intensity distribution generating beam shaping diffuser BS. A smaller light line requires less demagnification. Thus, only a smaller optical telescope system in its size is required in the illumination device. According to a boundary condition, the beam shaping diffuser BS has to be suitable for supporting that. And, the surface relief beam shaping pattern used has to be tailored for the light beam size used. The surface relief beam shaping pattern can be made e.g. of randomized micro lens structures. Thus, it is possible to avoid the use of all three lenses shown at the right hand side of the arrangement shown in FIG. 4. In other words, a demagnification might not be required and the two lenses LT1 and LT2 forming the demagnifying telescope shown in the FIGS. 3 and 4 might not be necessary.

A compact embodiment of an illumination device according to the invention can be realized by using a light beam diameter existing in the entrance plane of the Powell lens that is equivalent to the small dimension of the designed slit-like extended light source used for one-dimensional encoded holographic display devices. In this example, a light beam diameter of approx. 150 μm can be used. This requires a custom-made Powell lens. A customized, tailor-made Powell lens provides the one-dimensional line beam shaping. The collimation unit can be used to collimate the incident light and to redirect the wave fronts normal vectors back to being parallel to the optical axis of the illumination device. For example, the beam shaping diffuser is illuminated with a 150 μm×5 mm line segment. Thus, behind this beam shaping diffuser, which provides a two-dimensional flat-top intensity distribution generated in order to fit the aspect ratio of the SLM arranged further along the beam path, no further lens elements are required for light beam shaping. The collimation unit, which is used to collimate the light propagating behind the plane of the extended light source and which is a part of the illumination device, is still used.

In general, the RGB light beams can be reduced in size or adapted (or reshaped) in such a way that the line diffuser is illuminated with a light beam size that is equivalent to the light beam size required at least in one dimension further along the beam path in the display device. In the example explained above, this is a light beam size of 150 μm.

Moreover, in general, the beam shaping diffuser can also accept non-collimated light, but has to be designed for the specific parameters used for illuminating it. In other words, further design options exists, which are able to provide a very compact optical embodiment, which can be realized by using a minimum of optical elements only.

The example explained before generates a light source line that can be combined with e.g. a volume grating-type two component combined RGB multiplexed field lens collimating the light source line. In other words, Bragg-diffraction based volume gratings can also be used for the collimation and for the beam shaping required in front of the SLM. In this manner, tailored illumination for 1D encoded holograms can be provided in this way. However, this fact changes if a wedge-type volume grating backlight unit is used in the illumination device. This means that the shape of the extended light source has to be changed according to the change of the angular spectrum of plane waves introduced by the specific embodiment of the wedge-type geometry used. The aim could be to generate e.g. a sweet spot having a size of 5 mm orientated horizontally, while a vertical 1D encoding might be used within the holographic display device. At a viewing distance of an observer to the display device e.g. of 1 m, this corresponds to an angle of the angular spectrum of plane waves generating the sweet spot of a value of ±0.1432 degrees. The sweet spot might be larger in its size. But this angle value can be used as a minimum to be present. However, the eye pupil of an observer will probably not be larger than that value, and the uncertainty of the eye tracking determination, which might be 1 mm along the x-direction and 1 mm along the y-direction, that is in the lateral direction, is sufficient. A value of an angular range of approximately ±0.15 degrees is sufficient in order to generate the sweet spot required for a 1D encoding of a hologram. A two times 10× anamorphic light beam stretching provided by the backlight unit as illumination device will squeeze the angular spectrum of plane waves approximately by a factor of 10×. Thus, at least in one direction, x-direction or y-direction, a value of an angular range of approximately ±1.5 degrees is required in order to generate the sweet spot, which is finally required for a 1D encoding in front of the eye of the observer.

This means that an extended light source having the shape of a line segment in the case of a 1D encoding has to have an angular extension in front of the collimation unit of at least ±1/12 degrees in one direction and ±1.5 degrees in the other direction. For realizing increased object depth the angular spectrum of plane waves of the coherent light direction illuminating the SLM, which has to be at least 1/60 degrees, can be further decreased for example down to 1/180 degrees or down to ±1/360 degrees. This means, in front of the 10× anamorphic beam stretching providing backlight unit there is an angular spectrum of plane waves required, which spans ±1/36 degrees only.

Thus, there is an extended light source that has to be equivalent to an angular spectrum of plane waves of preferably ±1.5 degrees in one direction and ±1/36 degrees in the other direction existing behind the collimation unit. The collimation unit can comprise e.g. an achromatic lens system or an off-axis parabolic mirror element. For example, a focal length of 500 mm might be used for the refractive or diffractive optical system collimating the extended light source. It is also possible to use Bragg-diffraction based volume grating elements in order to collimate the primary colors RGB separately.

For example, if the collimation unit has a focal length of $f_c$=500 mm, an angular spectrum of plane waves of ±1.5 degrees would result in a lateral extension of the light source line segment to be collimated of approximately 26 mm and an angular spectrum of plane waves of ±1/36 degrees would result in another lateral extension of the light source line segment to be collimated of approximately 0.5 mm only.

Within the backlight unit of the illumination device the line segment of the extended light source may be provided vertical and thus has e.g. a width of 0.5 mm and a height of 26 mm. If, for example, a collimation unit, e.g. cut out a rectangular shape of circle, is used having a width of 50 mm along one direction, a line width of 26 mm has to be handled considering the field curvature. Thus, a collimation unit is preferred that can carry out that. Hence, there might be provided a collimation unit comprising several elements to provide a flat field e.g. for a width of 36 mm and a height of 24 mm resulting in a diagonal of 43.3 mm.

The background for this is that the shape of the SLM is rectangular. In optics often circular beam shapes are present. Thus, a standard situation may be to use a collimation unit that provides a homogeneous circular intensity distribution at its exit plane. Using a rectangular shaped SLM would mean to cut out a rectangular shaped part out of the circular intensity distribution. This represents a loss of optical energy, which can be avoided by implementing tailored beam shaping.

As a result of this example, the modification of the illumination device shown in FIG. 4 can be defined. The light beam diameters defined by the value I=Imax/e$^2$ that are e.g. 1.2 mm of the primary light beams have to be reduced to a light beam diameter of e.g. 0.6 mm by using a 2× light beam expander in reverse orientation, thus providing a magnification of M=0.5, which is a demagnification. The provided Powell lens PL can be designed to accept a light beam diameter of 0.6 mm. The one-dimensional divergent light generating a flat-top intensity distribution will be collimated and a light line segment of a size of 0.6 mm×26 mm will illuminate the two-dimensional designed flat-top generating dynamic beam shaping diffuser placed in front of the collimation unit having a focal length of $f_c$=500 mm. The aperture stop AS, or amplitude filter, can be used to reduce the size of the light line segment of 0.6 mm to 0.5 mm or even further. The flat-top generating dynamic beam shaping diffuser has to be designed in a way to accept the beam profile required, in other words generating a proper two-dimensional flat-top intensity distribution out of it.

For example, for an air-side entrance angle of the light onto a substrate plate bearing a volume grating of the backlight unit e.g. of 84.26 degrees, the angle inside the substrate having a refractive index of 1.5 is 41.55 degrees. In other words, if the wedge works at 84.26 degrees to 0 degree in air, this is equivalent then or a geometry of reconstruction of 41.55 degrees to 0 degrees within a substrate material having a refractive index of n=1.5.

This reduced diffraction angle, which is present within the substrate or within the volume grating, results in a 1.36 times beam stretching only, not in a 10 times beam stretching. Thus, an angular range of ±0.15 degrees illuminating the SLM in the sweet spot direction multiplied by a 1.36 times beam stretching results in an angular spectrum of plane waves of ±0.2 degrees only. In other words, an angular range of ±0.15 degrees is required in order to span the sweet spot, which corresponds to an angular range of ±0.2 degrees, which has to be diffracted within the volume grating with a high diffraction efficiency. Thus, it should be sufficient that the volume grating accept this angular range. This means that the volume grating has to have a high diffraction efficiency for this illuminating angular spectrum of plane waves of ±0.2° deg. This explanation can be used to define the parameter range of the Bragg-diffraction based volume gratings e.g. used within the backlight unit.

In simulations the angular selectivity $\eta(\theta_R)$ of e.g. a 16 µm thick volume grating providing 41.55 degrees/0 degree diffraction for a wavelength of 532 nm was calculated. There, for an illumination with an angular spectrum of plane waves of ±0.2 degrees, a diffraction efficiency of larger than 0.9 can be obtained. Thus, a volume grating thickness of 16 µm or e.g. 20 µm is sufficient to diffract the angular spectrum of plane waves required with high diffraction efficiency.

This also means that the stretching of the angular spectrum of plane waves, which is 1.36× only, is a minor part of the 10× factor introduced in the complete embodiment of the backlight unit of the illumination device. Hence, a wave field stretching of 7.35× takes place at the surface bearing a tailored anti-reflection coating. This is a refractive wave field stretching. In other words, an air wedge-type backlight unit, which realizes a 10× wave field stretching, carries out this by means of diffraction, which is the minor part, and by means of refraction, which is the major part (10×=1.36× 7.45). An angular spectrum of plane waves of ±0.15 degrees is required in front of the SLM and an angular spectrum of plane waves of ±0.2 degrees is required in front of the volume grating and an angular spectrum of plane waves of ±1.5 degrees is required behind the collimation unit, that is, in front of the anti-reflection coating. The anti-reflection coating is required at the substrate surfaces of the air-wedge-type backlight unit, which are illuminated e.g. at 84.26 degrees. The anti-reflection coating has to accept an entrance angle of the light of e.g. (84.26±1.5) degrees with a low reflection loss. This boundary condition of the anti-reflection coating applies to one of two volume gratings, which can be used in the anamorphic backlight unit. A first small volume grating bearing substrate stripe placed at the lower part of the backlight unit and horizontally orientated has to accept the entrance angle of light of (84.26±1.5) degrees with a low reflection loss. The other, orthogonal direction and thus the large display size volume grating is not sensitive regarding this angular range to be transmitted. This is due to the fact that the coherent direction works with a much narrower angular spectrum of plane waves. The widest angular acceptance is required for the direction finally spanning the sweet spot. This direction is referred to as incoherent direction regarding the wave field illuminating the SLM.

Figure 5:
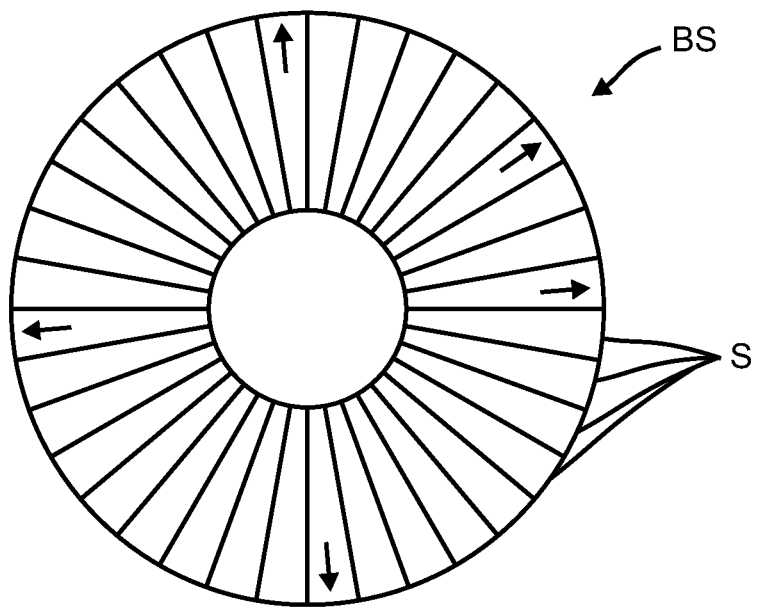
FIG. 5 shows a beam shaping unit comprising several segments.

In FIG. 5 a beam shaping diffuser BS is shown that is divided into segments S. The arrows within the individual segments S of the beam shaping diffuser BS show the orientation of an engineered surface relief profile, that is a phase profile, within segments of the beam shaping diffuser BS. For example, if a beam shaping diffuser generates a rectangular intensity distribution with an aspect ratio of 2:1 (horizontal:vertical extension) if illuminated with a light beam, a rotation about 90 degrees will result in a rotated intensity distribution, which has an aspect ratio of 1:2. This is the reason why the orientation of the phase profile of the beam shaping diffuser has to be changed in dependence on the angular position of the rotated plate used. This also can be carried out in a continuous way, i.e. without a visible segmentation.

The described beam shaping diffuser BS is able to provide e.g. a rectangular flat-top intensity distribution in its far field, which is used for a proper illumination of the SLM, even in case of using a rotating scatter plate as beam shaping diffuser. Even if a rotation is provided, the relative orientation of the engineered surface relief profile of the beam shaping diffuser BS is not significantly changed, if at all.

In case of using a fast one-dimensional moving foil this type of segmented change of orientation of a rectangular-type flat-top distribution generating beam shaping diffuser is not necessary.

In other words and in detail, FIG. 5 shows an orientation dependent structuring of the beam shaping diffuser BS having 36 segments S, here. The arrows shown are used to mark the orientation of the exemplary segments S. Transition zones might be masked up with black stripes. Due to the fact that beam shaping diffusers have defined phase distributions, which can be made by using lithographic technologies, it is not difficult to generate a continuous or at least reasonable continuous intensity distribution having the specific orientation defined by the application.

The use of an engineered beam shaping diffuser structure, which has a non-rotational symmetric angular spread of the intensity pattern to be generated in the far field, generates an additional freedom of design. Regarding the embodiment illustrated in FIG. 2 in part, a non-symmetric angular spread can be used to compensate for astigmatic illumination of it or to generate direction dependent light beam shaping. For example, the beam scatter plate as beam shaping diffuser shown in FIG. 2 can generate a well-defined 2:1 flat-top intensity distribution in the entrance pupil of the collimation unit used further along the beam path for different intensity profiles, which might be provided on the beam scatter plate. And it can generate this far field intensity distribution, which has a rectangular profile, for different angular spectra of plane waves or wave fields in general at the same time. This means that there is a universal tool that can provide the illumination properties and coherence properties required, e.g. for 1D or for 2D encoding of holograms.

Piezoelectric actuators (PZT) or other types of actuators can be used to provide a dynamic phase randomization if combined with small segments S of the beam shaping diffuser. For example, PZT provide fast movements at reasonable high amplitude by using tip magnifying structures. Thus, e.g. fast synchronized movement in the range of 100 µm can be implemented. It is also possible to use pulsed and SLM synchronized voice coil operation. Such an operation can provide reasonable amplitude of the beam shaping diffuser segment movement in the millisecond (ms) range. Thus, e.g. PZT with lever structures, that is flexure actuators, bimorph benders, which can provide movement up to several mm, or disk-bimorph-actuators providing an amplified motion, can be used to move a segment S of several square millimeter only along 100 µm within a millisecond. By using a synchronized push-pull approach two cycles can be used for the operation, that is, moving in one direction and moving backwards. Thus, there is no rotating scatter plate required.

Figure 6:
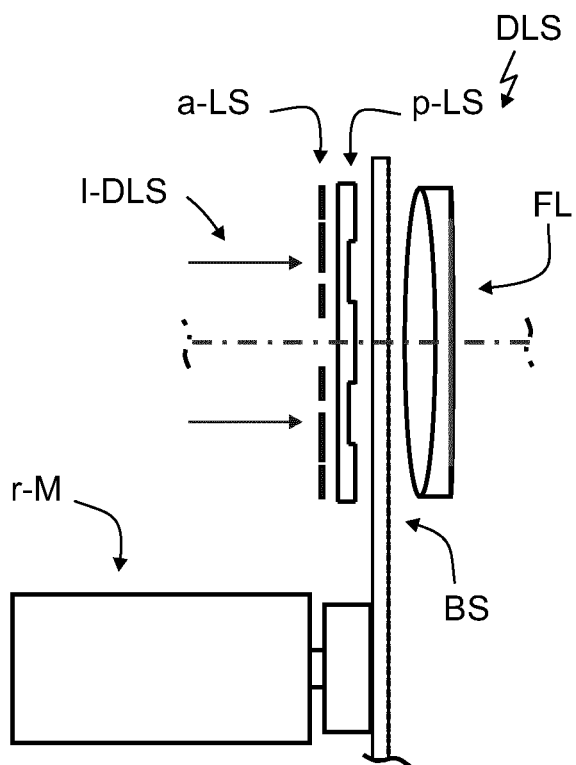
FIG. 6 shows a generic embodiment of a designed complex-valued extended light source used in a display device according to the present invention.

FIG. 6 shows a generic embodiment of a designed complex-valued and extended light source DLS to be collimated and used within a preferred holographic three-dimensional display device. An intensity distribution I-DLS is provided in order to illuminate the plane of the extended light source DLS to be generated finally. An amplitude mask a-LS is provided in the plane of the extended light source DLS. The amplitude mask a-LS provides a required amplitude distribution of the extended light source DLS. Furthermore, a phase mask p-LS is provided in the plane of the extended light source DLS. The phase mask p-LS is arranged behind the amplitude mask a-LS. A required phase distribution of the extended light source DLS is generated by the phase mask p-LS. A beam shaping flat-top providing diffuser BS-flat-top providing a rectangular shaped intensity distribution in its far field and acting as a rotating scatter plate provides a required dynamic phase term of the extended light source DLS to be generated and collimated. This beam shaping flat-top providing diffuser BS-flat-top is arranged e.g. behind the phase mask p-LS. A field lens FL is also provided in the plane of the extended light source. It is preferred to arrange the field lens FL behind the phase mask p-LS, seen in the propagation direction of light. However, the longitudinal order of the single elements can also be changed. Thus, the beam shaping diffuser can also be shifted to the left hand side of the arrangement shown in FIG. 6. The field lens FL shifts the distribution of the designed absolute value of the complex degree of mutual coherence $|\mu_{12}|$ from the far field Fourier plane into the plane of the SLM to be illuminated within the holographic display device. In other words, the field lens FL shifts the correct distribution of the absolute value of the complex degree of mutual coherence $|\mu 12|$ into the SLM plane.

Figure 7:
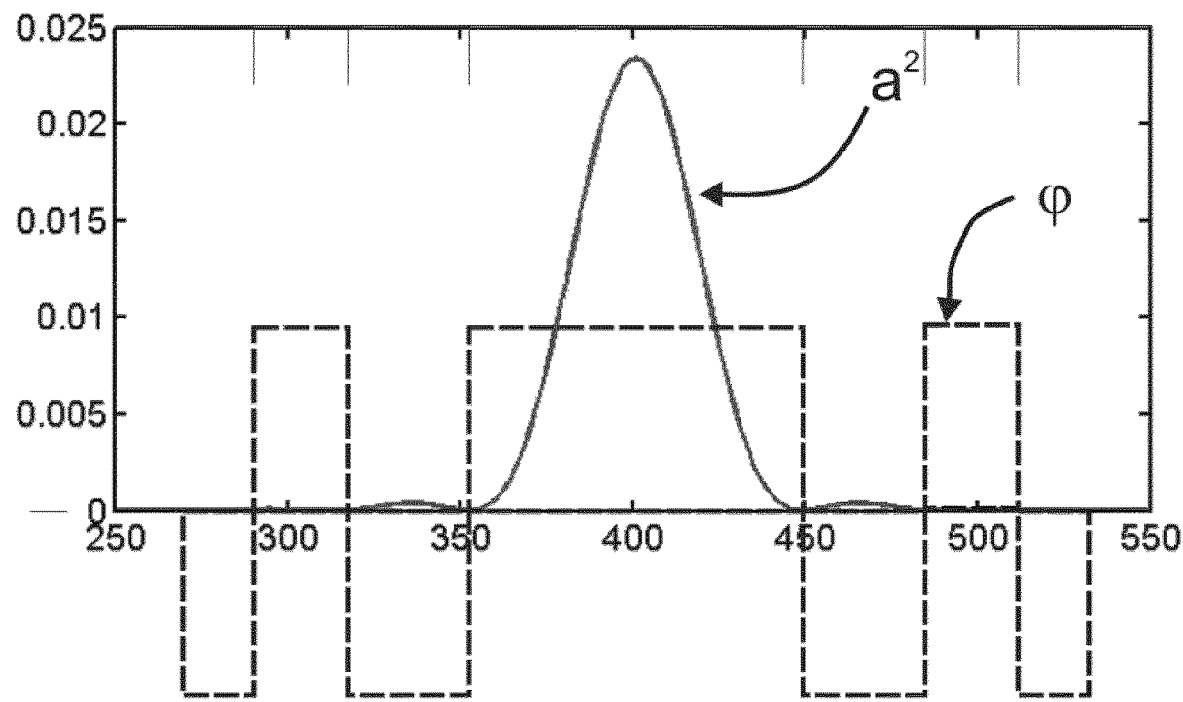
FIG. 7 shows a line scan of an intensity of an Airy distribution, which is proportional to the square of the amplitude a and the corresponding phase distribution $\varphi$.

FIG. 7 shows a line scan of the intensity of an Airy distribution that is denoted as $a^2$. Furthermore, a phase distribution is shown that is denoted as cp. The phase distribution is a step-type profile spanning a range of $2\pi$ in total. Thus, a complex-valued distribution is shown, which might be used within a plane of an extended light source to be collimated. This phase distribution can also be extended to a slightly curved distribution if the image field of the plane of the extended light source is not reasonable flat.

For a 1D encoding of a hologram the preferred complex-valued distribution of the plane of the extended light source is a sinc function-like shaped distribution with phase shifted side lobes. In other words, the slit forming the extended light source disclosed already will obtain additionally an amplitude distribution. This amplitude distribution is equivalent to the amplitude distribution of a sinc function. The phase distribution, which may have been a constant before, is changed to a binary shaped phase shifting mask, which comprises the optimized phase profile. The ±1st side lobes are shifted about $\pi$ regarding the central area/region of the function. This binary $\pi$-shifted function might be extended in order to use further side lobes, as e.g. $\pm 2^{nd}$ side lobes, which have the same phase as the central region again, or even the $\pm 3^{rd}$ side lobes, which have the same phase as the $\pm 1^{st}$ side lobes that are shifted about $\pi$ regarding the central area. The use of more side lobes here means to obtain a sharper definition of the rectangular (rect) function describing the complex degree of coherence further in the plane of the hologram to be exposed with defined spatial coherence.

For the sake of simplicity, it is sufficient to use this complex-valued sinc function approach in one direction only. This sinc function approach might also be used along the orthogonal direction having a larger extension. Such an approach would, however, be labor-intensive, which can be avoided for 1D encoding. Then, a horizontal aligned slit acting as extended light source to be collimated is provided. There are tiny side lobes in the, for example here, horizontal direction of the spatial coherence provided within the SLM plane. But, the tiny side lobes will only have impact on neighboured color filter stripes, which transmit a different color only and are thus incoherent to each other. This means that it might be sufficient to add e.g. a partial Gaussian shaped amplitude profile along the horizontal direction of the slit-like extended light source.

If the sinc-like approach would be expanded in the long extension of the slit-like extended light source, the extended light would be enlarged further in this direction. Thus, the angular spectrum of plane waves, which can be transmitted e.g. by Bragg diffraction based volume gratings forming the backlight unit or the multiplexed field lens geometry, can be increased. An angular spectrum of plane waves, which is increased e.g. 2 or 3 times regarding the initial situation using a simple slit-like light source to be collimated, decreases the parameter space of the volume gratings significantly and is thus not preferred. A simple structure or at least a structure that is simplified regarding the optimal theoretical embodiment might be used along the large axis of the extended light source area.

As already disclosed, FIG. 7 shows the square of the amplitude distribution ($a^2$=I) and the phase distribution of an amplitude+phase distribution, which might be used within the front focal plane of a collimation unit. The range of the phase introduced is at least Tr. The binary phase profile can be used as approximation. Multi-level and partially continuous phase distributions can be used to generate the complex-valued distribution of the amplitude+phase distribution required.

It might be cost-efficient to realize a complex-valued extended light source that provides the desired distribution of the absolute value of the complex degree of mutual coherence $|\mu_{12}|$ within the SLM plane comprising the dynamic sub-holograms by using an attenuated phase-shifting mask. However, in some special cases it might be advantageous to use a small complex-valued SLM forming the complex-valued extended light source, e.g. with the entire functionality required or without the fast dynamic phase randomization part, which can still be implemented by using a rotating scatterer. The rotating scatterer comprises a tailor-made beam shaping surface relief profile, which generates a flat-top intensity profile in its far field.

Switching from a 1D encoding to a 2D encoding might also be realized by providing two different complex-valued but fixed attenuated phase shifting masks.

A dynamic complex-valued SLM used as the extended complex-valued light source can be provided if a dynamic sub-hologram adaption is required. This can be used to further reduce the retinal inter object point crosstalk. In other words, if only smaller sub-holograms are displayed in the SLM generating the holographic three-dimensional scene or object, the distribution of the absolute value of the complex degree of mutual coherence $|\mu_{12}|$ can be reduced in size, too.

In detail, the one-dimensional section of the complex-valued function shown in FIG. 7 might be used at least along the small extension of the slit-like extended light source to be collimated within a collimation unit. It is a one-dimensional section of a Bessel function. For a 1D encoding of a hologram a one-dimensional sinc function can be used. A sinc function can be used for one-dimensional holograms or rectangular shaped two-dimensional sub-holograms. A Bessel function can be used for circular shaped two-dimensional sub-holograms. The complex-valued function shown in FIG. 7 can be a section of a two-dimensional rotational symmetric complex-valued extended light source collimated by a collimation unit of a holographic display device using two-dimensional encoded circular shaped sub-holograms. An additional field curvature can be added to the phase profile shown e.g. in order to optimize the functionality considering the entire optical system and its aberrations and curved image planes, too. This distribution shown is part of the static complex-valued part of the extended light source to be collimated. Thus, for a 2D and a 1D encoding of holograms a defined flat-top characteristic of the distribution of the absolute value of the complex degree of mutual coherence can be obtained in the SLM plane having the sub-holograms.

Additional focus terms can be added to the plane of the extended light source in order to shift the tailored profile of the distribution of the absolute value of the complex degree of mutual coherence $|\mu_{12}|$, for example a stripe-like flat-top spatial distribution for 1D encoded sub-holograms and a circular shaped flat-top distribution for 2D encoded sub-holograms, at the design plane. The standard design plane is the plane of the complex-valued SLM. This is the plane that comprises the sub-holograms. Thus, a real or imaginary convex lens can be added to the plane of the extended light source to be collimated. For example, a static phase term can be added. However, in the simplest case a lens can be added. The lens can have a focal length $f_{LS}$ that is the same as the focal length of the collimation unit $f_{COLL}$.

Several boundary conditions have to be considered. An implementation of vertical encoded one-dimensional sub-holograms can be assumed here, that is vertical parallax-only (VPO). The lateral extension of the horizontal coherence should be in the range of the horizontal pixel pitch, which is, for example, in the range of (50-500) μm only. The exact values are dependent on discrete display device embodiments. For example, the horizontal extension of a pixel column of the SLM should be at least smaller than 1/60 degrees, which is the angular resolution of the human eye. This applies to a time-sequential color displaying mode and for the use of color filters, too. If color filter stripes within a 1D encoded holographic display device are used, several color filter stripes should be provided within this angular range of 1/60 degrees. This defines the values of the horizontal pixel pitch of the SLM given above. Thus, a horizontal squeezed coherence distribution seems to be a practical approximation to this requirement, in other words to limit the coherence horizontally.

In the following disclosure the vertical extension of the absolute value of the complex degree of mutual coherence is regarded.

Another boundary condition is the illumination of the SLM with a vertical extension of the distribution of the absolute value of the complex degree of mutual coherence $|\mu_{12}|$ that does not exceed the size of the largest sub-hologram used for the encoding of the three-dimensional scene. The lateral extension of the distribution of the absolute value of the complex degree of mutual coherence can be, e.g., limited to 2.9 mm, even if the sub-hologram has an extension of e.g. 4 mm or 5 mm.

Further improvements to be considered of the illumination device according to the present invention:

Horizontal Apodization

One improvement refers to the Fourier plane that provides the desired distribution of the absolute value of the complex degree of mutual coherence $|\mu_{12}|$. The SLM has not to be arranged in the Fourier plane of the collimation unit. For example, the SLM might be arranged close to or in the exit plane of the collimation unit that is not the Fourier plane of it. The Fourier plane of the collimation unit is the back focal plane while the extended light source to be collimated is provided in the front focal plane of the collimation unit. An additional phase term can be added to that plane of the extended light source in order to place the designed and desired optimal distribution of the absolute value of the complex degree of mutual coherence $|\mu_{12}|$ in the plane comprising the SLM to be illuminated independently on the real location of the Fourier plane of the extended light source to be collimated. In other words, the spatial coherence required can be provided in the distribution that is optimal. And a tailored absolute value of the complex degree of mutual coherence can be provided there where it is required, in other words there where the SLM is arranged.

Still further refinements can be implemented. If there are several horizontal side lobes of the distribution of the function of the mutual coherence $|\mu_{12}|$, these side lobes can be suppressed e.g. by introducing an additional apodization profile along the horizontal direction of the extended light source. Hence, a sinc-like amplitude profile, which includes a binary phase profile additionally, can be used in order to form a complex-valued extended light source along the horizontal direction, too. Thus, a flat-top profile of the distribution of the absolute value of the complex degree of mutual coherence $|\mu_{12}|$ can be realized horizontally, too. The lateral extension of this further modified extended light source might exceed the angular transmittance provided e.g. by the Bragg diffraction volume gratings used further along the beam path. Even if a lateral extension of the extended light source to be collimated e.g. of 5 mm could be practical, a lateral extension e.g. of 15 mm along the incoherent direction used for 1D encoding could not be practical anymore. The feasibility depends on the discrete optical system of the holographic display device used. This approach for the vertical direction also can be implemented for the horizontal direction.

However, it also might be assumed that the vertical orientation of the distribution of the absolute value of the complex degree of mutual coherence $|\mu_{12}|$ follows the vertical orientation of the RGB color filter stripes used. Thus, each color filter stripe has two lateral adjacent color filter stripes along each direction, that is, four neighboured color filter stripes in total relating to other colors. Thus, it is not required to eliminate e.g. the plus/minus first side lobes, plus/minus second side lobes or even the plus/minus third side lobes totally. This is due to the fact that these side lobes can be blocked by the other adjacent color filter stripes. This points out that a simpler apodization profile may be used along the horizontal direction. Such a simple apodization profile can be e.g. an amplitude distribution equivalent to a Kaiser-Bessel window, to a Gauss function or just a part of a simple cosine function. A simple amplitude profile can also be used in order to reduce the spatial frequency spectrum herein.

Figure 8:
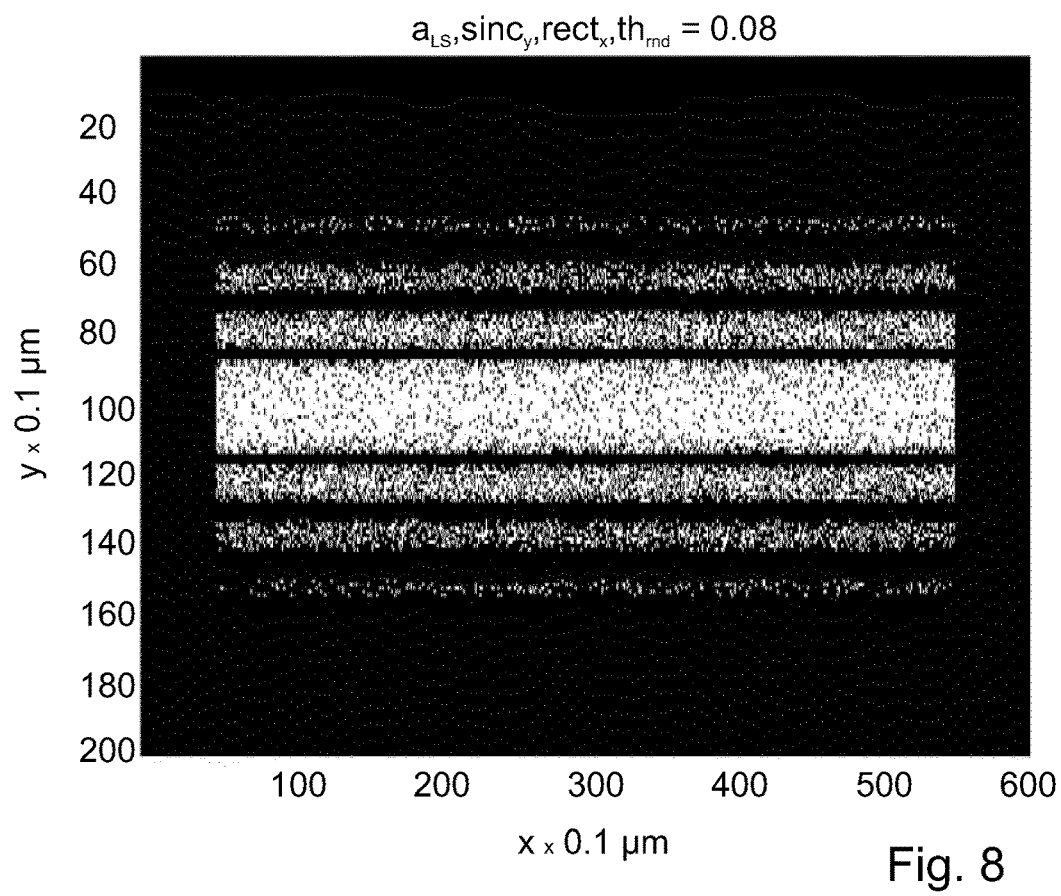
FIG. 8 shows a sinc-type amplitude distribution $a_{LS}$, which can be used in a plane of the extended light source; the intensity distribution is proportional to the square of the amplitude distribution.

In FIG. 8 a sinc-type intensity distribution is shown. Such an intensity distribution can be provided in the light source plane of a vertical parallax-only-type holographic display device, that is, for 1D encoding of a hologram. The amplitude distribution of a slit-like light source as shown has a rectangular (rect) function-like distribution along the horizontal x-direction and a sinc function-like distribution along the vertical y-direction. A randomization of values ranging from zero (0) to one (1) is used to obtain a binary distribution. The randomization uses here a threshold value of approx. 0.08 in order to see and obtain side lobes which does not exist if e.g. a threshold value of 0.5 is used. This means, a threshold value of approx. 0.08 is used for transparent parts. This black and white image, which is a binary image, of FIG. 8 shows that a binary amplitude distribution can also be used in the light source plane. In other words, the amplitude mask used for the complex-valued extended light source providing the desired distribution of of the absolute value of the complex degree of mutual coherence $|\mu_{12}|$ can be realized as binary amplitude mask, which might be a cost-efficient implementation. As long as the numerical aperture within the beam path following the extended light source plane is so small that the fine pitch of the randomization is not resolved by the optical system of the display device, an effective gray scale distribution of the extended light source is obtained finally. For example, if this binary randomized intensity distribution would be used as an image slide within a classic projection device and the numerical aperture of a projection system would not resolve the fine pitch used for the binary randomization, the image obtained at the screen of the projection device is a smooth gray scale image. Compared to the use of a real gray scale mask in the plane of the extended light source this technique of randomized binary pattern generation disclosed here reduces manufacturing costs.

Back to the sinc-like light source slit, in FIG. 8 one binary black and white version of the gray scale distribution spanning values from 0 to 1 is shown. A randomization of the distribution was used in order to obtain binary black and white images. A used threshold value e.g. of 0.5 does not lead to a practical result because of the fact that no side lobes will be recognizable. A threshold value e.g. of 0.15 would lead to two side lobes. A threshold value reduced e.g. to 0.08 would lead to six side lobes as shown in FIG. 8.

Furthermore, it is possible to provide an amplitude distribution of an extended light source that has an additional horizontally orientated super Gaussian apodization profile. The additional modulation of the amplitude can be equivalent to the additional modulation of a pure rect-like slit. This additional super Gaussian function described by the multiplicative factor or formula $\exp(-Nx^2/\sigma^2)$ and multiplied by the modulation can have an N of 3 and a σ (sigma) of 4 mm. Here, N is the $N^{th}$ power of the initial Gauss function used as additional apodization profile, which is implemented as a two-dimensional distribution multiplied by the primary non-apodized sinc function. And sigma is the half width of half maximum value of the initial Gauss function. Exemplary values are given in FIGS. 9 and 11.

Even if the additional amplitude modulation following a super Gaussian function would work for a rectangular stripe, it would not work for an extended light source having a vertical sinc-type modulation already. An additional horizontally introduced apodization would be to strong and would thus significantly reduce the homogeneity of the plateau of the distribution of the absolute value of the complex degree of mutual coherence. Thus, such a distribution would not be optimal.

Regarding the horizontal apodization a reasonable wide Gaussian function with N=1 can be used. For a horizontal slit, sigma values of a 50 mm are sufficient in order to provide reasonable suppression of the horizontal side lobes of the distribution of the absolute value of the complex degree of mutual coherence $|\mu_{12}|$.

Vertical Apodization

Although the distribution of the plateau of the absolute value of the complex degree of mutual coherence $|\mu_{12}|$ is sufficiently shaped by using a complex-valued sinc-like distribution of the complex amplitude of the extended light source to be collimated, limiting the vertical extension of the sinc function leads to two peaks at the rim of the plateau which show slightly increased values. In other words, these two peaks at the rim of the plateau have a value of 1 while the centre of the plateau is reduced to values between $|\mu_{12}|$=0.85 to 0.9.

The incoherent amount of the sub-hologram diffraction does not contribute to imaginary or real object points in a three-dimensional space. Thus, this amount gets lost in the sense of diffraction efficiency. The non-diffracted part of the light is focussed into the plane of the viewing window and distributed among the different diffraction orders of the SLM used. The field lens used in the display device avoids that the non-diffracted light is hitting the eye of the observer. Thus, the absolute values of the complex degree of mutual coherence $|\mu_{12}|$ slightly less than 1 are practical and applicable, too.

Figure 9:
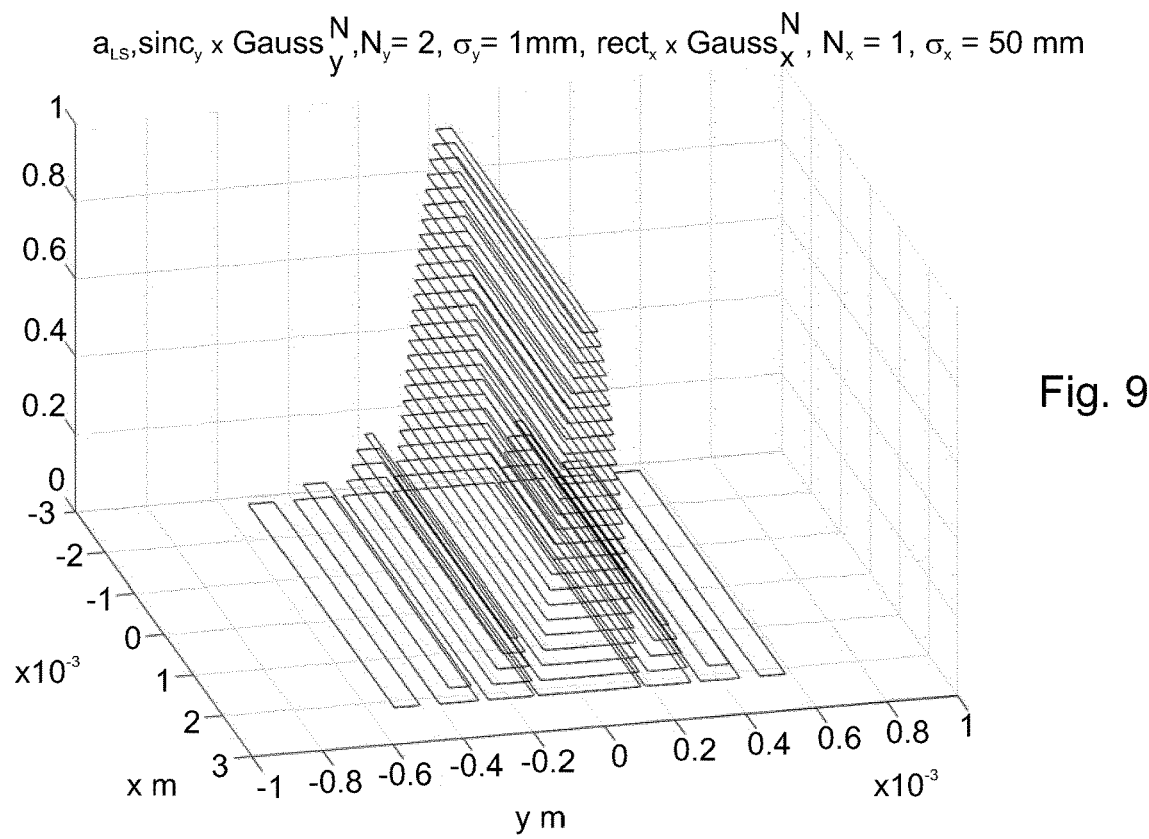
FIG. 9 shows a three-dimensional contour plot of a sinc-type amplitude distribution $a_{LS}$, which can be used in the plane of the extended light source; a Gauss-type apodization is applied in x-direction and y-direction.

FIG. 9 illustrates a three-dimensional contour plot of a sinc-type intensity distribution that can be used in the plane of an extended light source of a vertical parallax-only-type holographic display device. A Gauss-type apodization is added along two directions to the extended light source. The apodization profile multiplied by the initial sinc function is not symmetric. Two different Gauss functions had been used, one for the x-direction and another one for the y-direction. The two Gauss functions had been taken to the power of N. Along the y-direction of the extended light source plane N is 2 and along the x-direction of the extended light source plane N is 1. The sigma value a is 1 mm along the y-direction and 50 mm along the x-direction of the light source plane.

In other words, the amplitude distribution of the extended light source plane shown in FIG. 9 has a sinc-like apodization or a sinc-like amplitude distribution, along the vertical y-axis, which is multiplied by a Gaussian-like modulation present along the vertical y-direction. This vertical Gaussian-type apodization function is described by the multiplicative factor $\exp(-Nx^2/\sigma^2)$ and has an N of 2 and a σ of 1 mm. In addition, a further horizontal amplitude modulation is applied as a multiplicative factor. This amplitude modulation that is a function of the horizontal x-direction follows a super Gaussian function described by the multiplicative factor $\exp(-Nx^2/\sigma^2)$ and having an N of 1 and a σ of 50 mm. There are three apodization functions here, a sinc function multiplied by a Gaussian function; both functions are of the y-direction only, and a Gaussian function that is only a function of the x-direction orientated horizontally. Although functions of the x-axis and y-axis could be used, this is not absolutely necessary for extended light sources optimized and used for 1D encoding.

Figure 10:
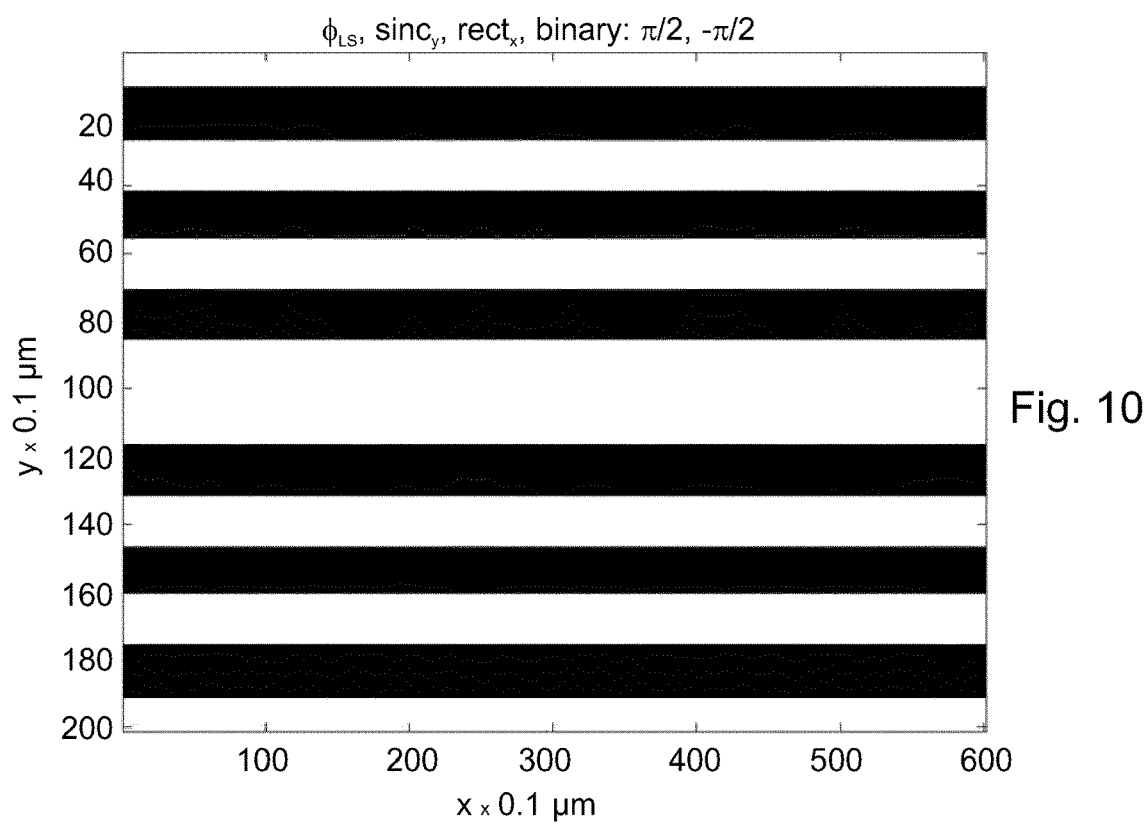
FIG. 10 shows a binary phase profile $\phi_{LS}$ related to FIGS. 8 and 9 (white: $\pi/2$, black: $-\pi/2$, where $2\times\pi$ is equivalent to one discrete wavelength, which is, for example $\lambda_B$=450 nm, $\lambda_G$=520 nm or $\lambda_R$=640 nm)

FIG. 10 shows a binary phase profile or distribution of an extended light source with regard to FIGS. 8 and 9. The range of the binary phase profile is −π/2 to +π/2, that is 2π in total. The shown black and white stripes or areas characterize phase plateaus of −π/2 and +π/2. The providing of the transparent phase distribution shown here and generated by a phase mask is illustrated in FIG. 6. A horizontally orientated slit-like extended light source is preferred for a vertically implemented 1D encoding of a hologram, that is, vertical parallax-only (VPO). The horizontal extension of the slit, that is the width of the slit, can be e.g. approximately 5 mm. The envelope of the horizontal direction, which is parallel to the x-axis or y-direction of the light source plane, is a rect function. This means that the rect function shows a rectangular plateau with a value of 1 on the plateau and a value of 0 (zero) in the outside area. The vertical direction, which is parallel to the y-axis or y-direction of the light source plane, is modulated. The modulation is equivalent to a sinc function, more explicit it is the absolute value of a sinc function.

Figure 11:
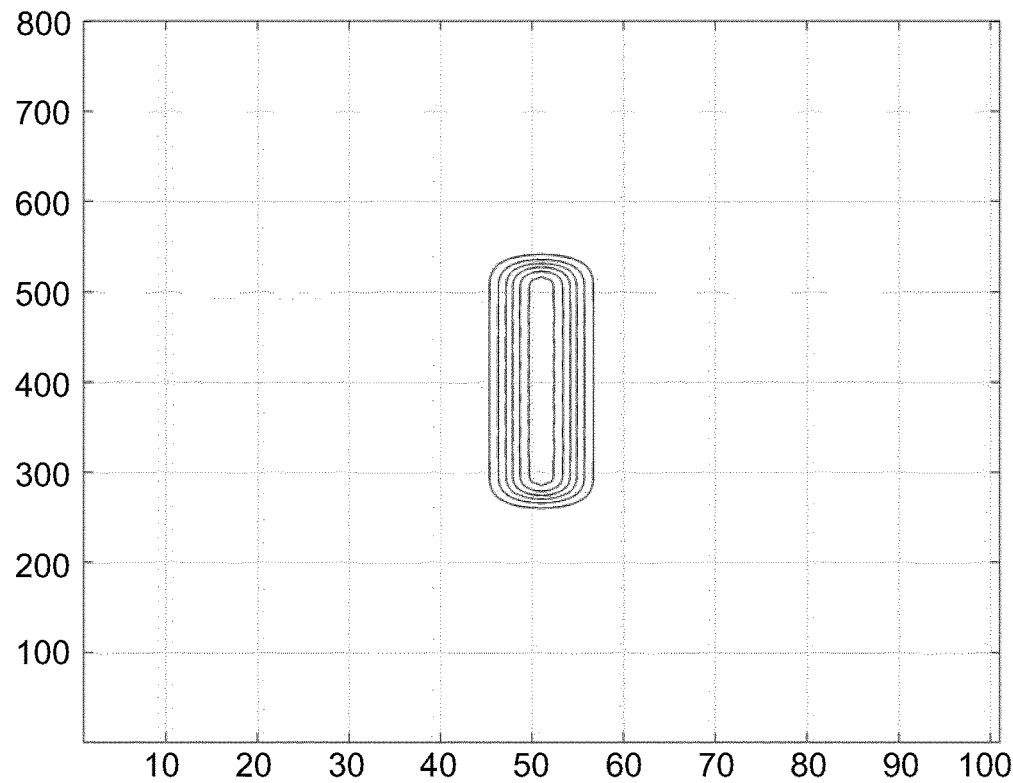
FIG. 11 shows a top view contour plot of a spatial distribution of an absolute value of a complex degree of mutual coherence $|\mu_{12}|$ in a plane of the spatial light modulator device, which is obtained by using the amplitude distribution $a_{LS}$ of FIG. 9 and the binary phase distribution $\phi_{LS}$ shown in FIG. 10.

FIG. 11 shows a top view contour plot of the distribution of the absolute value of the complex degree of mutual coherence $|\mu_{12}|$ in the plane of the spatial light modulator (SLM) to be illuminated, in other words in the Fourier plane of the collimated extended light source, within a holographic display device. The contour plot can be obtained by using the intensity distribution of FIG. 9 and the binary phase distribution shown in FIG. 10. It can be seen that a proposed and desired plateau is obtained. Such a plateau can be used e.g. for one-dimensional encoded holographic display devices.

The embodiment regarding FIG. 9 can be practical for being used in order to prepare or generate the distribution of the complex degree of mutual coherence $|\mu_{12}|$ for holographic display devices using 1D encoding of sub-holograms. In this embodiment, for example, vertical parallax-only encoding is assumed, in other words vertical orientation of the sub-holograms lens stripe segments and e.g. vertical orientation of the color filter stripes is assumed. A time-sequential RGB reconstruction of holograms does not require the implementation of color filter.

The flat-top distribution of the absolute value of the complex degree of mutual coherence $|\mu_{12}|$ is sufficiently for being used within holographic display devices using 1D encoding of sub-holograms.

For a 1D encoding using vertical parallax-only there are a horizontal rect function apodized with a corresponding horizontal Gaussian function and a vertical complex-valued sinc function with another vertical Gauss function. An additional phase term can shift the plane of the tailored distribution of the absolute value of the complex degree of mutual coherence $|\mu_{12}|$ from the far field into the SLM plane. Furthermore, phase terms can be added to the plane of the extended light source in order to, e.g., compensate for aberrations.

Figure 19:
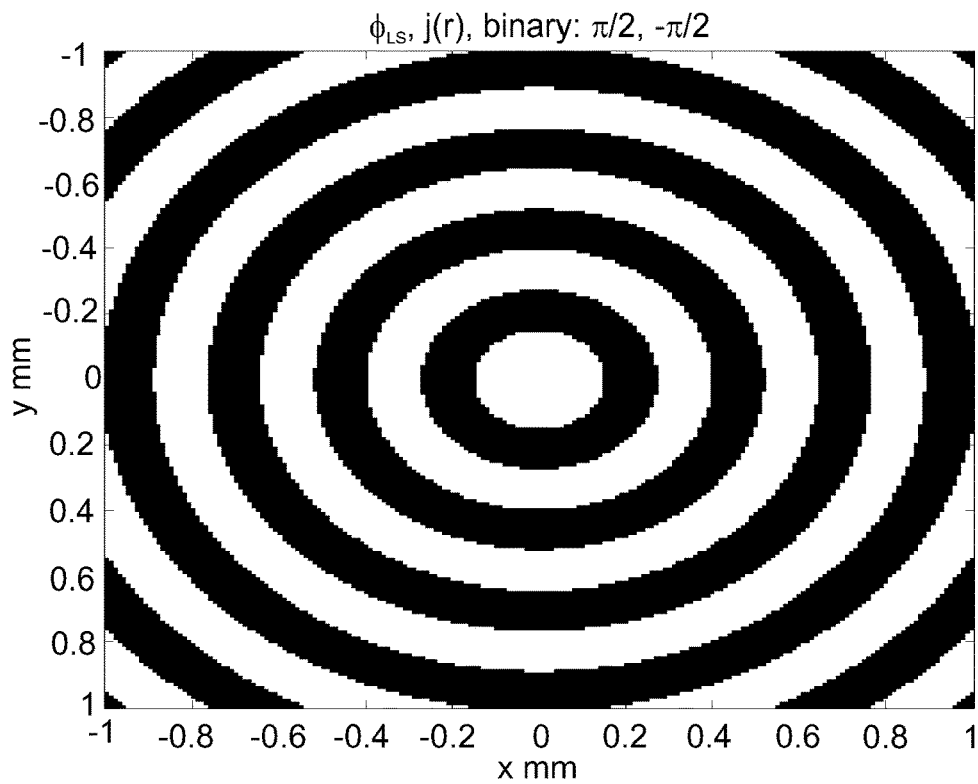
FIG. 19 shows a phase distribution $\phi_{LS}$, which should be combined with the amplitude distribution $a_{LS}$ of FIG. 18 to achieve a distribution of the absolute value of the complex degree of mutual coherence $|\mu_{12}|$, that is optimized for a two-dimensional encoding and circular shaped sub-holograms.

In addition to the static terms such as the distribution shown in FIG. 19 or aberration compensating static phase terms, which are summed up in order to form the complex-valued extended light source, a randomized dynamic phase distribution might be added to the plane of the extended light source.

A simple approach within the illumination device may be to use a more or less standard dynamic diffuser. But this does not result in a homogeneous intensity distribution of the display device. Additionally, such an approach is not energy-efficient enough. In order to provide a homogeneous illumination of the collimation unit, diffractive beam shaping elements can be used, which provide a flat-top intensity distribution present in the plane of the collimation unit. The collimation unit can comprise e.g. a diffractive Bragg diffraction based lens, an off-axis parabolic mirror (OAPM), a refractive achromatic lens, or engineered diffusers. These engineered diffusers can be tailored in order to provide the requested intensity distribution in the entrance plane of the collimation unit, e.g. shown in FIG. 2, while being illuminated with the defined intensity distribution of the extended light source to be collimated, e.g. shown in FIG. 8.

The dynamic spatially randomized phase modulation, which has to be present within the plane of the extended light source, has to be reasonable fast. Within a single time frame a wavelength stabilized laser diode as light source is switched "ON", that is e.g. 2 ms, a plurality of randomized phase should be generated.

Figure 12:
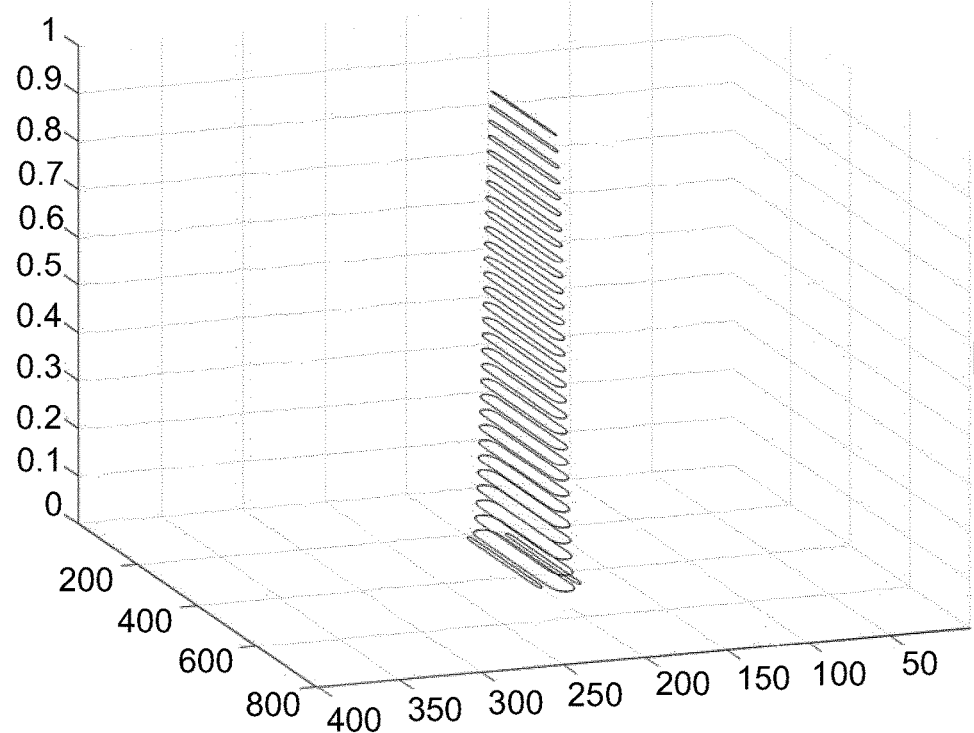
FIG. 12 shows a three-dimensional contour plot of the distribution shown in FIG. 11.

FIG. 12 shows a three-dimensional contour plot of the distribution of the absolute value of the complex degree of mutual coherence $|\mu_{12}|$, which is already shown in FIG. 11 and which has to be present in the entrance plane of an SLM displaying 1D encoded sub-holograms. The entrance plane of the SLM is not the Fourier plane of the extended light source, i.e. not in the case of realizing compact direct view display embodiments. This is the reason why a field lens should be used in the plane of the extended light source, e.g. as shown in FIG. 3, or in a related plane, e.g. as shown in FIG. 4, which shifts the desired distribution of the absolute value of the complex degree of mutual coherence $|\mu_{12}|$ into the plane of the SLM. It can be seen that the spatial distribution has the shape of a one-dimensional sub-hologram. As can be seen further, side lobes are sufficiently eliminated along the horizontal direction and along the vertical direction. In the case of a head-mounted display (HMD), which generates holographic three-dimensional scenes or objects, it might be more practical to provide a small SLM comprising the sub-holograms in the Fourier plane of the extended complex-valued light source forming the desired distribution of the absolute value of the complex degree of mutual coherence $|\mu_{12}|$.

Figure 13:
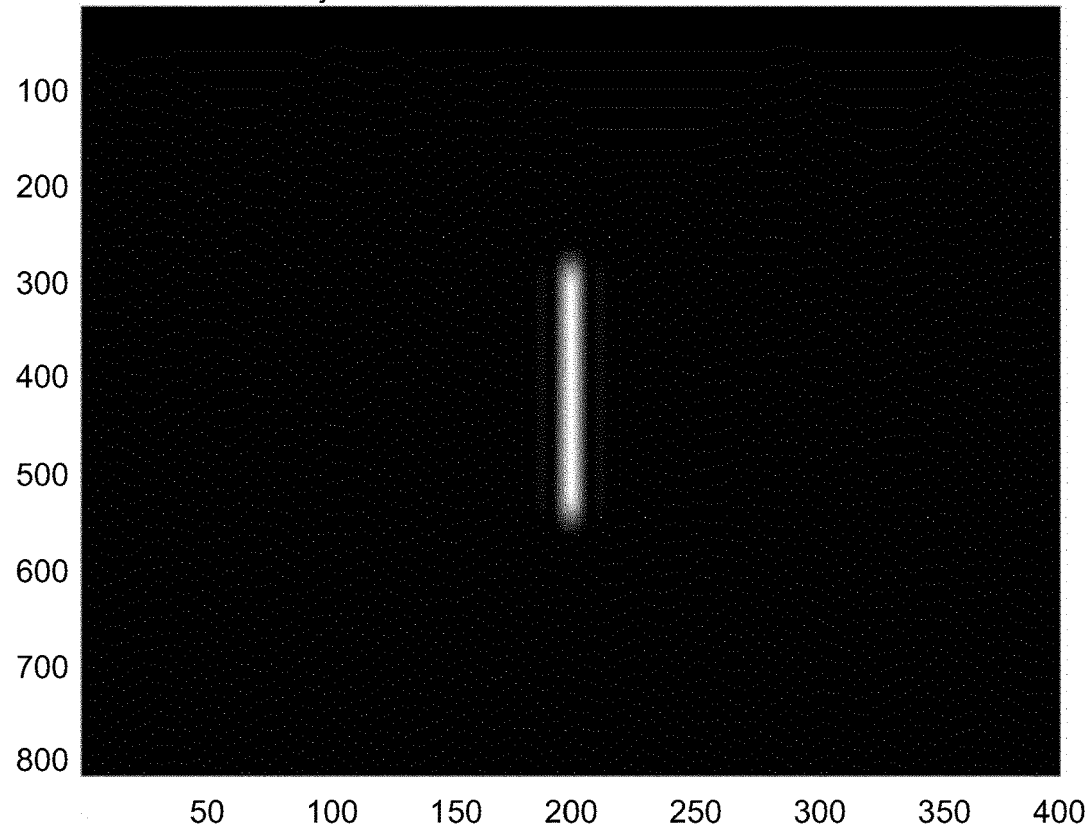
FIG. 13 shows an image of the spatial distribution of the absolute value of the complex degree of mutual coherence $|\mu_{12}|$ shown in FIGS. 11 and 12.

FIG. 13 shows an image of the distribution of the absolute value of the complex degree of mutual coherence $|\mu_{12}|$, which is already shown in FIGS. 11 and 12. This distribution should exist in the entrance plane of the SLM illuminated. A field lens, which is arranged e.g. in the plane of the extended light source, can be used in order to shift the plane comprising this distribution from the Fourier plane of the extended light source into the entrance plane of the illuminated SLM. An exception is the case of arranging the SLM direct within the Fourier plane of the extended complex-valued light source.

As can be seen, the plateau-type distribution of the absolute value of the complex degree of mutual coherence obtained in the SLM plane has the shape of a one-dimensional sub-hologram. Horizontal side lobes and vertical side lobes are eliminated.

The following described embodiments and explanations refer to two-dimensional (2D) encoded sub-holograms or, in other words, to a 2D encoding of a hologram.

Figure 14:
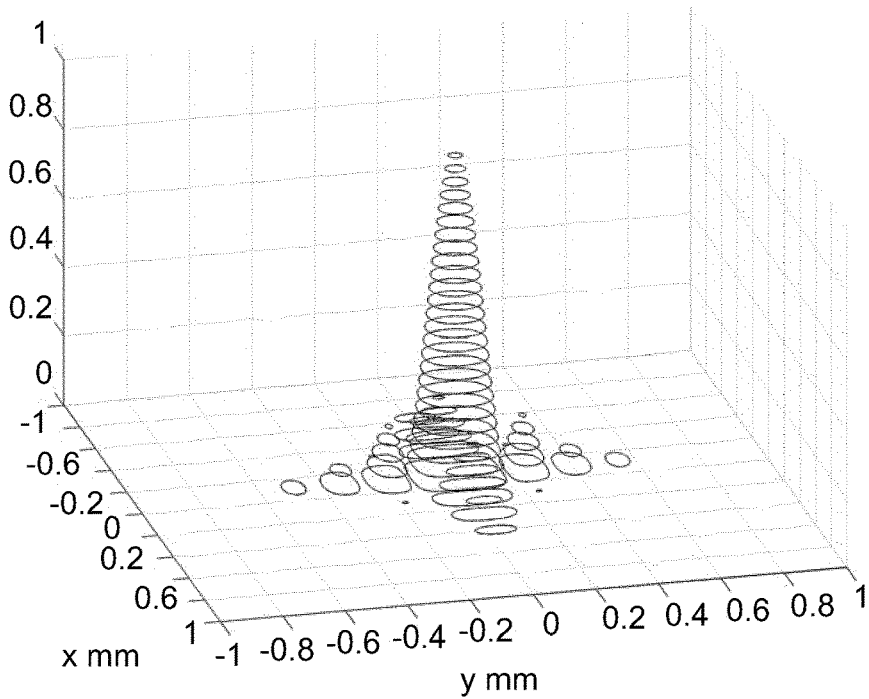
FIG. 14 shows the spatial distribution of the amplitude $a_{LS}$ of the complex valued extended light source, which is optimized for a two-dimensional encoding and rectangular shaped sub-holograms, where

In FIG. 14 a three-dimensional contour plot of a sinc-type amplitude distribution, which can be used in the plane of an extended light source is shown. This FIG. 14, which is relevant for 2D encoding of rectangular sub-holograms, refers to FIG. 9, which is relevant for 1D encoding of line segment-like sub-holograms. However, the distribution of the absolute value of the complex degree of mutual coherence $|\mu_{12}|$ shown here is optimized for a 2D encoding of a hologram and, for example, rectangular shaped sub-holograms. Here, the number N used for a modified Gauss apodization is 2 along the y-direction and along the x-direction of the extended light source plane.

In other words, an amplitude distribution $a_{LS}$ of an extended light source is shown, which is designed for 2D encoded rectangular, more specific square type, sub-holograms. The amplitude distribution is equivalent to a rectangular shaped sinc(x,y) function multiplied by an additional apodization factor $\exp(-Nx^2/\sigma^2)$ times $\exp(-Ny^2/\sigma^2)$ using an N of 2 and a $\sigma$ of 1 mm for both Gaussian apodization functions present along the two orthogonal directions, that is x-direction and y-direction.

Figure 15:
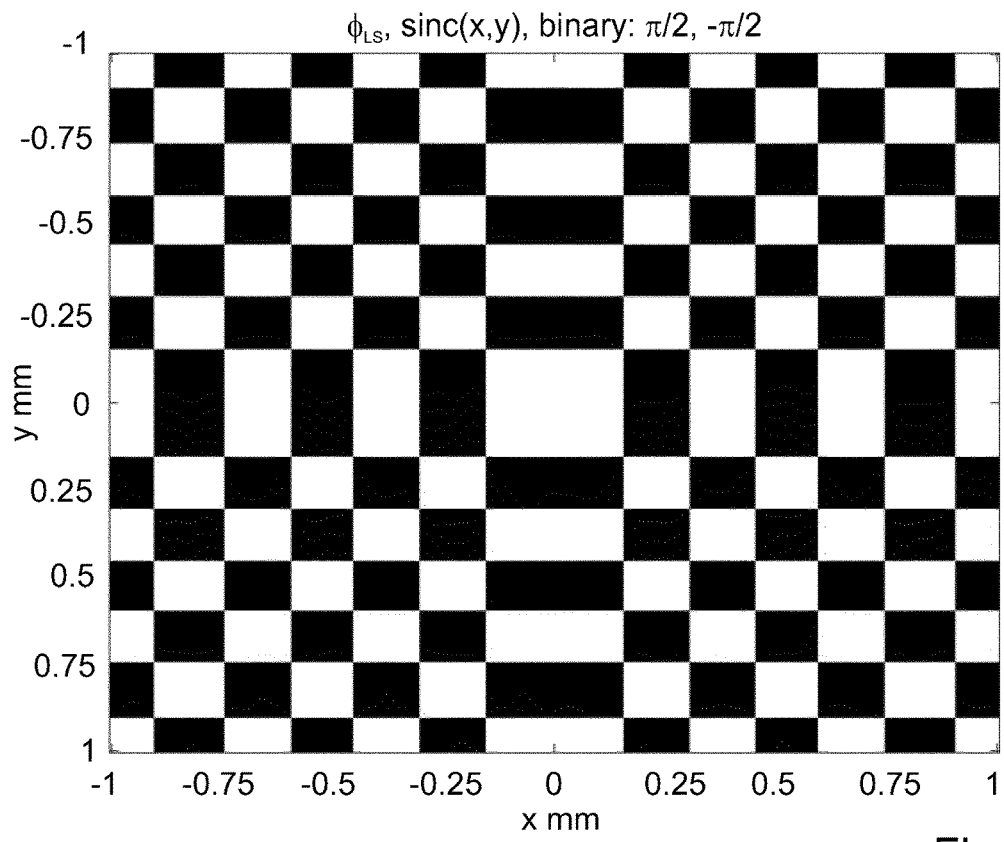
FIG. 15 shows a binary phase profile $\phi_{LS}$ of a two-dimensional complex-valued sinc function, which is related to the case of a one-dimensional encoding shown in FIG. 10 and now optimized for a two-dimensional encoding and rectangular shaped sub-holograms.

FIG. 15 shows a binary phase profile $\phi_{LS}$ or phase distribution of a two-dimensional sinc function, which refers to the amplitude distribution $a_{LS}$ shown in relation to FIG. 10. In other words, the extended complex-valued distribution of the light source, which is used for 2D encoding of rectangular sub-holograms, is a sinc function, which contains additional Gauss-type amplitude apodization. This complex-valued sinc function has an amplitude distribution $a_{LS}$, which is illustrated in FIG. 14, and a phase distribution $\phi_{LS}$, which is illustrated in FIG. 15.

However, the distribution of the absolute value of the complex degree of mutual coherence $|\mu_{12}|$ shown here is optimized for a 2D encoding of a hologram and, for example, rectangular shaped sub-holograms.

For two-dimensional encoded circular sub-holograms it is important to provide, for example, a circular area-like, flat-top distribution of the mutual coherence, which should not exceed e.g. 5 mm. This means to provide a preferable circular shaped flat-top like shaped coherence area having a diameter of e.g. 5 mm. As already noted, here, two-dimensional (2D) encoding of sub-holograms is assumed, which are preferable circular.

In other words, the approach for 2D encoded sub-holograms is to provide a flat-top-like shaped distribution, preferably a circular shaped distribution, of the absolute value of the complex degree of mutual coherence $|\mu_{12}|$, which should not exceed an extension of e.g. 5 mm. This diameter or extension can be reduced e.g. down to the diameter of the entrance pupil of the human eye. Preferably, a maximum encoded object point distance from the SLM plane to the observer distance of 50% is assumed here. For example, if the observer is placed at z=600 mm in front of a desktop-type three-dimensional display device generating holographic three-dimensional scenes or objects, the maximum encoded distance might be e.g. 300 mm. The maximum diameter of the sub-holograms can be reduced e.g. down to ≤3 mm only. This saves computational load and increases the calculation and optimization speed significantly, e.g. by a factor of 3×.

Analogue to the described complex-valued shaping of the extended light source used within a 1D encoded holographic display device, the complex-valued sinc function might be a preferred function of the extended light source used for 2D encoded holographic display devices. For example, a square or rectangular shaped sinc function can be used within the plane of the extended light source. Such a function is preferred if the sub-holograms are also shaped as squares or rectangles. It is also possible that the sub-holograms have a different shape as, for example, circular or hexagonal. The shape of the sinc function should be adapted accordingly to the shape of the sub-hologram. In other words, the shape of the sinc function is adaptable to the shape of the sub-holograms. And, as disclosed for a 1D encoding of a sub-hologram already, e.g. additional Gaussian-type apodization profiles can be multiplicatively added to the initial two-dimensional sinc(x,y) function, e.g. a rectangular shaped two-dimensional sinc(x,y) function.

Due the fact that no significant amplitude values are present in the corners of the distribution shown in FIG. 14, the corresponding phase distribution of the complex-valued extended light source shown in FIG. 15 can be set, for example, to a constant value in these corner regions.

Figure 16:
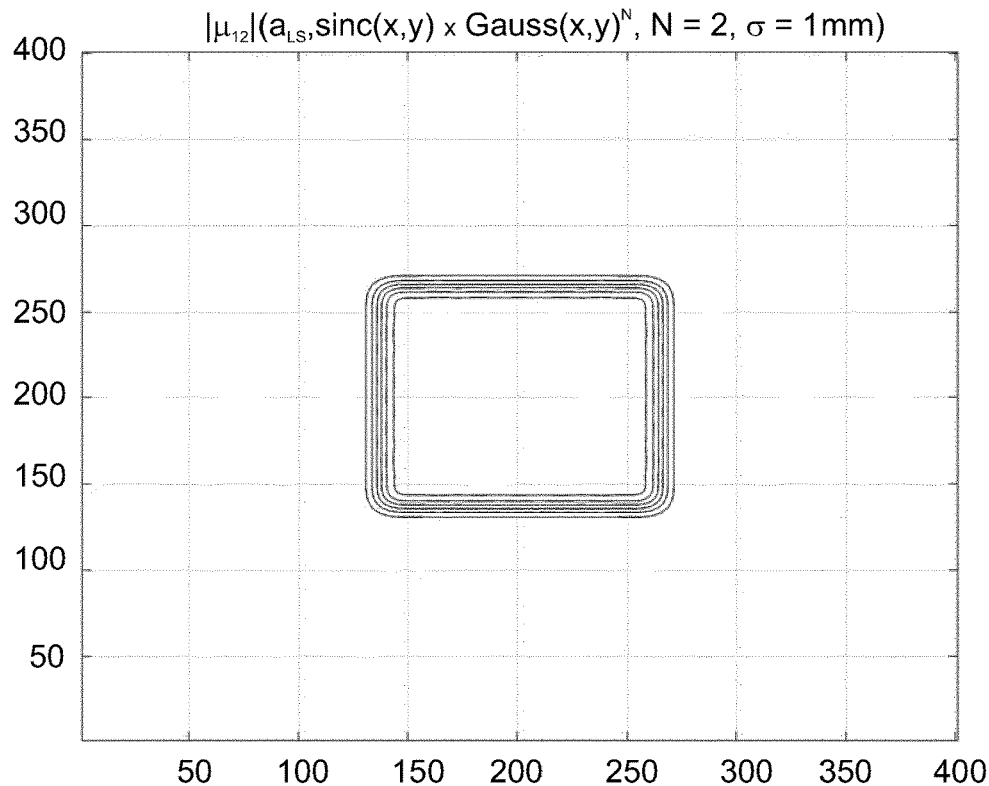
FIG. 16 shows a distribution of the absolute value of the complex degree of mutual coherence $|\mu_{12}|$, which is related to FIG. 11 and now optimized for a two-dimensional encoding and rectangular shaped sub-holograms.

FIG. 16 shows a contour plot of the distribution of the absolute value of the complex degree of mutual coherence $|\mu_{12}|$. Such a the distribution of the absolute value of the complex degree of mutual coherence $|\mu_{12}|$ should exist in the SLM plane, where this distribution is generated by collimating a light source, which is modulated in its amplitude distribution and its phase distribution as shown in FIGS. 14 and 5. Additionally, this complex-valued extended light source is provided with an adapted field lens. The adapted field lens ensures that the desired distribution of the absolute value of the complex degree of mutual coherence $|\mu_{12}|$ is present in the desired plane, which is the entrance plane of the SLM.

However, if no adapted field lens and standard collimation of the extended light source is used, a distribution similar to the distribution shown in FIG. 16 is present in the Fourier plane of the light source. The Fourier plane is provided behind the collimation unit used and has a distance to the principal plane of the collimation unit, which is equivalent to the focal length fCL of the collimation unit.

FIG. 16 can be compared with FIG. 11, which shows a distribution of the absolute value of the complex degree of mutual coherence $|\mu_{12}|$ optimized for 1D sub-holograms. However, the distribution of the absolute value of the complex degree of mutual coherence $|\mu_{12}|$ shown in FIG. 16 is optimized for a 2D encoding and rectangular shaped sub-holograms.

Figure 17:
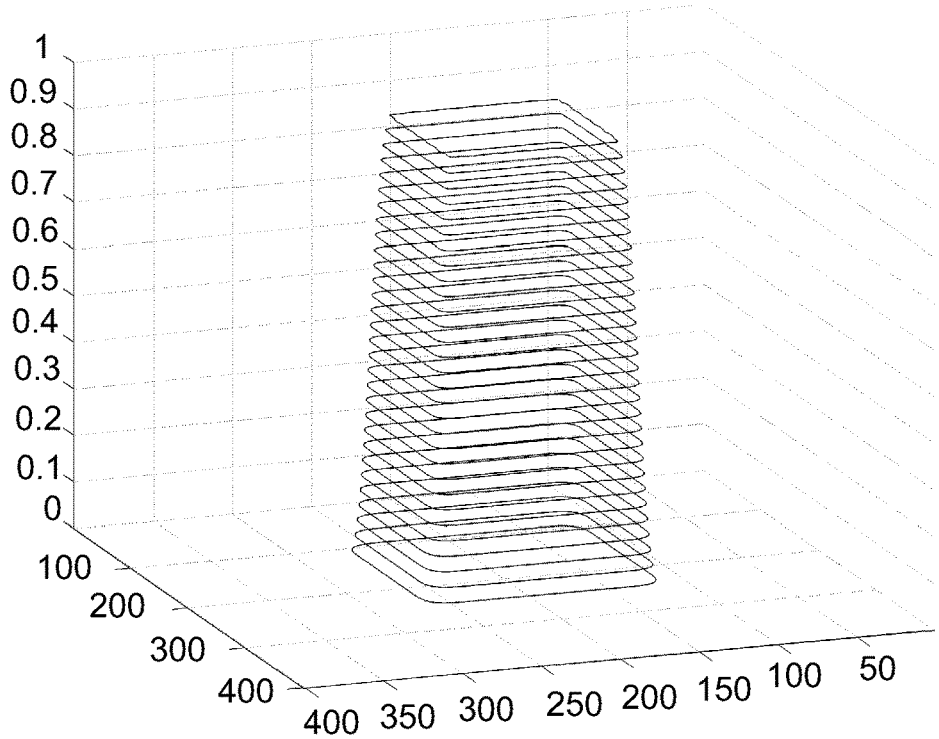
FIG. 17 shows a three-dimensional contour plot of the distribution $|\mu_{12}|$ of FIG. 16.

In FIG. 17 a three-dimensional contour plot of the same distribution of the absolute value of the complex degree of mutual coherence according to FIG. 16 is shown.

As can be seen further in the FIGS. 16 and 17, a very smooth flat-top-type distribution of the absolute value of the complex degree of mutual coherence can be obtained. Such a very smooth flat-top distribution of the absolute value of the complex degree of mutual coherence is advantageous for two-dimensional encoded rectangular shaped sub-holograms.

For example, an additional spherical phase term or a lens function, as e.g. realized by the additional field lens, can be added to the tailored complex-valued distribution, which is present in the plane of the extended light source. This can be carried out in order to shift the distribution of the absolute value of the complex degree of mutual coherence $|\mu_{12}|$ exactly into the plane of the SLM, i.e. into the plane where this distribution is required. Additional corrections might be carried out in order to e.g. compensate for further aberrations, which might be present within the beam path. Thus, aspherical phase terms can also be implemented.

And, a dynamic randomized beam shaping phase distribution, as, for example, provided by a rotated or reasonable fast laterally shifted engineered diffuser, can be added to the tailored complex-valued distribution, which is present in the plane of the extended light source. This can be carried out in order to provide the dynamic random phase fluctuations, which is required within a time period of each reconstructed holographic frame, that is within a time period of e.g. 1 ms to 4 ms. The procedure of using a tailor-made complex-valued extended light source requires a dynamic and randomized phase fluctuation, which is present in the plane of this light source. The preceding disclosure does not deal with the beam shaping, which is advantageous in order to provide a homogeneous intensity distribution in the entrance plane of the SLM. However, both functions can be combined with each other. Or, both functionalities might also be realized by using separated optical elements.

For circular shaped sub-holograms it can be preferred to use a rotational symmetric flat-top distribution of the absolute value of the complex degree of mutual coherence $|\mu_{12}|$.

It can also be preferred to use rotational symmetric sub-holograms, which comprise, for example, only approx. 0.785 times the number of pixels compared to square or rectangular shaped sub-holograms if it is assumed the largest circle fitted into a square used for this comparison. This secures encoding power and electrical power. This factor of 0.785 can be further reduced, for example, to 0.1 in case of considering the effective entrance pupil size.

Despite the reduction of the required calculation power, the reduction of the distribution of the absolute value of the complex degree of mutual coherence to a required minimum is preferred in order to minimize the retinal inter object point crosstalk.

A preferred distribution of an extended light source for circular shaped sub-holograms is a complex-valued Bessel-type shaped distribution. This is different to a rotational symmetric sinc(r) function, which is not preferred in that case. This is due to the fact that a Bessel distribution provides a much better plateau-type distribution of the absolute value of the complex degree of mutual coherence $|\mu_{12}|$ than it would be the case if using a sinc(r) function.

Figure 18:
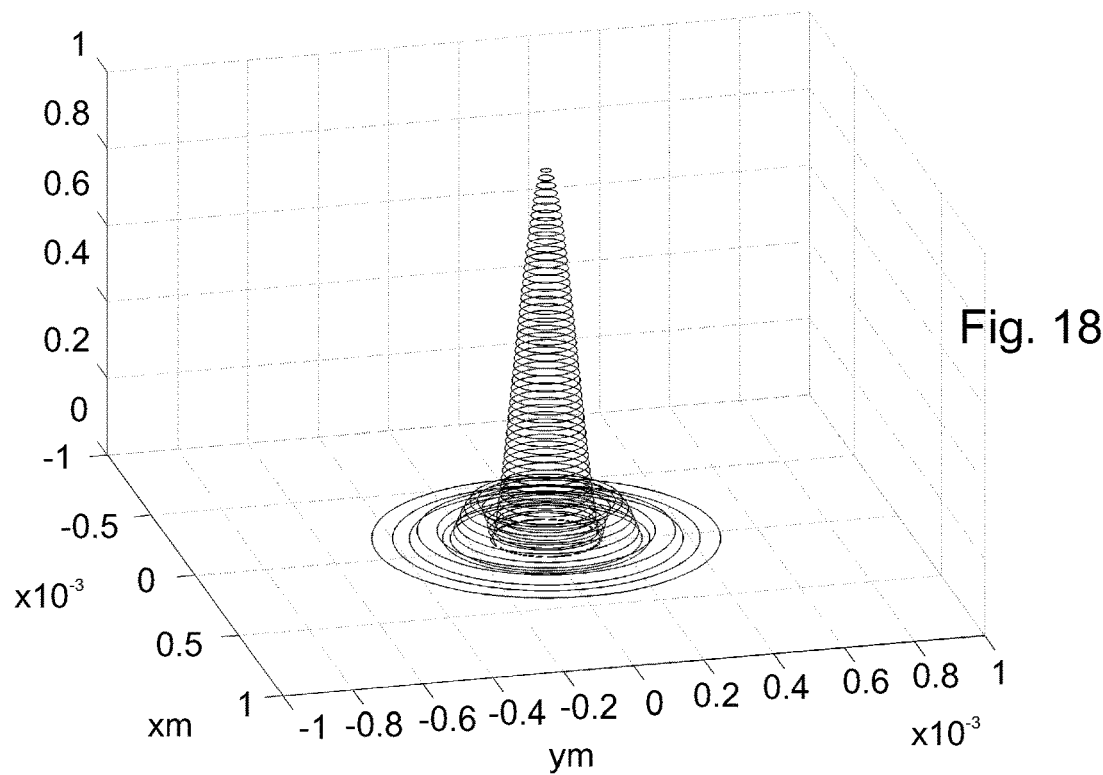
FIG. 18 shows an Airy-type equivalent amplitude distribution $a_{LS}$ of a complex-valued extended light source optimized for a two-dimensional encoding using circular sub-holograms; a Gauss-type apodization is applied; the intensity distribution of the extended light source is proportional to the square of the amplitude distribution.

FIG. 18 shows an Airy-type amplitude distribution of an extended light source optimized for circular sub-holograms. The Airy intensity distribution is proportional to the square of the amplitude distribution.

FIG. 19 shows a corresponding binary phase distribution which has to be combined with the amplitude distribution shown in FIG. 18. The distribution of the absolute value of the complex degree of mutual coherence $|\mu_{12}|$ obtained here is optimized for 2D encoding and circular shaped sub-holograms.

In other words, FIG. 18 shows the amplitude distribution of a Bessel-type shaped complex-valued extended light source multiplied by an additional apodization factor $\exp(-Nr^2/\sigma^2)$ that uses an N of 2 and a $\sigma$ of 1 mm, where r is the radius in the plane of the extended light source. The radius is $r=(x^2+y^2)^{0.5}$, where x and y are the Cartesian coordinates in the plane of the light source plane. The number of level steps spanning a range between 0 and 1 is fifty (50). The binary phase distribution $\phi_{LS}(r)$ corresponding to this amplitude distribution of the two-dimensional Bessel-type light source to be collimated is illustrated in FIG. 19. The complex-valued function of the extended light source is defined by $c_{LS}=a_{LS}*\exp(i\phi_{LS})$. For example, the diameter of the first minimum of the Bessel-type amplitude distribution is $d_1=300$ μm.

Figure 20:
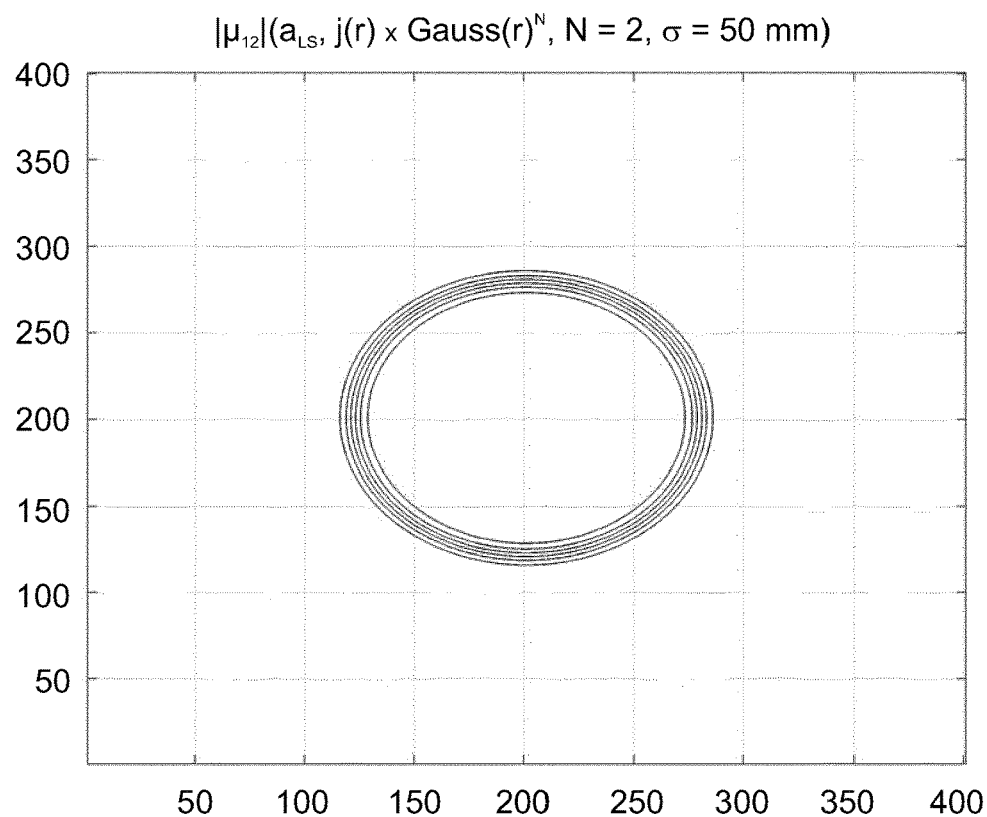
FIG. 20 shows a distribution of the absolute value of the complex degree of mutual coherence $|\mu_{12}|$ that is optimized for a two-dimensional encoding and circular shaped sub-holograms, relating to FIG. 11 but optimized for a two-dimensional case.
Figure 21:
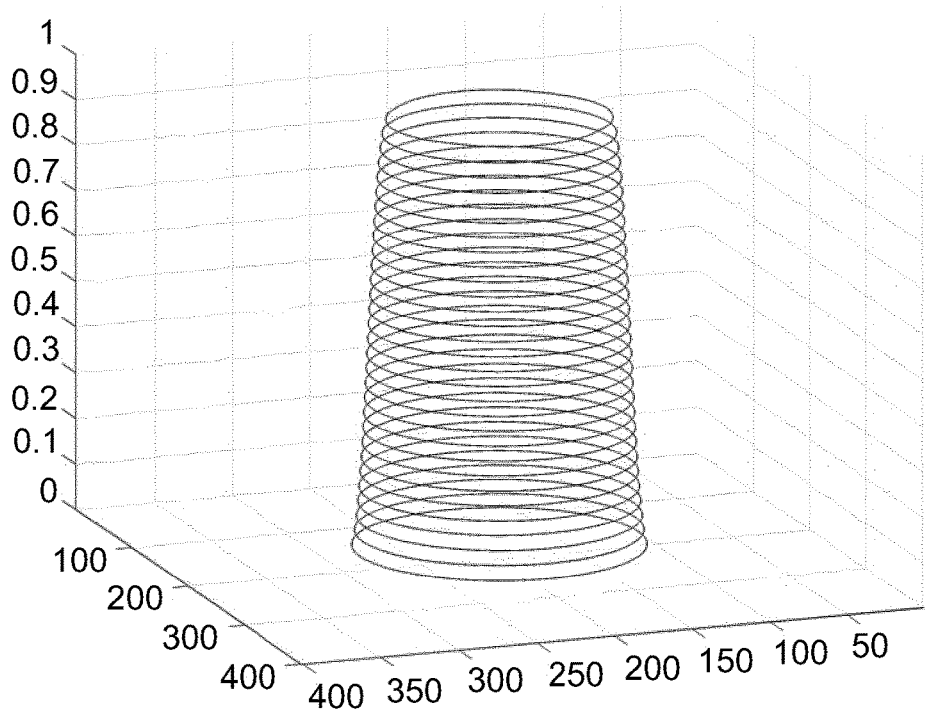
FIG. 21 shows a distribution of the absolute value of the complex degree of mutual coherence $|\mu_{12}|$ that is optimized for a two-dimensional encoding and circular shaped sub-holograms, relating to FIG. 12 but optimized for a two-dimensional case.

In FIGS. 20 and 21 different contour plots of a circular shaped flat-top-type distribution of the absolute value of the complex degree of mutual coherence $|\mu_{12}|$ present in the Fourier plane of the collimated light source having a complex-valued modulation as shown in FIGS. 18 and 19 are shown. The distribution of the absolute value of the complex degree of mutual coherence $|\mu_{12}|$ shown here is optimized for 2D encoding and circular shaped sub-holograms. A field lens function, which should be implemented in the plane of the light source, shifts this distribution into the plane of the SLM, where it is required in order to fit the shape of the largest sub-holograms used.

Thus, a complex-valued Bessel function can be used in the plane of the extended light source in order to provide a circular flat-top plateau-type distribution of the absolute value of the complex degree of mutual coherence of the wave field the SLM is illuminated with. Several additional distributions of amplitude apodization window functions can be used as a factor the initial Bessel function is multiplied by.

Figure 22:
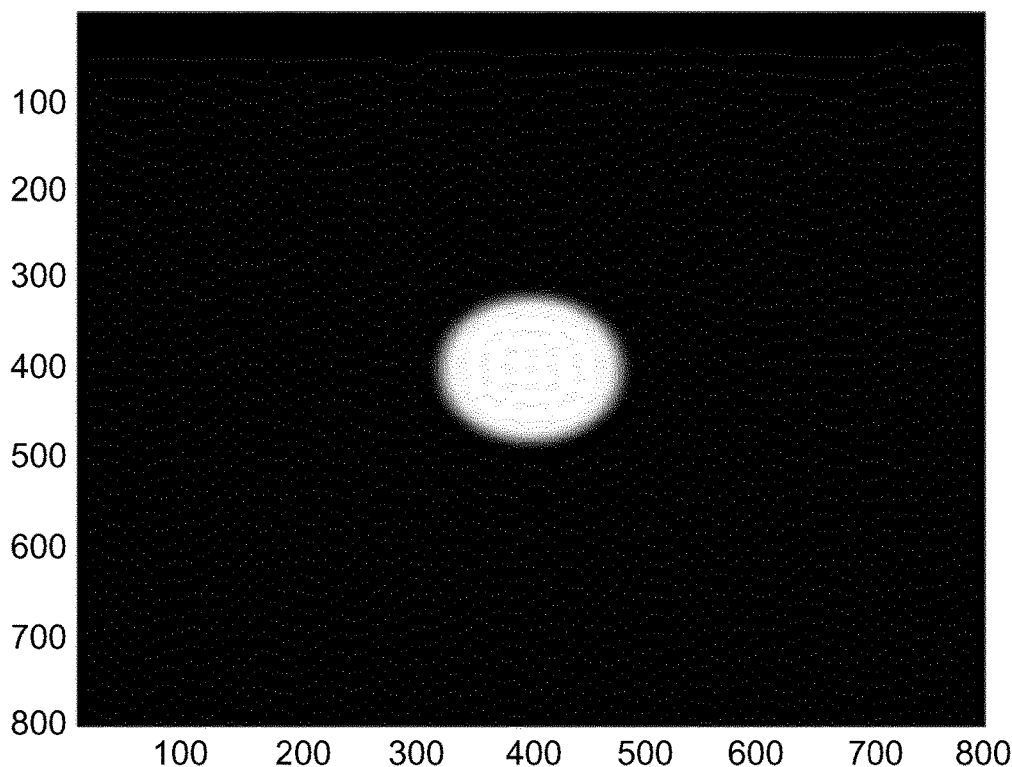
FIG. 22 shows a distribution of the absolute value of the complex degree of mutual coherence $|\mu_{12}|$ that is optimized for a two-dimensional encoding and circular shaped sub-holograms, relating to FIG. 13 but optimized for a two-dimensional case.

FIG. 22 shows a gray scale plot of the circular shaped flat-top-type distribution of the absolute value of the complex degree of mutual coherence in the Fourier plane of the collimated light source modulated as shown in FIGS. 18 and 19. FIG. 22 can also be compared with FIG. 13, which represents the case of 1D encoded sub-holograms. The distribution of the absolute value of the complex degree of mutual coherence $|\mu_{12}|$ shown here is optimized for 2D encoding and circular shaped sub-holograms. As can be seen here, the distribution of the absolute value of the complex degree of mutual coherence $|\mu_{12}|$ is formed approximately as required for two-dimensional (2D) encoded circular shaped sub-holograms. A lens function is required in the plane of the extended light source in order to shift the desired distribution of the absolute value of the complex degree of mutual coherence into the plane of the SLM. Thus, the distribution shown in FIG. 22 represents the distribution of the absolute value of the complex degree of mutual coherence $|\mu_{12}|$ in the entrance plane of the SLM.

In the following sections, further modifications of the distribution of the complex amplitude of the light source plane to be collimated will be described.

As already disclosed, static and complex-valued sinc(y) functions, sinc(x,y) functions or Bessel functions, for example combined with Gaussian functions, can be used to obtain the intended flat-top distribution of the absolute value of the complex degree of mutual coherence $|\mu_{12}|$. Lens-type phase terms in the plane of the extended light source can be used to shift said distribution to the SLM plane. And additional amplitude terms, as for example Gauss or Gauss $(x,y)^N$, $N=1, 2, \ldots$ (positive integer, e.g.), can be used in the plane of the extended light source in the spatially incoherent direction in order to suppress side lobes in the diffraction pattern generated by the extended light source, i.e. to suppress side lobes of the distribution of the absolute value of the complex degree of mutual coherence $|\mu_{12}|$. Moreover, the amplitude of the complex value present in the plane of the extended light source along the coherent direction providing, for example, a sinc-like amplitude profile or distribution already can be superimposed with an additional amplitude profile or distribution, as for example a Gauss$^N$ profile (also referred to as super Gauss) for $N\geq 2$.

The teaching of this disclosure also includes an additional way to obtain the required target distribution of the absolute value of the complex degree of mutual coherence $|\mu_{12}|$. According to this, it is also possible to use the target distribution of the absolute value of the complex degree of mutual coherence as starting point and calculate the distribution of the complex amplitude of the extended light source plane to be collimated by, for example, using an inverse Fourier transform. This also can be done in an iterative way. Thus, it is also possible to use the iterative Fourier transform algorithm (IFTA) in order to obtain the distribution of the complex amplitude of the extended light source plane. The additional lens term, which is required in the plane of the extended light source, has to be considered finally although a Fourier transform might be used as starting point of an optimization. However, it is also possible to start directly in the SLM plane and use wave propagation methods backwards in order to obtain the complex-valued distribution of the extended light source required within the discrete display embodiment.

A main procedure may be to use a lowest number of possible optical elements. Thus, functionalities of different optical elements can be combined if possible and appropriate.

In general, the shaping of the distribution of the absolute value of the complex degree of mutual coherence as a flat-top distribution is preferred. However, alternatively shaped distributions, for example Gaussian shaped distributions or Kaiser-Bessel-Window shaped spatial coherence distributions, are also possible candidates for the distribution of the absolute value of the complex degree of mutual coherence $|\mu_{12}|$. Also, a sinc function-like shaped coherence distribution with phase shifted side lobes might be used if it is considered during the encoding operation.

Further exemplary embodiments are described below in detail that provides tailored coherence for 1D and 2D encoded holograms. The propagation distance from the light source plane considered might differ for different positions within the SLM plane. This is e.g. the case if a wedge-type backlight unit is used. The plane to be provided with the required target distribution of the absolute value of the complex degree of mutual coherence $|\mu_{12}|$ is the plane of the SLM. The propagation distance from the collimation unit to the SLM might thus differ for different segments of the SLM plane. The preparation and generation of the distribution of the absolute value of the complex degree of mutual coherence $|\mu_{12}|$ should consider this different propagation distances.

1) Work with a Fixed Distribution of the Absolute Value of the Complex Degree of Mutual Coherence $|\mu_{12}|$:

Several approaches can be used. An approach may be to work with a distribution of the absolute value of the complex degree of mutual coherence $|\mu_{12}|$ that is optimal, for example, for the center of the area of the SLM but is a little bit smaller or larger in other areas of the SLM. This means that a practical compromise should be used that is reasonable close to the optimum.

The working with a fixed distribution of the absolute value of the complex degree of mutual coherence $|\mu_{12}|$ that might be optimal within a center of the area of the SLM should require low technological effort. It is, however, essential to note that the changed propagation distance will change the distribution of the absolute value of the complex degree of mutual coherence. The optical design can be chosen in a way to realize a fixed embodiment, which provides a distribution of the absolute value of the complex degree of mutual coherence $|\mu_{12}|$ that might be an optimal average within the plane of the SLM to be illuminated.

2) Low Numerical Aperture Arrangements:

The use of a low numerical aperture makes it possible to realize a large depth of focus, which can be applied for the propagation of the distribution of the absolute value of the complex degree of mutual coherence $|\mu_{12}(x,y,z)|$ within the optical system of the holographic display device. This means that a long focal length $f_{CL}$ of the collimation unit collimating the light source can be used. For example, for a display device a focal length of the collimation unit of $f_{CL}=250$ mm might be changed to $f_{CL}=500$ mm or even to a larger value of the focal length, which might be e.g. $f_{CL}=750$ mm.

By way of example, if a fixed diameter of the collimation unit of $D_{CL}$ is assumed, the numerical aperture of the collimation unit is $NA_{CL}=\sin(\arctan D_{CL}/(2*f_{CL}))$. For a diameter of $D_{CL}=50$ mm and a focal length of $f_{CL}=500$ mm the numerical aperture is $NA_{CL}=0.05$. And if the focal length is changed from $f_{CL}=500$ mm to $f_{CL}=250$ mm the numerical aperture is $NA_{CL}=0.1$. In case of using small aperture angles only, the doubling of the focal length of the collimation unit means the halving of the numerical aperture. The numerical aperture is $NA=\sin(u/2)$. The $F_{CL}$ number is obtained if the focal length $f_{CL}$ of the collimation unit is divided by its diameter $D_{CL}$. If $F_{CL}=10$ is changed to $F_{CL}=5$, the numerical aperture $NA_{CL}=0.05$ is changed to $NA_{CL}=0.1$.

Thus, the depth of focus (DOF) is proportional to the square of the numerical aperture, that is $DOF\sim NA^2$. In that example, the halving of the numerical aperture means the increase of the depth of focus by a factor of four.

Item 1) Work with a fixed distribution of the absolute value of the complex degree of mutual coherence $|\mu_{12}|$—can be combined with item 2) Low numerical aperture arrangements—in order to provide a wave field having a reasonable constant complex-valued distribution, which can be maintained along a practical propagation length z.

3) Increase of the Depth of Focus by Using Focal Sampling Methods:

A further option for providing a tailored coherence for 1D and 2D encoded holograms is the increase of the depth of focus (DOF) of the collimation unit or in more detail the increase of the depth of focus behind the collimation unit by using focal sampling methods. For example, a phase sampling arrangement can be provided as a phase correction profile of a collimation unit in order to increase the depth of focus.

This means that a phase correction profile is added to the function of the collimation unit. For such a purpose and as an example, the phase correction profile comprises three segments having a constant phase distribution. This means that these segments do not change the focus of the initial collimation unit. Three additional segments add further positive focal length and three segments add further negative focal length. Thus, nine segments (3×3=9) are implemented in addition. As a result, the depth of focus of the collimation unit bearing the additional phase correction profile can be increased. As a side effect of the segmented phase correction profile some peaks in the point spread function present within the focal region of the combined lens, which is used for collimation and the mentioned phase correction, are existent. A segmented profile can be changed in order to obtain a continuous distribution of the correction profile. It is also possible to use a cubic surface or a cubic phase profile as a correction profile, which provides increased depth of field.

An optimization of the complex-valued distribution of the extended light source to be collimated can be carried out in a way that considers the discrete focal sampling method used. Thus, the light source plane can be optimized regarding the plane of the collimation unit in order to provide the optimum distribution of the absolute value of the complex degree of mutual coherence $|\mu_{12}|$ within the plane of the SLM. Correction profiles, which are used in order to compensate for optical path differences from the plane of the extended light source to the SLM, might added preferably in the plane of the collimation unit. But, in addition, further slight phase correction might be added close to the plane of the extended light source.

There is a plurality of further phase sampling embodiments. For example, a further option can be the use of a two-dimensional Barker code-like sampling of a phase correction profile, preferably a two-dimensional rotational Barker code-like sampling of a phase correction profile or a two-dimensional x-y-symmetric Barker code-like sampling of a phase correction profile, in the collimation unit. Such a two-dimensional Barker phase value allocation pattern can be a binary pattern for two nested phase distributions. The two-dimensional Barker phase value allocation pattern may also have a higher bit depth, which, for example, allows for the spatial sampling of, for example, three or five different phase correction profiles.

Instead of using a pie slice-like spatial sampling of the phase correction profile or a two-dimensional Barker code-like spatial sampling of the phase correction profile added to the phase function of the primary collimation unit it is also possible to use a Voronoi diagram. Such a Voronoi diagram has randomized two-dimensional segments. These segments can be allocated to different phase correction profiles.

More simple sampling allocation profiles are, for example, the use of striped interlaced phase correction functionality or the use of a checkerboard-like allocation profile.

In dependence on the discrete spatial sampling method used different artefacts might be generated that should be considered regarding the influence on the designed distribution of the absolute value of the complex degree of mutual coherence $|\mu_{12}|$ present in the SLM plane. Thus, the discrete embodiment may define the best sampling method to be used in a particular and individual case.

In general, reducing the lateral extension of the sampling zones will generate a transition to the diffractive dominated regime. This applies to all spatial sampling methods. All sampling arrangements or sampling allocation profiles can be used to address the sampling of refractive or diffractive phase correction profiles.

4) Increase the Depth of Focus by Using Diffractive Focal Sampling Methods:

Phase correction profiles, which can be added to the phase function of a collimation unit in order to provide the designed distribution of the absolute value of the complex degree of mutual coherence $|\mu_{12}|$ along an increased light propagation length, can also be implemented by using diffractive structures. This means that, for example, diffractive lens functions can be added to the primary function of the collimation unit.

Although diffractive functions might be spatially sampled this is, however, not absolutely necessary. Diffractive functions can be also used as an overlay of several diffractive structures, which cover, for example, the entire exit aperture of the collimation unit. For example, it is possible to use an entrance plane of the collimation unit and place the overlay of two diffractive correction lens function within this plane. This can be done within one plane without using spatial separated sampling of the diffractive phase correction profiles. This means that the two phase correction profiles can be added in a modulo $2\pi$ scheme.

By way of example, it is assumed that a collimation unit will carry the main load regarding the wave front reshaping referred to as collimation. Describing a simple setup, three separated channels are assumed comprising the beam paths of three primary colors. The collimation unit generates a collimated wave field that can be described by an angular spectrum of plane waves. Now, a simple Fresnel-type surface relief diffractive lens function can be added to the function of the collimation unit. This Fresnel-type surface relief diffractive lens function might have a focal length, for example, of $f_{C1}=1$ m. If a local aspect ratio is close to AR≅0.5, in other words groves and rims or "lines and spaces" have the same lateral extension, and the etching depth of the binary phase structure is:

$$d_{etch}=\lambda/(2\times(n-1)), \quad (1)$$

where $\lambda$ is the wavelength and n is the refractive index of the material, in which the diffractive structure is etched, which can be e.g. a Fresnel lens, for this wavelength, the diffraction efficiency is at its maximum. It might be preferred to implement a diffraction efficiency, for example, of $\eta=0.3$ only. Thus, the etching depth of the Fresnel-type surface relief diffractive lens function can be reduced. Or the aspect ratio has to be changed for the diffractive binary-type Fresnel lens, which is correctly referred to as Fresnel zone plate that differs from the Fresnel lens having also a radial zone-like structure but a gradient profile instead of a binary profile.

A second Fresnel zone plate-type binary surface relief diffractive lens function can be added to the collimation unit. Such a diffractive lens function might have a focal length, for example, of $f_{C2}=-1$ m. It might be used a reduced etching depth in order to realize a diffraction efficiency, for example, of =0.3 only. Or it can be used a $\pi$-shift realizing etching depth, see equation (1), and change the aspect ratio from AR≅0.5 to a different value. This second diffractive phase distribution can be added to the first diffractive phase distribution in a modulo $2\pi$ scheme.

It is also possible to use a standard achromatic collimation unit and add a first diffractive structure at the entrance surface of the collimation unit and a second diffractive phase distribution at the exit surface of the collimation unit. This leads to an increased freedom of design and complexity.

Furthermore, it can be preferred to use diffractive correction within separated beam paths of different primary colors RGB used. Thus, it is also possible to use diffractive correction only within the separated beam paths of the different primary colors RGB. For example, an achromatic collimation unit can be used in the color-combined beam path comprising all primary colors RGB. Thus, the achromatic collimation unit or, for example, an off-axis parabolic mirror (OAPM) used for the collimation of all primary colors RGB might have the main load of the collimation functionality, while the correction might be carried out separately for the individual colors before the light hits a main collimating optical element of the collimation unit, which might be, for example a lens element or a mirror-type element.

5) Increase the Depth of Focus by Using Polarization Sampling Methods:

Phase correction profiles, which can be added to the phase function of the collimation unit in order to provide the designed distribution of the absolute value of the complex degree of mutual coherence $|\mu_{12}|$ along an increased light propagation length, can also be implemented by using different states of polarization of the light. The light can be split into two orthogonal polarization states. Two phase correction profiles or functions can be applied within the two separated beam paths. The two separated beam paths can be recombined and an exit polarization filter, for example orientated at 45 degrees to both orthogonal polarizations, can ensure a single polarization state of the light. This light having a single polarization state propagates further on its way to the SLM to be illuminated.

6) Continuous Phase Correction Profiles:

In general, aspheric optical elements or free-form surfaces can be used in order to provide an increased depth of focus of a designed distribution the absolute value of the complex degree of mutual coherence $|\mu_{12}|$. A direct approach may be to provide a collimation unit comprising at least one collimation lens having a first focal length in its inner zone and a second focal length in its outer radial zone. For a numerical aperture NA of >0.2 even a spherical lens might be appropriate and it might be compared to classic spherical aberration. Thus, a collimation lens might also have three radial zones realizing different focal lengths. Continuous transition can be applied for the phase profile realized by the collimation lens or by a phase correction element added separately. A phase correction profile can be calculated by using well-known optimization routines of optical simulation software. For this purpose, boundary conditions should be defined, in other words a set of acceptable maximum error values should be defined so that an automated optimization process can be started.

Phase correction functions, which increase the invariance property of the point spread function (PSF) of the optical system against a change of the focal plane, for example looking back on the situation of non-equivalent path lengths from the exit pupil of the collimation unit to the SLM plane, might have radial symmetric functionality or even an non-radial symmetric functionality.

Reasonable small cubic phase correction terms can also be added to the function of the collimation unit. Or, for example threefold, fourfold and further fold phase distributions can be added, which are referred to as petal-like phase correction profiles. A cubic phase correction given by:

$$\varphi_C(x,y)=\alpha\times(x^3+y^3), \quad (2)$$

could add a significant asymmetric shape to the point spread function. This might not be purposeful in order to generate the designed distribution of the absolute value of the complex degree of mutual coherence $|\mu_{12}|$ along a reasonable long z-range (z-direction) of the depth of focus. In equation (2) the value $\alpha$ (alpha) is a scaling factor used for adaption of the defocus invariance. An increased value of a would result in an increased invariance regarding defocus, that is a larger depth of focus, but also in a decreased spatial resolution provided by the point spread function modified.

Although asymmetric shaped point spread functions can be considered by designing the complex-valued distribution of the extended light source plane to be collimated in dependence on this, in other words by considering this for the light source design, single primary cubic phase terms, see e.g. equation (2), might be replaced by a superposition of mutually rotated cubic terms, which generate a less asymmetric point spread function. Twofold or fourfold cubic phase correction profiles might be used preferably if the encoded sub-holograms have rectangular shape. Threefold or fivefold symmetry of the phase correction profile might be preferred for circular shaped sub-holograms. In general, a plurality of correction profiles can be used, which might be referred to as extended depth of field correction profiles or wave front coded aperture.

Figure 25:
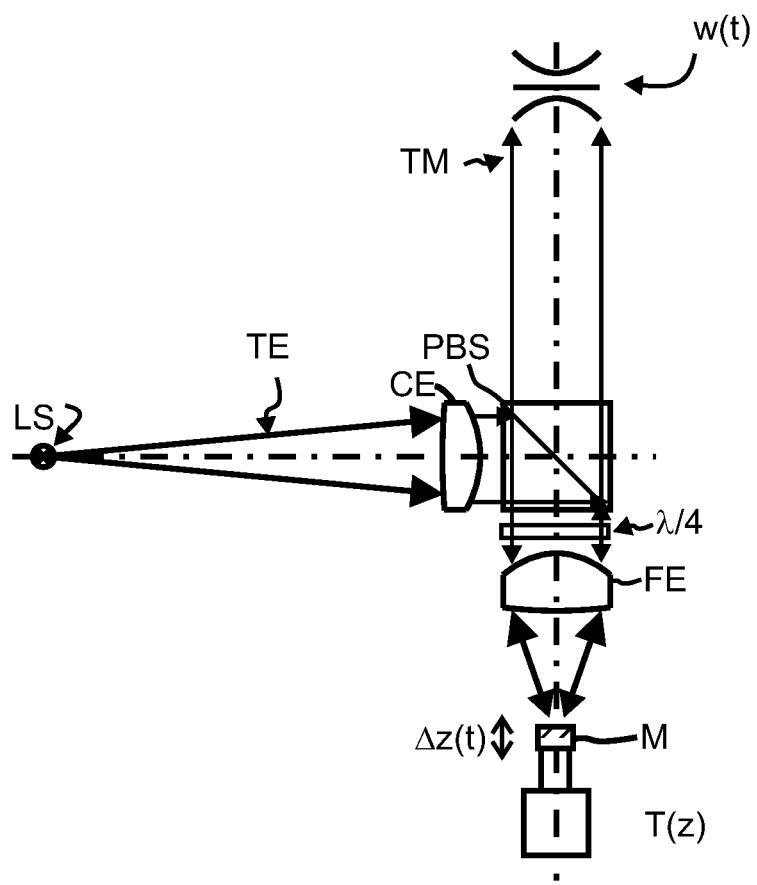
FIG. 25 shows a device able to provide a fast dynamic change of the curvature of a wave front using in a scanning illumination device.

7) Combination of Phase Term Correction with Scanning:

A further approach to provide the designed distribution of the absolute value of the complex degree of mutual coherence $|\mu_{12}|$ within the entire SLM plane can be combined the generation of the distribution of the absolute value of the complex degree of mutual coherence with a dynamic time-sequential adaptivity. In case of providing an illumination device using scanning, a focus change, which shifts the distribution of the absolute value of the complex degree of mutual coherence $|\mu_{12}|$ longitudinally, i.e. along the propagation distance of the light illuminating the SLM, can be implemented that is synchronized with the scanning illumination. Thus, the optimal defocus correction phase profile can be added to the SLM segment illuminated. This is carried out in the collimation unit, or in front of the collimation unit, i.e. e.g. in the plane of the extended light source. The depth of focus that should be spanned for a short but fixed time is reduced compared to non-scanning illumination approaches. This approach is shown in FIG. 25. Here, a dynamic change of the wave fields curvature is implemented. If a reasonable fast scanning illumination is used for the SLM, a dynamic change of the wave field curvature can be realized, which is synchronized with the scanning device. Thus, regardless of different optical path lengths, the desired distribution of the absolute value of the complex degree of mutual coherence $|\mu_{12}|$ is within the SLM plane.

A simple implementation of a focus change could be provided by using a fast variable focus lens or a deformable mirror element. The variable focus lens or the deformable mirror provides a temporal phase correction, which might be a spherical defocus term. This temporal phase correction should be carried out within one frame of the SLM illumination, in other words for example within a few milliseconds only, for example within 10 ms.

Two crossed or several mutual rotated active-type liquid crystal (LC) gratings or LC polarization gratings can also be used to provide a reasonable fast defocus term, which shifts the plane of the designed distribution of the absolute value of the complex degree of mutual coherence $|\mu_{12}|$ along the z-direction with time.

The scanning illumination that is synchronized with a longitudinal shift of the distribution of the absolute value of the complex degree of mutual coherence $|\mu_{12}|$ can also be implemented in a parallel way, that is, to use several spatial separated illumination zones at once. The illumination zones might be significant larger than the extension of the largest sub-hologram used. Furthermore, it is preferred to use a smooth transition between the state "no illumination" and the state "illumination having maximum intensity value".

The illumination path having a maximum intensity value can have an extension of preferable more than 3 mm.

Figure 23:
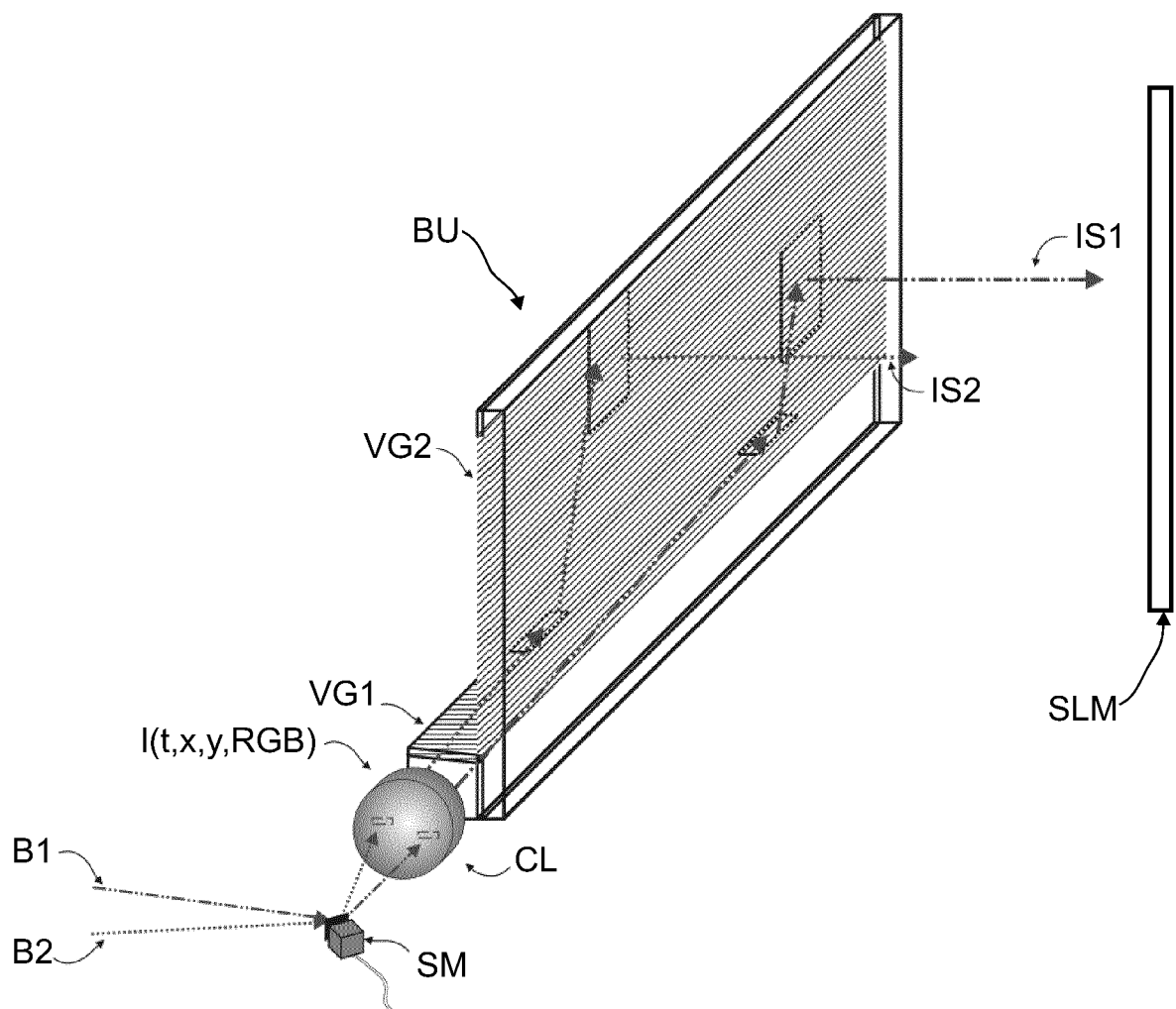
FIG. 23 shows a collimation unit arranged behind a scanning mirror element as an example of an implementation of a scanned illumination, here in front of a wedge-type-illumination unit.

FIG. 23 shows a collimation unit CL and the implementation of a scanned illumination in front of a wedge-type illumination unit BU. Both, the collimation unit CL and the wedge-type illumination unit BU are components of the illumination device.

Thus, FIG. 23 shows the implementation of a scanned illumination, here by using a backlight illumination unit, of a SLM plane that has to be illuminated with a designed distribution of the absolute value of the complex degree of mutual coherence $|\mu_{12}|$ to achieve a high reconstruction quality. For illuminating an SLM with the designed distribution of the absolute value of the complex degree of mutual coherence $|\mu_{12}|$ illumination segments $IS_N$, here two illumination segments IS1 and IS2, are provided, which are time-sequentially scanned along an entrance plane of the SLM to be illuminated. The illumination unit BU comprises two volume gratings VG1 and VG2, for example two Bragg diffraction based volume gratings. The volume gratings VG1 and VG2 provide a 2 times 10× anamorphic beam stretching of a wave field present behind the collimation unit CL, seen in the direction of propagation of light. Two beams or wave fields B1 and B2, which might be initially emitted by an extended light source, which was collimated and which is not shown, are reflected by a scanning unit SM and directed in the direction of the collimation unit CL. The scanning unit SM can be designed as a scanning mirror element SM, preferably a two-dimensional scanning mirror element. The two wave fields B1 and B2 are two exemplary wave fields propagating onto the scanning unit SM designed as a two-dimensional scanning mirror here. Of course, it is possible to provide further illumination segments $IS_N$. This means that according to the number of illumination segments $IS_N$ the same number of wave field $B_N$ is provided to generate the illumination segments $IS_N$. For each wave segment, here e.g. for B1 and B2, a dynamic spherical phase term can be added. The wave fields B1 and B2 are stretched and redirected in order to form the illumination segments $IS_N$, which are present in the entrance plane of the SLM further along the beam path.

The dynamic spherical phase term provide the distribution of the absolute value of the complex degree of mutual coherence $|\mu_{12}|$ depending on the distance between the collimation unit CL and the position of an entrance plane of the SLM to be illuminated. This means that variable focus optics can be added to the illumination device. Such variable focus optics can be provided in front of the shown beams or wave fields B1 and B2, i.e. e.g. at a collimation unit not shown that collimates an extended light source not shown.

Figure 24:
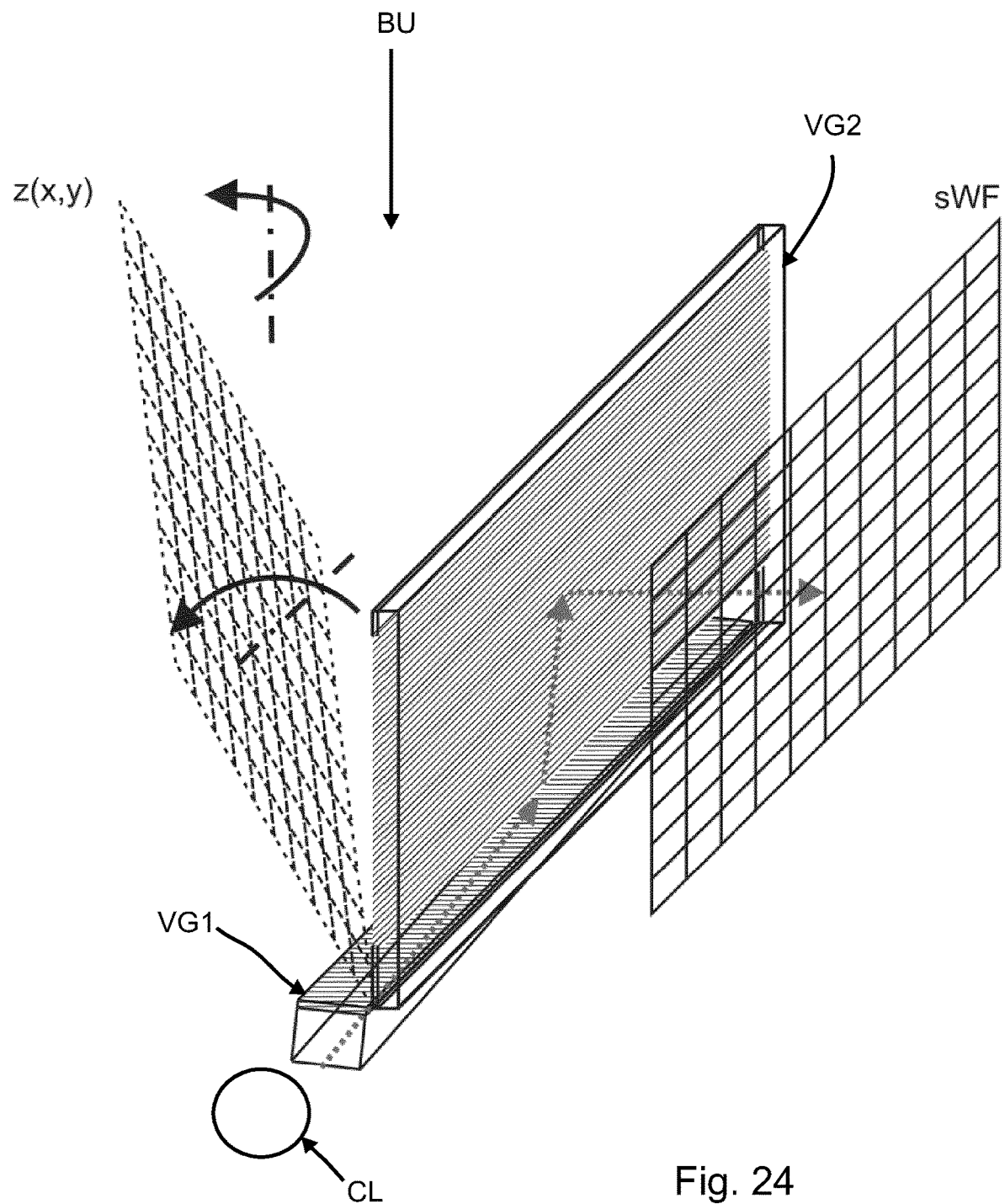
FIG. 24 shows the local difference of the optical path length present between the collimation unit arranged at the entrance of the wedge-type illumination unit and the spatial light modulator device.

In FIG. 24 the local difference of the optical path length present between the collimation unit CL arranged in an entrance plane of the wedge-type illumination unit BU as shown in FIG. 23 and the SLM to be illuminated. In other words, FIG. 24 illustrates the difference of the optical path length that is introduced by using the wedge-type illumination unit BU enlarging an initial wave field entering the illumination unit BU. The difference of the optical path length exists between a wave field entering the wedge-type illumination unit BU and a resultant enlarged wave field present in an exit plane of the illumination unit BU. As can be seen, the lower left corner of the exit wave field sWF has the shortest propagation length and the upper right corner of the exit wave field sWF has the longest propagation length because of the propagation time of the light within the wedge comprising the volume gratings VG1 and VG2. After entry of the light into the wedge the first light output is on the lower left corner of the wedge as shown in FIG. 24. Thus, this light wave emitted from that position on the wedge has the shortest propagation length. The light propagates further inside the wedge so that the last light output is on the upper right corner of the wedge. Thus, this light wave emitted from that position on the wedge has the longest propagation length. Therefore, the total wave field sWF generated by the illumination unit BU has light waves having different optical path lengths. This is a problem, which is addressed by FIG. 25, i.e. if the arrangement shown in FIG. 23 or 24 is combined with the embodiment shown in FIG. 25.

FIG. 25 shows a device that is able to provide a fast dynamic change of a curvature of a wave front. Such a device can be used in a scanning illumination unit as, for example, shown in FIGS. 23 and 24 in order to compensate for local differences in the optical path length propagating to the SLM. It can be preferred to use such a device advantageously in a wedge-type illumination unit. Thus, it is shown an exemplary embodiment of a device providing a temporal defocus or a wave front curvature acting as temporal phase correcting profile on demand by using a time dependent longitudinal movement $\Delta z(t)$ of a small mirror element M. The small mirror element M can be arranged close to a focal plane of a focussing element FE, here a focussing lens. The translation of the small mirror element M is introduced by a translation unit. The translation unit might be e.g. a piezo translation (PZT) element or a voice coil (VC). A polarization beam splitter PBS is provided in the light path between a light source LS and the mirror element M. Between the polarization beam splitter PBS and the mirror element M a quarter wave plate $\lambda/4$ (or also referred to as QWP) is arranged. The polarization beam splitter PBS and the quarter wave plate $\lambda/4$ are combined in such a way that a required separation of the beam path can be provided. In operation, the light emitted by the light source LS is TE (transversal electric)-polarized and is incident on a collimation element CE and then on the polarization beam splitter PBS. The polarization beam splitter reflects and directs the light in the direction of the quarter wave plate $\lambda/4$. After passing the quarter wave plate $\lambda/4$ the light passes the focussing element FE and is incident on the mirror element M. The light is reflected by the mirror element M and passes the focussing element FE, the quarter wave plate $\lambda/4$ and the polarization beam splitter again. The light leaving the polarization beam splitter PBS is TM (transversal magnetic)-polarized and propagates in the direction of the SLM. It is preferred to provide this dynamic defocussing unit in front of the backlight unit, i.e. at a section of the beam path having small beam diameters.

A spherical wave front correction or defocus can be provided in the KHz range. The small mirror element M, for example, mounted on a center of voice coils can vibrate slightly at frequencies larger than 20 kHz. The device, which is shown in FIG. 25, is an example that shows that a wave front curvature (in FIG. 25 designated as wave front: w(t)) can be generated on demand and in a fast way.

There is a plurality of optional embodiments that can be used in order to sufficiently consider the difference within the propagation distance of the light from the collimation unit to the SLM in order to provide an optimal distribution of the absolute value of the complex degree of mutual coherence $|\mu_{12}|$ in the entrance plane of the SLM illuminated.

All general approaches and embodiments disclosed might be combined with each other in order to obtain a tailored solution for a particular embodiment, independent of the fact whether, for example, scanning illumination is used or not. Further Explanations to the Present Invention:

As already disclosed, one solution for the tailoring of the distribution of the absolute value of the complex degree of mutual coherence $|\mu_{12}|$ of the light illuminating a complex-valued SLM is based on lateral beam combining of two phase pixels of the SLM. For this purpose the use of a dynamic phase randomizing plane is provided in combination with the use of an optimized amplitude distribution of an extended light source plane to be collimated and in combination with the use of an optimized phase distribution of the extended light source plane to be collimated. Thus, only segments of the wave field that have to be combined with each other in order to generate complex-valued pixel have a high degree of mutual coherence and thus a high visibility. Such an embodiment can be used for a complex-valued SLM based on lateral beam combining of e.g. two adjacent phase pixels. This is a very specific embodiment. It can be distinguished between the combination of two adjacent phase pixels, which should generate a complex-valued pixel in the far field, and the entire area of a large sub-hologram, which contains complex-valued pixels, which all have to be superimposed coherently.

For example, if VPO-type 1D encoding is present and two adjacent phase pixel columns are combined in order to form a column-like complex-valued pixel, the horizontal with of the distribution of the absolute value of the complex degree of mutual coherence $|\mu_{12}|$ has to be as large as the two phase columns to be combined, while the vertical extension is as large as the largest one-dimensional sub-hologram.

The following description refers to a preferred extension of the area of coherence.

The entrance pupil of the human eye defines the numerical aperture of the optical system that images object points in space onto the retina of the human eye. And as described already it can be advantageous to define the size of the sub-holograms to be encoded by the projection of the entrance pupil through an object point onto the SLM. It should be pointed out that a sub-hologram can have any size and any shape. In other words, the size and shape of a sub-hologram do not depend on the size and shape of the entrance pupil of the eye. By using additional dynamic variable and addressable space on the SLM close to the simple geometric projection area in order to describe a sub-hologram, the zone of collecting the light to be focussed onto an object point can be changed. It should be pointed out further that this additional variance of the geometrical shape of sub-holograms can be transferred in significantly increased Bit depth of the object points reconstructed in space. This also means that an increased sub-hologram might be used in order to increase the brightness of an object point. As explained already, a boundary condition is that the distribution of the absolute value of the complex degree of mutual coherence $|\mu_{12}|$ has to be adapted to the size and shape of the largest sub-hologram used.

In addition to the option of significantly increasing the Bit depth of points reconstructed in space the correction of the used geometric projection of the viewing window onto the SLM will result in a significant lower computational load. In other words, the definition of the sub-hologram size by using the geometrical projection of the viewing window onto the SLM is not required and could utilize much more complex-valued SLM pixels than necessary.

For example, at a luminance of 100 cd/m$^2$ the average diameter of the entrance pupil of the human eye is approx. 2.9 mm. Time being 2D display devices as e.g. desktop monitors or television display devices allow the generation of a luminance of (300 to 500) cd/m². This entrance pupil of the human eye utilizes an area of 6.6 mm². A viewing window in an observer plane, through which an observer can observe a reconstructed preferably three-dimensional scene or object, having a size, for example, of 10 mm times 10 mm utilizes an area of 100 mm², which is a factor of 15 compared to the entrance pupil at a luminance of 100 cd/m².

Limiting the sub-hologram size to the geometrically projected entrance pupil rather than to the viewing window would decrease the area provided for the sub-holograms by a factor of 15. This is an essential difference regarding the calculation power required and the image update speed obtained.

Important is the consideration of the eye movement, the geometrical tracking accuracy during tracking of the eye provided by a triangulation algorithm applied to camera data (pictures) and the temporal uncertainty, that is, the updating time of a tracking unit, which also includes the response of active-type in-plane LC polarization gratings used within the display device providing a fine tracking. Thus, a millimeter might be added to the value of 2.9 mm for compensation if desired. In other words and for example, a diameter of approx. 3.9 mm can be used in the center of the viewing window as a circular reference area to be projected onto the SLM. Thus, the circular sub-holograms are defined. This results in an area in the centre of the viewing window of 11.9 mm2. This results again in a sufficiently large area within the viewing window and in a large factor in comparison with the entire area of the viewing window in order to observe a reconstructed scene without any difficulty. This large factor, which can be used in order to enable 2D encoded real time computation of sub-holograms, is important. A small additional region is added to the sub-hologram area defined by the projection of the entrance pupil onto the SLM. For the sake of simplicity, if the diameter of the entrance pupil of the human eye e.g. is assumed as 2.9 mm and a real object point is formed in front of the display device at 50% of the distance from the display device to the observer, the geometrical projection from the entrance pupil to the SLM is a circular area, which has a diameter of 2.9 mm, too. The addition of an additional area means that this diameter can be increased to e.g. 3.5 mm. This corresponds to addition of a small additional region to the sub-hologram area, which can be defined by the geometrical projection of the entrance pupil onto the SLM. In other words, the area of the sub-hologram must not correspond to the size and area of the entrance pupil. This is carried out in dependence on the uncertainty of the eye tracking, also referred to as entrance pupil tracking.

A further refinement is the implementation of the capability of a dynamic change of the sub-hologram size. This can be carried out by using several approaches.

One approach can be to use the mean luminance displayed or the mean luminance the observer eye is exposed to. Due to the correlation existing look-up table data can be used. Thus, it is possible to reduce the sub-hologram size further if content is provided having a high luminance. For example, at a luminance of 300 cd/m² the entrance pupil has an average diameter of approx. 2.5 mm. One millimetre can be added to this average diameter to compensate for the entrance pupil tracking tolerances. This results in a diameter of approx. 3.5 mm and thus in an area of 9.6 mm².

Another approach can be to use camera data obtained by the entrance pupil tracking already. The diameter of the entrance pupil can be obtained by entrance pupil images.

Such an approach is simple and fast. This can also be combined with the approach using the luminance the eye is exposed to.

An enhanced method of encoding of sub-holograms is fundamentally linked to the approach of a tailored generation of the absolute value of the complex degree of mutual coherence $|\mu_{12}|$:

Encoding 1)

The simplest case may be to have a plateau-type distribution of the absolute value of the complex degree of mutual coherence $|\mu_{12}|$ having a reasonable constant value and that is at least as large as the largest sub-hologram used for the encoding, as can be seen e.g. in FIGS. 20 to 22. For example, the plateau has a value of $|\mu_{12}|_{plateau} \cong \text{constant} = 0.9 \pm 0.045$, that is to have a mean value and only slightly variations of this mean value, which can be in the range of ±5%. In this case, the encoding of a sub-hologram can consider all complex pixels of the sub-holograms used for encoding of the holographic three-dimensional scene as equivalent. In other words, all complex-valued SLM pixels have a related weight of one and thus are treated all the same. In other words, if pixels of a sub-hologram form a real object point e.g. at 1 m in front of a holographic display device, it can be assumed that all pixels contribute to the generation of the object point with the same amount or with the same weight. All pixels have the same absolute value of the complex degree of mutual coherence, which can be, for example 0.9. This value is thus sufficient high compared to the ideal case of 1.0.

As described in the section before, an iterative optimization procedure can be used in order to obtain the optimized complex-valued distribution of the extended light source to be collimated. This optimized complex-valued distribution exactly generates the required flat-top plateau-type distribution of the absolute value of the complex degree of mutual coherence $|\mu_{12}|$.

Encoding 2)

Another case may be to generate a distribution of the absolute value of the complex degree of mutual coherence $|\mu_{12}|$ having a part that is a reasonable constant plateau. If the largest sub-holograms fit into this plateau-type part of the distribution of the absolute value of the complex degree of mutual coherence $|\mu_{12}|$, i.e. that all sub-holograms fit into this distribution and the largest sub-hologram is used for encoding, the encoding can consider all complex pixels of the sub-holograms, which are used for encoding of the holographic three-dimensional scene, as equivalent. The plateau part might have, for example, a value of 0.9 that should be sufficient.

It is also possible to squeeze slightly the sinc-type intensity distribution, for example orientated vertically, in order to shift the two maximum peaks of this intensity distribution out of the lateral extension of the largest sub-hologram used. In this case of being placed the two maximum peaks outside the sub-hologram size, the two maximum peaks at the rim of the distribution of the absolute value of the complex degree of mutual coherence $|\mu_{12}|$ would not affect a constant weighted encoding.

Encoding 3)

Another case of enhanced holographic encoding can be to consider the existing distribution of the absolute value of the complex degree of mutual coherence $|\mu_{12}|$. This can be carried out with any distribution of the absolute value of the complex degree of mutual coherence $|\mu_{12}|$ present in the plane of the SLM. As a starting point of this method a distribution of the absolute value of the complex degree of mutual coherence $|\mu_{12}|$ should be provided that is already reasonable close to the optimal distribution of the absolute value of the complex degree of mutual coherence. Thus, only small corrections of the weights of the complex values of the sub-holograms have to be implemented and carried out. In other words, an ideal distribution of the absolute value of the complex degree of mutual coherence $|\mu_{12}|$ can be assumed and used for the encoding of a hologram. However, the real distribution of the absolute value of the complex degree of mutual coherence $|\mu_{12}|$ might differ from this, which can be e.g. due to the optical arrangement used and aberrations present. This real distribution of the absolute value of the complex degree of mutual coherence $|\mu_{12}|$ can be described as an ideal distribution, which is modified by an additional aberration and which can differ in the entrance plane of the SLM illuminated. In this case, it is advantageous to consider the real, local slightly varying distribution of the absolute value of the complex degree of mutual coherence $|\mu_{12}|$. In this manner, local varying corrections can be used for the encoding. For example, a circular shaped flat-top distribution of the absolute value of the complex degree of mutual coherence $|\mu_{12}|$ might have a diameter of 3 mm in the center of the SLM and e.g. 3.5 mm at the rim of the SLM. Thus, the encoding and the related optimized reduction of retinal inter object point crosstalk uses 3 mm coherence area in the center of the SLM and 3.5 mm at the rim of the SLM.

This means, for example, for a distribution of the absolute value of the complex degree of mutual coherence $|\mu_{12}|$ that for all sub-holograms that have an extension fitting into the inner plateau area no changes are required. This means further that the mutual coherence of all these pixels of a sub-hologram is the same. For all these pixels of the sub-hologram an absolute value of the complex degree of mutual coherence $|\mu_{12}|$ may be applied, for example, a value of 0.9. For 1D encoding a one-dimensional diffractive lens segment, which is a one-dimensional sub-hologram forming a single object point, or for 2D encoding a preferable circular diffractive lens segment, which is a two-dimensional sub-hologram forming a single object point, can have the same weight for an object point in space and for all complex-valued pixels within the calculation of sub-holograms, which can be, for example, set to one (1). The wave segments or lens segments propagating behind the single, e.g. complex-valued pixels forming a sub-hologram, which generates a real or an imaginary object point in the viewing volume of a three-dimensional holographic display device, are added together in the far-field of the sub-hologram. This can be described by an equation. This equation contains mutual phase differences present between the pixels and the object point in the far-field in which the electromagnetic wave field segments are summed up. Furthermore, this equation contains the amplitude value and the phase value of each pixel. And this equation contains the absolute value of the complex degree of mutual coherence $|\mu_{12}|$ (mutual visibility) of the electromagnetic wave field segments summed up. This means that the absolute value of the complex degree of mutual coherence $|\mu_{12}|$ acts as a weighting factor, or in more detail, as a distribution of mutual weighting factors, which are values of the mutual visibility, which can be used for the calculation of the retinal object points and for the calculation of the retinal inter object point crosstalk. In other words, the absolute value of the complex degree of mutual coherence $|\mu_{12}|$ is a basic element for the optimization of the retinal image quality.

Sub-holograms having an extension that is larger than the inner plateau area should be changed regarding the mathematical weight, (mathematical value of the mutual visibility, which is used for the calculation of the retinal image finally obtained) that refers to each complex-valued pixel during the encoding of the sub-hologram. The encoding of a sub-hologram is the process of the calculation of the sub-hologram and the corresponding methods used within this process. In this case, the mutual coherence of the pixels forming a large sub-hologram is not the same. Pixels related to the outer rim of the distribution of the absolute value of the complex degree of mutual coherence $|\mu_{12}|$ have an absolute value of the mutual coherence of approx. 1, while the inner pixels of the sub-hologram have a similar absolute value of the complex degree of mutual coherence $|\mu_{12}|$ of, for example, approx. 0.9 but not the same.

The basic physical effect of a non-constant distribution of the absolute value of the complex degree of mutual coherence $|\mu_{12}|$ is a non-constant distribution of different parts of the sub-holograms regarding the diffraction efficiency, which is applied local within the diffractive lens structures forming object points in 3D space. For example, a circular area, which forms a lens function, might be illuminated with a constant intensity distribution. This area thus might generate a focus point, which acts as a real object point. If all contributing pixels have the same mutual coherence, they have the same mathematical weight regarding the focus forming. If the mutual coherence is not the same, several effects occur which are dependent on the discrete distribution of the absolute value of the complex degree of mutual coherence $|\mu_{12}|$. The object point can be broadened, while the height of the side lobes is reduced. However, it is also possible that the inner region of the focus point formed is reduced in size, while the height of the side lobes is increased. In addition to the change of the focus distribution formed, an intensity offset is generated, the so-called DC value, which is not advantageous regarding the image contrast, which is reduced in this way. This is a basic effect which applies to all kinds of image or wave field forming embodiments and processes which are at least partially coherent. Thus, the effect of the distribution of the absolute value of the complex degree of mutual coherence $|\mu_{12}|$ can also be considered generally for the use of computer-generated holograms (CGH), for example, used within beam shaping or measurement applications.

In more detail, the distribution of the absolute value of the complex degree of mutual coherence $|\mu_{12}|$ utilizes higher spatial frequencies forming the object point in a three-dimensional space. This can be understood if studying the difference between a fully coherent modulation transfer function (MTF), a partial coherent MTF and an incoherent MTF. Compared to the inner area or zone of the sub-hologram, which contributes to a diffractively reconstructed object point with an absolute value of the mutual coherence, for example, of approx. 0.9, the complex-valued pixels of the sub-hologram of the SLM related to the outer rim of the distribution of the absolute value of the complex degree of mutual coherence $|\mu_{12}|$ contribute to the diffractively reconstructed object point with an absolute value of the mutual coherence, for example, of close to 1. In other words, the mathematical weight of the rim of the sub-holograms is increased. This results in a slightly reduced central peak of the focus point formed and in slightly increased peak values of the side lobes.

An equivalent model, which might be used to describe the resulting effect of non-constant plateau-type distributions of the absolute value of the complex degree of mutual coherence $|\mu_{12}|$, may be to use a diffractive Fresnel lens or Fresnel zone plate. Such a diffractive Fresnel lens or Fresnel zone plate may have high diffraction efficiency at the rim and reduced diffraction efficiency within the inner area. This diffractive Fresnel lens or Fresnel zone plate can be illuminated with a plane wave. The result of the diffraction introduced by this diffractive element is a generated focal point having marginally reduced diameter, where only slightly increased side lobes are generated by this diffraction compared with diffraction efficiency that is constant within the entire area of the diffractive Fresnel lens or Fresnel zone plate.

Thus, the calculation of the sub-holograms can consider the present distribution of the absolute value of the complex degree of mutual coherence $|\mu_{1,2}|$ and assume slightly higher diffraction efficiency at the rim of large sub-holograms exceeding the inner plateau area. The amplitude values of these complex-valued pixels of the sub-hologram placed at the outer rim of the large sub-hologram can be slightly reduced in order to compensate for the slightly higher diffraction efficiency of the rim area or zone. Although it seems that these are small effects, they all contribute to the overall image quality reducing artefacts. Therefore, the effect should be compensated in order to provide an image quality as high as possible. The compensation described can be carried out by means of an additional amplitude factor of the complex-valued pixels of the SLM related to the rim zones of the sub-holograms. More precisely, the encoding is carried out by using, for example, an amplitude correction of the sub-holograms. The holograms defining the entire three-dimensional scene are transferred to the complex-valued SLM and its pixels.

In general, this can be used for different distributions of the absolute value of the complex degree of mutual coherence $|\mu_{1,2}|$. As already disclosed, the sub-hologram size can be reduced significantly in order to be only slightly larger than its geometrical projection onto the entrance pupil of the human eye. This procedure decreases the computation power required for 2D encoding of a hologram, for example, by a factor of 10.

Regarding the realization of intensity profiles in the plane of an extended light source to be collimated it is pointed out that the intensity profiles of the extended light source to be collimated can be realized in different ways. The size of the light source is an important feature. This means the size of the light source should be as small as necessary. As a result, side lobes, for example, of a sinc type aperture profile or distribution are significant smaller.

It is also possible to use polarization. For this purpose, it is possible to use a combination of a patterned retarder and a polarization filter or simply a patterned polarization filter illuminated with, for example, linear polarized light in order to generate intensity profiles even at small dimensions.

Furthermore, it is possible to use binary pattern. As can be seen in FIG. 8, gray scale distributions can be transferred to binary pattern. If the critical dimension (CD) of this binary pattern is so small that the optical system provided behind the extended light source, seen in the direction of propagation of light, cannot resolve the binary pattern, this type of structuring can be used then to generate effective gray scale distributions. The smaller the numerical aperture of an optical system is, the lower the spatial frequencies are that are transferred by it. This is described by the modulation transfer function (MTF) which is the absolute value of the Fourier transform of the point spread function (PSF) describing how a single object point would be imaged by an optical system used. A binary amplitude mask, which, for example, uses a critical dimension of 1 µm, might be used to generate the amplitude distribution of the extended light source to be collimated. A boundary condition is that the 1 µm wide pixels of the light source plane would not be visible in the plane of the viewing window. The use of statistical randomized pattern may be one preferred option. But it might be also possible to use so-called Polka dot distributions of binary pattern. A Polka dot distribution using a fixed address raster can also be randomized by using, for example, statistical random and normal distributed lateral shifts of the individual single dots in one or in two directions. Thus, diffractive artefacts due to defined smearing or blur of well-defined spatial frequencies can be reduced.

It is also possible to dip a surface relief profile face down into a tinted adhesive. Additional phase shifts, which might also be introduced, can be considered and corrected within the additional phase mask used anyway.

In addition, the technology used to generate attenuated phase shift masks can also be used to provide the amplitude distribution and the phase distribution required. This means that, for example, electron beam writing of High Energy Beam Sensitive Substrate (HEBS) may be used which permanently changes transmission in dependence on the dose of high energy electron beam radiation applied.

The combination of the primary wave lengths or colors RGB is described below.

The complex-valued amplitude distributions related to the different primary colors RGB to be used to illuminate the SLM of a holographic display device can be generated separately and combined by using diffractive or refractive wavelength selective beam combiners. As beam combiner, for example, a Bragg diffraction based volume grating or a Philips-type color prism can be used to combine the RGB beam paths.

For example in operation, a direct way may be to generate the complex-valued extended light sources of three different primary colors RGB separately. After this a Philips-type prism is used to combine the three beam paths regarding the different primary colors RGB. A lens or lens group equivalent to a macro lens can be used to image the different light sources onto a rotating engineered diffuser optimized in a way to provide a homogeneous illumination of the SLM for all primary colors used.

If relevant aberration might be present, specific corrections can be carried out, for example, by using tailored aspherical free-form surfaces within the imaging optical system.

The static part of the complex-valued amplitude distribution of the light source planes of the different colors can also be generated by using CGH or Bragg diffraction based volume gratings. Volume gratings can be provided to use primary light beams (for example laser beams) and to transfer them into the required complex-valued distributions. This can also be carried out in such a way that the volume gratings are multiplexed within one single element.

Furthermore, the diffractive beam shaping can be provided in such a way that the generated light source distributions are superposed in a plane which comprises a rotating engineered diffuser. This saves additional imaging optics which images the light sources onto the dynamic engineered diffuser plane.

For example, fast voice coil translation or piezo translation (PZT) based lateral movement of small engineered diffuser foils might be realized in a compact way. Dynamic diffusers based on MEMS (micro-electro-mechanical systems) or deformable mirrors are costly, not fast enough and have an increased failure rate compared with, for example compact, PZT based embodiments. Such diffusers are not preferred. Voice coils or PZT can be used in pulsed mode or in resonance mode in order to provide reasonable fast movement combined with a reasonable elongation of the lateral movement, for example, of at least 100 µm. Discrete values of the required lateral movement of the diffuser depend on the discrete optical embodiment used. Thus, it might also be possible that a maximum dynamic lateral movement of an engineered diffuser of up to 1 mm is required. A stroke, for example, of 1 mm can be provided by PZT elements operated in the kHz range.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

The invention claimed is:

1. An illumination device for illuminating a spatial light modulator device, comprising a light source device and at least one scatter element, where
   the light source device comprises at least one multi-mode fiber or mono-mode fiber and is configured to emit light for illuminating the spatial light modulator device, and
   an exit plane of the at least one multi-mode fiber or mono-mode fiber is imaged onto the at least one scatter element to generate only one extended light source, where in a plane of the spatial light modulator device a defined coherence of the light is provided by a size of the extended light source, the size of the extended light source is adapted by the magnification of an image of the exit plane of the at least one optical fiber.

2. The illumination device according to claim 1, wherein the at least one scatter element is provided for generating a temporal varying randomized phase distribution.

3. The illumination device according to claim 1, wherein the at least one scatter element has a phase structure generating a defined intensity distribution.

4. The illumination device according to claim 1, wherein the at least one scatter element is designed as a beam scatter plate or beam scatter foil or a dynamic scatter element.

5. The illumination device according to claim 1, wherein the at least one scatter element is designed as a rotating or laterally moving scatter element.

6. The illumination device according to claim 1, wherein the at least one scatter element is divided into segments, the segments are provided with actuators which are controlled such that a dynamic randomized phase distribution of the light is generated.

7. The illumination device according to claim 1, wherein the at least one scatter element is mounted on at least one piezo-electric actuator element or at least one voice coil element to provide at least one lateral movement of the at least one scatter element or the at least one scatter element comprises a motor element to provide a rotation of the at least one scatter element, the at least one scatter element provides a statistical randomized change of phase values present in a plane of the extended light source.

8. The illumination device according to claim 7, wherein the piezo-electric actuator element or the voice coil element is synchronized with the spatial light modulator device.

9. The illumination device according to claim 1, wherein in case of using a one-dimensional encoding of a hologram into the spatial light modulator device, the defined coherence of the light is a distribution of the absolute value of the complex degree of mutual coherence that is a flat-top line segments-like distribution having a flat-top line segments-like function.

10. The illumination device according to claim 1, wherein in case of using a two-dimensional encoding of a hologram into the spatial light modulator device, the defined coherence of the light is a distribution of the absolute value of the complex degree of mutual coherence that has a shape that depends on the shape of sub-holograms of the hologram encoded into the spatial light modulator device.

11. The illumination device according to claim 1, wherein an aperture stop is provided for blocking disturbing light.

12. The illumination device according to claim 11, wherein the aperture stop is provided in a plane of the extended light source to provide a required amplitude distribution of the light that is emitted by the extended light source.

13. The illumination device according to claim 1, wherein at least one of an amplitude mask and a phase mask, or an attenuated phase shifting mask is provided in a plane of the light source device or in the plane of the extended light source.

14. The illumination device according to claim 1, wherein the at least one scatter element provides spatially randomized phase steps within a range being greater or equal to $\pm\pi$.

15. The illumination device according to claim 1, wherein the at least one scatter element provides a spatially randomized phase distribution, which is tailored in order to result in a flat-top-like intensity distribution present in the entrance plane of the spatial light modulator device.

16. The illumination device according to claim 1, wherein in case of using a one-dimensional encoding of a hologram into the spatial light modulator device, a grating element or a lens element is provided to stretch the light along one dimension to generate a one-dimensional light intensity distribution.

17. The illumination device according to claim 1, wherein the light source device comprises at least three light sources, at least one light source per primary color RGB.

18. The illumination device according to claim 17, wherein three color-specific scatter elements are provided, where each scatter element only acts on a single allocated color.

19. The illumination device according to claim 17, wherein a light beam combining unit is provided to combine the light beams of different colors RGB.

20. The illumination device according to claim 1, wherein a 10 times anamorphic stretching of the light beam in two directions is provided, where a diameter of the extended light source can be determined by $\varnothing_\otimes = 2 \times f_{Collimation} \times \tan(1/12 \text{ degrees})$, where f is the focal length of a collimation element used for collimating light emitted by the light source device.

21. The illumination device according to claim 1, wherein the at least one scatter element is designed as an acoustic optical modulator, as micro-electro-mechanical-system, as a liquid crystal dispersed volume grating or as a saturation dependent absorptive filter.

22. A display device for the reconstruction of at least one of two-dimensional and three-dimensional objects or scenes, comprising an illumination device according to claim 1, and the spatial light modulator device, where the spatial light modulator device is arranged downstream of the illumination device, seen in the direction of propagation of light.

23. The display device according to claim 22, further comprising a field lens or a compound field lens, which comprises at least one volume grating.

* * * * *